United States Patent
Ihara et al.

(10) Patent No.: US 9,225,039 B2
(45) Date of Patent: Dec. 29, 2015

(54) ELECTROLYTIC SOLUTION, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: Sony Corporation, Tokyo (JP)

(72) Inventors: Masayuki Ihara, Fukushima (JP); Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 306 days.

(21) Appl. No.: 13/712,526

(22) Filed: Dec. 12, 2012

(65) Prior Publication Data

US 2013/0177799 A1    Jul. 11, 2013

(30) Foreign Application Priority Data

Dec. 26, 2011  (JP) .................... 2011-283571

(51) Int. Cl.
| | |
|---|---|
| *H01M 10/02* | (2006.01) |
| *H01M 10/40* | (2006.01) |
| *H01M 10/056* | (2010.01) |
| *H02J 7/00* | (2006.01) |
| *H01M 10/052* | (2010.01) |
| *H01M 10/0567* | (2010.01) |
| *H01M 10/0568* | (2010.01) |
| *H01M 10/0569* | (2010.01) |

(52) U.S. Cl.
CPC .......... *H01M 10/056* (2013.01); *H01M 10/052* (2013.01); *H01M 10/0567* (2013.01); *H01M 10/0568* (2013.01); *H02J 7/0063* (2013.01); *H01M 10/0569* (2013.01); *Y02E 60/122* (2013.01); *Y02T 10/7011* (2013.01)

(58) Field of Classification Search
CPC .......... H01M 4/00; H01M 4/13; H01M 10/04; H01M 10/056; H01J 7/00
USPC .............. 429/330, 231.2, 325, 347, 150, 200, 429/123, 212; 320/134, 135; 180/65.1
See application file for complete search history.

(56) References Cited

U.S. PATENT DOCUMENTS

| | | | |
|---|---|---|---|
| 5,013,620 A * | 5/1991 | Miyazaki et al. .......... | 429/231.2 |
| 2007/0284159 A1* | 12/2007 | Takami et al. ............... | 180/65.1 |
| 2009/0239154 A1* | 9/2009 | Lee et al. ...................... | 429/347 |
| 2009/0317726 A1* | 12/2009 | Hirose et al. .................. | 429/330 |

(Continued)

FOREIGN PATENT DOCUMENTS

| | | |
|---|---|---|
| JP | 07-282849 | 10/1995 |
| JP | 11-191319 | 7/1999 |
| JP | 2000-058122 | 2/2000 |

(Continued)

OTHER PUBLICATIONS

Notification of Reason(s) for Refusal issued in connection with Japanese Patent Application No. 2011-283571, dated Jul. 7, 2015. (9 pages).

(Continued)

*Primary Examiner* — Kenneth Douyette
(74) *Attorney, Agent, or Firm* — K&L Gates LLP

(57) ABSTRACT

A secondary battery includes: a cathode; an anode; and an electrolytic solution. The electrolytic solution includes an unsaturated cyclic ester carbonate and one or more selected from a group configured of aromatic compounds, dinitrile compounds, sulfinyl compounds, and lithium salts.

15 Claims, 6 Drawing Sheets

(56) References Cited

U.S. PATENT DOCUMENTS

2011/0080140 A1* 4/2011 Hogari et al. ............ 320/134
2011/0143215 A1* 6/2011 Andou ..................... 429/325

FOREIGN PATENT DOCUMENTS

| | | |
|---|---|---|
| JP | 2000-182669 | 6/2000 |
| JP | 2001-085056 | 3/2001 |
| JP | 2001-135351 | 5/2001 |
| JP | 2003-017121 | 1/2003 |
| JP | 2004-127943 | 4/2004 |
| JP | 2004-172117 | 6/2004 |
| JP | 2004-172120 | 6/2004 |
| JP | 2004-523073 | 7/2004 |
| JP | 2006-114388 | 4/2006 |
| JP | 2006-351337 | 12/2006 |
| JP | 2007-005242 | 1/2007 |
| JP | 2008-010414 | 1/2008 |
| JP | 2008-262901 | 10/2008 |
| JP | 2010-170886 | 8/2010 |
| JP | 2010-533359 | 10/2010 |
| WO | 2008/069267 | 6/2008 |
| WO | 2010/110159 | 9/2010 |
| WO | 2011/070964 | 6/2011 |

OTHER PUBLICATIONS

Japanese Office Action issued Oct. 6, 2015, for corresponding Japanese Appln. No. 2011-283571 (10 pages).

* cited by examiner

ELECTROLYTIC SOLUTION, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCES TO RELATED APPLICATIONS

The present application claims priority to Japanese Priority Patent Application JP 2011-283571 filed in the Japan Patent Office on Dec. 26, 2011, the entire content of which is hereby incorporated by reference.

BACKGROUND

The present technology relates to an electrolytic solution, to a secondary battery that uses the electrolytic solution, and to a battery pack, an electric vehicle, an electric power storage system, an electric power tool, and an electronic apparatus that use the secondary battery.

In recent years, various electronic apparatuses such as mobile phones and personal digital assistants (PDAs) have been widely used, and it has been demanded to further reduce the size and the weight of the electronic apparatuses and to achieve their long life. Accordingly, a battery, in particular, a small and light-weight secondary battery capable of providing high energy density has been developed as an electric power source. In these days, it has been considered to apply such a secondary battery to various other applications that may include, for example, battery packs attachably and detachably mounted on the electronic apparatuses or the like, electric vehicles such as electric automobiles, electric power storage systems such as home electric power servers, and electric power tools such as electric drills.

As secondary batteries, secondary batteries that obtain a capacity by utilizing various charge and discharge principles have been proposed. In particular, secondary batteries that utilize insertion and extraction of electrode reactants are considered promising, since such secondary batteries provide higher energy density than batteries such as lead batteries and nickel-cadmium batteries.

A secondary battery includes a cathode, an anode, and an electrolytic solution. The electrolytic solution includes a solvent and an electrolyte salt. The electrolytic solution that functions as an intermediate in charge and discharge reactions largely affects performance of the secondary battery. Hence, the composition of the electrolytic solution has been variously studied. Specifically, a cyclic ester carbonate that has one or more carbon-carbon unsaturated bonds is used as an additive for an electrolytic solution so as to suppress, for example, battery deterioration in high-voltage charge, risk of explosion resulting from pressure increase inside the battery, etc. (for example, see Japanese Unexamined Patent Application Publication Nos. 2006-114388, 2001-135351, H11-191319, 2000-058122, and 2008-010414, and Japanese Unexamined Patent Application Publication (Translation of PCT Application) No. 2004-523073). Such a cyclic ester carbonate is not limitedly used in batteries (liquid batteries) that use an electrolytic solution, but also used in batteries (solid batteries) that do not use an electrolytic solution (for example, see Japanese Unexamined Patent Application Publication No. 2003-017121).

SUMMARY

Recently, applications such as electronic apparatuses in which a secondary battery is used have been obtaining higher performance and more functions. Accordingly, it is desired to further improve battery characteristics of the secondary battery.

It is desirable to provide an electrolytic solution, a secondary battery, a battery pack, an electronic vehicle, an electric power storage system, an electric power tool, and an electronic apparatus that are capable of providing superior battery characteristics.

According to an embodiment of the present technology, there is provided an electrolytic solution including: an unsaturated cyclic ester carbonate represented by the following Formula (1), and one or more selected from a group configured of aromatic compounds represented by the following Formula (2) to Formula (5), dinitrile compounds represented by the following Formula (6), sulfinyl compounds represented by the following Formula (7) to Formula (14), and lithium salts represented by the following Formula (15) to Formula (17),

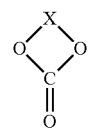
(1)

where X is a divalent group in which m-number of >C=CR1-R2 and n-number of >CR3R4 are bonded to one another in any order; R1 to R4 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R1 to the R4 may be bonded to one another; and m and n satisfy m≥1 and n≥0,

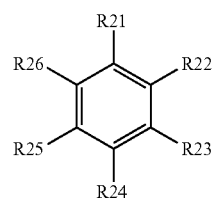
(2)

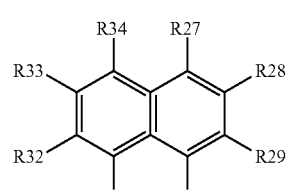
(3)

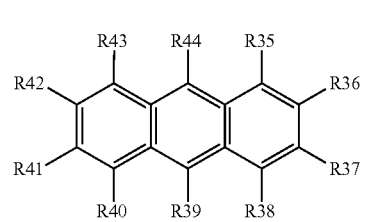
(4)

-continued

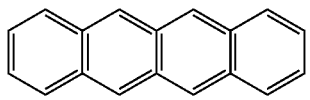
(5)

where R21 to R44 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R21 to the R26 may be bonded to one another; any two or more of the R27 to the R34 may be bonded to one another; any two or more of the R35 to the R44 may be bonded to one another; and total number of carbon atoms in each of the aromatic compounds represented by the Formula (2) to the Formula (4) is from 7 to 18 both inclusive,

(6)

where R45 is one of a divalent hydrocarbon group and a divalent halogenated hydrocarbon group,

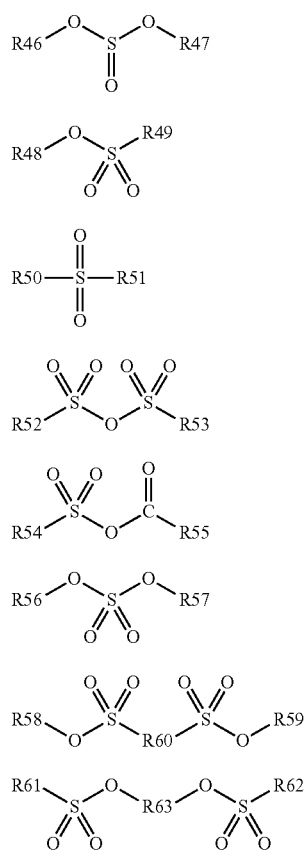

where R46 to R59, R61, and R62 are each one of a monovalent hydrocarbon group and a monovalent halogenated hydrocarbon group; R60 and R63 are each one of a divalent hydrocarbon group and a divalent halogenated hydrocarbon group; the R46 and the R47 may be bonded to each other; the R48 and the R49 may be bonded to each other; the R50 and the R51 may be bonded to each other; the R52 and the R53 may be bonded to each other; the R54 and the R55 may be bonded to each other; the R56 and the R57 may be bonded to each other; any two or more of the R58 to the R60 may be bonded to one another; and any two or more of the R61 to the R63 may be bonded to one another,

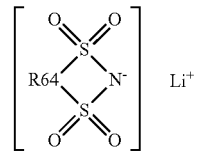
(15)

where R64 is a divalent halogenated hydrocarbon group,

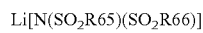
(16)

where R65 and R66 are each one of a halogen group, a monovalent hydrocarbon group, and a monovalent halogenated hydrocarbon group; and the R65, the R66, or both are each one of a halogen group and a monovalent halogenated hydrocarbon group,

(17).

According to an embodiment of the present technology, there is provided a secondary battery including: a cathode; an anode; and an electrolytic solution. The electrolytic solution includes: an unsaturated cyclic ester carbonate represented by the following Formula (1); and one or more selected from a group configured of aromatic compounds represented by the following Formula (2) to Formula (5), dinitrile compounds represented by the following Formula (6), sulfinyl compounds represented by the following Formula (7) to Formula (14), and lithium salts represented by the following Formula (15) to Formula (17),

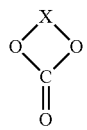
(1)

where X is a divalent group in which m-number of >C=CR1-R2 and n-number of >CR3R4 are bonded to one another in any order; R1 to R4 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R1 to the R4 may be bonded to one another; and m and n satisfy m≥1 and n≥0,

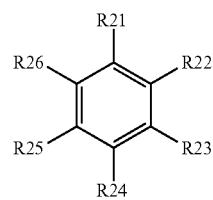
(2)

-continued

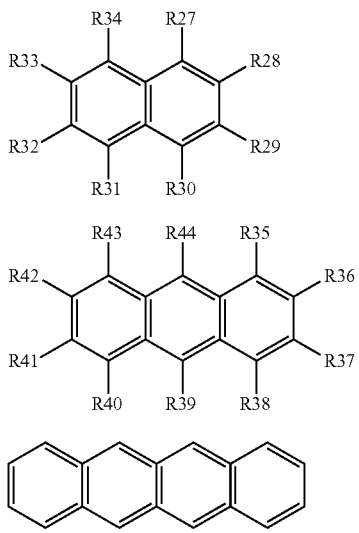

(3)

(4)

(5)

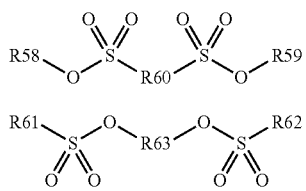

(13)

(14)

where R46 to R59, R61, and R62 are each one of a monovalent hydrocarbon group and a monovalent halogenated hydrocarbon group; R60 and R63 are each one of a divalent hydrocarbon group and a divalent halogenated hydrocarbon group; the R46 and the R47 may be bonded to each other; the R48 and the R49 may be bonded to each other; the R50 and the R51 may be bonded to each other; the R52 and the R53 may be bonded to each other; the R54 and the R55 may be bonded to each other; the R56 and the R57 may be bonded to each other; any two or more of the R58 to the R60 may be bonded to one another; and any two or more of the R61 to the R63 may be bonded to one another, where R21 to R44 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R21 to the R26 may be bonded to one another; any two or more of the R27 to the R34 may be bonded to one another; any two or more of the R35 to the R44 may be bonded to one another; and total number of carbon atoms in each of the aromatic compounds represented by the Formula (2) to the Formula (4) is from 7 to 18 both inclusive,

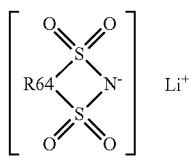

(15)

where R64 is a divalent halogenated hydrocarbon group,

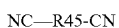 (6)

where R45 is one of a divalent hydrocarbon group and a divalent halogenated hydrocarbon group,

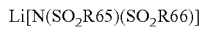 (16)

where R65 and R66 are each one of a halogen group, a monovalent hydrocarbon group, and a monovalent halogenated hydrocarbon group; and the R65, the R66, or both are each one of a halogen group and a monovalent halogenated hydrocarbon group,

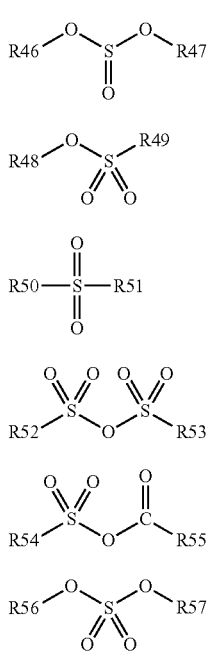

(7)

(8)

(9)

(10)

(11)

(12)

 (17).

According to an embodiment of the present technology, there is provided a battery pack including: a secondary battery; a control section controlling a used state of the secondary battery; and a switch section switching the used state of the secondary battery according to an instruction of the control section. The secondary battery includes a cathode, an anode, and an electrolytic solution. The electrolytic solution includes: an unsaturated cyclic ester carbonate represented by the following Formula (1); and one or more selected from a group configured of aromatic compounds represented by the following Formula (2) to Formula (5), dinitrile compounds represented by the following Formula (6), sulfinyl compounds represented by the following Formula (7) to Formula (14), and lithium salts represented by the following Formula (15) to Formula (17),

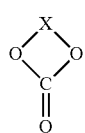 (1)

where X is a divalent group in which m-number of >C=CR1-R2 and n-number of >CR3R4 are bonded to one another in any order; R1 to R4 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R1 to the R4 may be bonded to one another; and m and n satisfy m≥1 and n≥0,

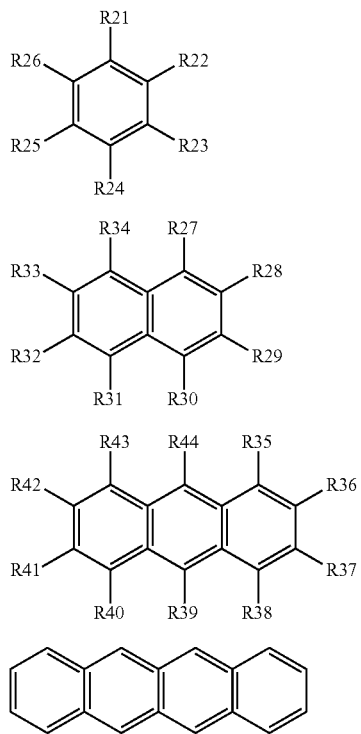

where R21 to R44 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R21 to the R26 may be bonded to one another; any two or more of the R27 to the R34 may be bonded to one another; any two or more of the R35 to the R44 may be bonded to one another; and total number of carbon atoms in each of the aromatic compounds represented by the Formula (2) to the Formula (4) is from 7 to 18 both inclusive,

NC—R45—CN  (6)

where R45 is one of a divalent hydrocarbon group and a divalent halogenated hydrocarbon group,

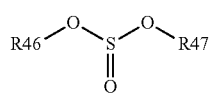

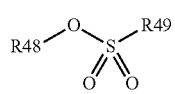

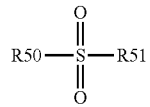

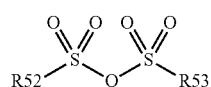

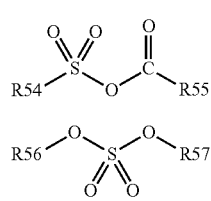

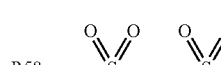

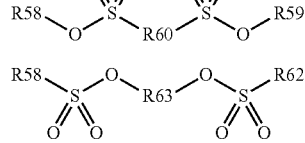

where R46 to R59, R61, and R62 are each one of a monovalent hydrocarbon group and a monovalent halogenated hydrocarbon group; R60 and R63 are each one of a divalent hydrocarbon group and a divalent halogenated hydrocarbon group; the R46 and the R47 may be bonded to each other; the R48 and the R49 may be bonded to each other; the R50 and the R51 may be bonded to each other; the R52 and the R53 may be bonded to each other; the R54 and the R55 may be bonded to each other; the R56 and the R57 may be bonded to each other; any two or more of the R58 to the R60 may be bonded to one another; and any two or more of the R61 to the R63 may be bonded to one another,

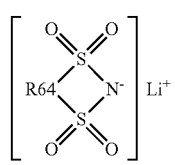

where R64 is a divalent halogenated hydrocarbon group,

Li[N(SO$_2$R65)(SO$_2$R66)]  (16)

where R65 and R66 are each one of a halogen group, a monovalent hydrocarbon group, and a monovalent halogenated hydrocarbon group; and the R65, the R66, or both are each one of a halogen group and a monovalent halogenated hydrocarbon group, Li(SO$_3$F)  (17).

According to an embodiment of the present technology, there is provided an electric vehicle including: a secondary battery; a conversion section converting electric power supplied from the secondary battery into drive power; a drive section operating according to the drive power; and a control section controlling a used state of the secondary battery. The secondary battery includes a cathode, an anode, and an electrolytic solution. The electrolytic solution includes: an unsaturated cyclic ester carbonate represented by the following Formula (1); and one or more selected from a group configured of aromatic compounds represented by the following Formula (2) to Formula (5), dinitrile compounds represented by the following Formula (6), sulfinyl compounds represented by the following Formula (7) to Formula (14), and lithium salts represented by the following Formula (15) to Formula (17),

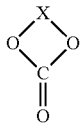
(1)

where X is a divalent group in which m-number of >C=CR1-R2 and n-number of >CR3R4 are bonded to one another in any order; R1 to R4 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R1 to the R4 may be bonded to one another; and m and n satisfy m≥1 and n≥0,

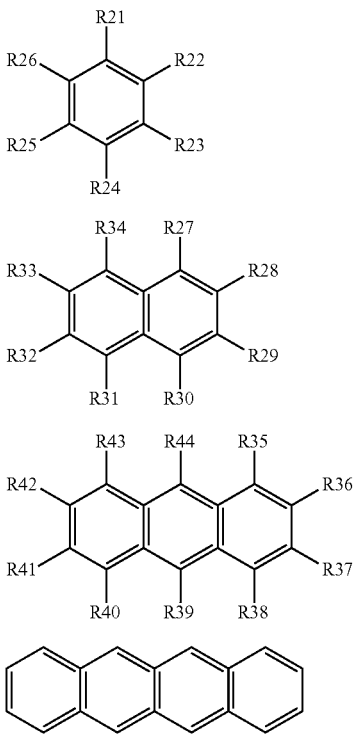

where R21 to R44 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R21 to the R26 may be bonded to one another; any two or more of the R27 to the R34 may be bonded to one another; any two or more of the R35 to the R44 may be bonded to one another; and total number of carbon atoms in each of the aromatic compounds represented by the Formula (2) to the Formula (4) is from 7 to 18 both inclusive,

NC—R45-CN   (6)

where R45 is one of a divalent hydrocarbon group and a divalent halogenated hydrocarbon group,

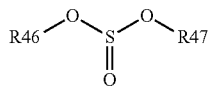
(7)

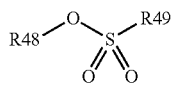
(8)

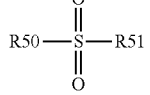
(9)

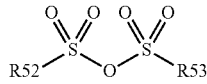
(10)

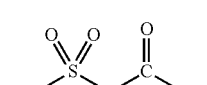
(11)

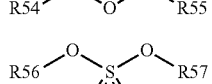
(12)

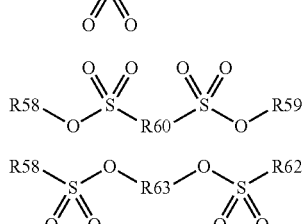
(13)

(14)

where R46 to R59, R61, and R62 are each one of a monovalent hydrocarbon group and a monovalent halogenated hydrocarbon group; R60 and R63 are each one of a divalent hydrocarbon group and a divalent halogenated hydrocarbon group; the R46 and the R47 may be bonded to each other; the R48 and the R49 may be bonded to each other; the R50 and the R51 may be bonded to each other; the R52 and the R53 may be bonded to each other; the R54 and the R55 may be bonded to each other; the R56 and the R57 may be bonded to each other; any two or more of the R58 to the R60 may be bonded to one another; and any two or more of the R61 to the R63 may be bonded to one another,

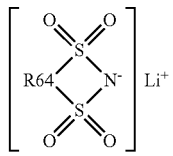
(15)

where R64 is a divalent halogenated hydrocarbon group,

Li[N(SO₂R65)(SO₂R66)]   (16)

where R65 and R66 are each one of a halogen group, a monovalent hydrocarbon group, and a monovalent halogenated hydrocarbon group; and the R65, the R66, or both are each one of a halogen group and a monovalent halogenated hydrocarbon group,

  (17).

According to an embodiment of the present technology, there is provided an electric power storage system including: a secondary battery; one or more electric devices supplied with electric power from the secondary battery; and a control section controlling the supplying of the electric power from the secondary battery to the one or more electric devices. The secondary battery includes a cathode, an anode, and an electrolytic solution. The electrolytic solution includes: an unsaturated cyclic ester carbonate represented by the following Formula (1); and one or more selected from a group configured of aromatic compounds represented by the following Formula (2) to Formula (5), dinitrile compounds represented by the following Formula (6), sulfinyl compounds represented by the following Formula (7) to Formula (14), and lithium salts represented by the following Formula (15) to Formula (17),

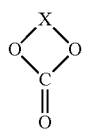  (1)

where X is a divalent group in which m-number of >C=CR1-R2 and n-number of >CR3R4 are bonded to one another in any order; R1 to R4 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R1 to the R4 may be bonded to one another; and m and n satisfy m≥1 and n≥0,

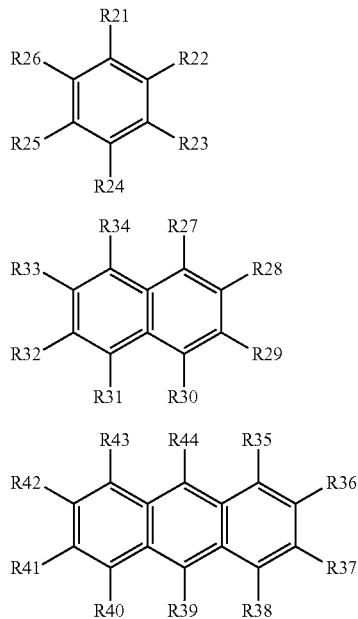

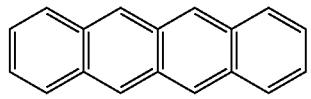  (5)

where R21 to R44 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; arbitrary two or more of the R21 to the R26 may be bonded to one another; arbitrary two or more of the R27 to the R34 may be bonded to one another; arbitrary two or more of the R35 to the R44 may be bonded to one another; and total number of carbon atoms in each of the aromatic compounds represented by the Formula (2) and the Formula (4) is from 7 to 18 both inclusive,

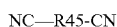  (6)

where R45 is one of a divalent hydrocarbon group and a divalent halogenated hydrocarbon group,

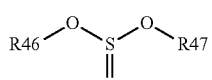  (7)

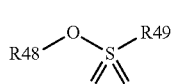  (8)

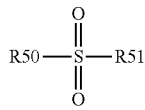  (9)

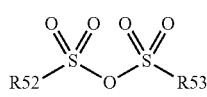  (10)

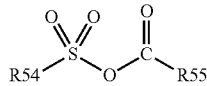  (11)

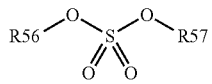  (12)

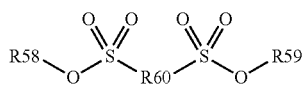  (13)

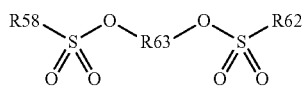  (14)

where R46 to R59, R61, and R62 are each one of a monovalent hydrocarbon group and a monovalent halogenated hydrocarbon group; R60 and R63 are each one of a divalent hydrocarbon group and a divalent halogenated hydrocarbon group; the R46 and the R47 may be bonded to each other; the R48 and the R49 may be bonded to each other; the R50 and the R51 may be bonded to each other; the R52 and the R53 may be bonded to each other; the R54 and the R55 may be bonded to each other; the R56 and the R57 may be bonded to each other; arbitrary two or more of the R58 to the R60 may be bonded to one another; and arbitrary two or more of the R61 to the R63 may be bonded to one another,

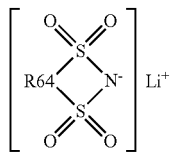 (15)

where R64 is a divalent halogenated hydrocarbon group,

Li[N(SO$_2$R65)(SO$_2$R66)]  (16)

where R65 and R66 are each one of a halogen group, a monovalent hydrocarbon group, and a monovalent halogenated hydrocarbon group; and the R65 or the R66, or both are each one of a halogen group and a monovalent halogenated hydrocarbon group, Li(SO$_3$F)  (17).

According to an embodiment of the present technology, there is provided an electric power tool including: a secondary battery; and a movable section supplied with electric power from the secondary battery. The secondary battery includes a cathode, an anode, and an electrolytic solution. The electrolytic solution includes: an unsaturated cyclic ester carbonate represented by the following Formula (1); and one or more selected from a group configured of aromatic compounds represented by the following Formula (2) to Formula (5), dinitrile compounds represented by the following Formula (6), sulfinyl compounds represented by the following Formula (7) to Formula (14), and lithium salts represented by the following Formula (15) to Formula (17),

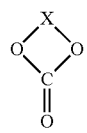 (1)

where X is a divalent group in which m-number of >C=CR1-R2 and n-number of >CR3R4 are bonded to one another in any order; R1 to R4 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R1 to the R4 may be bonded to one another; and m and n satisfy m≥1 and n≥0,

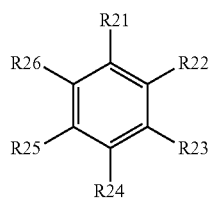 (2)

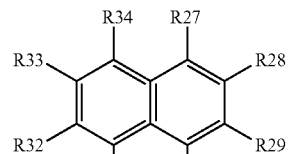 (3)

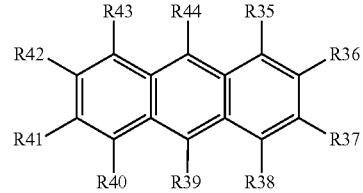 (4)

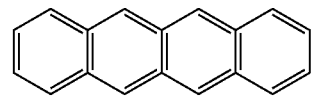 (5)

where R21 to R44 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R21 to the R26 may be bonded to one another; any two or more of the R27 to the R34 may be bonded to one another; any two or more of the R35 to the R44 may be bonded to one another; and total number of carbon atoms in each of the aromatic compounds represented by the Formula (2) to the Formula (4) is from 7 to 18 both inclusive,

NC—R45-CN  (6)

where R45 is one of a divalent hydrocarbon group and a divalent halogenated hydrocarbon group,

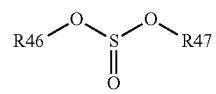 (7)

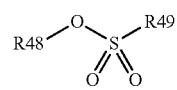 (8)

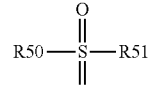 (9)

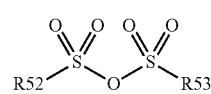 (10)

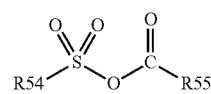 (11)

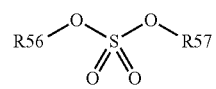 (12)

-continued

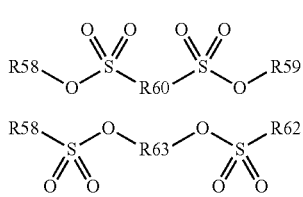
(13)

(14)

where R46 to R59, R61, and R62 are each one of a monovalent hydrocarbon group and a monovalent halogenated hydrocarbon group; R60 and R63 are each one of a divalent hydrocarbon group and a divalent halogenated hydrocarbon group; the R46 and the R47 may be bonded to each other; the R48 and the R49 may be bonded to each other; the R50 and the R51 may be bonded to each other; the R52 and the R53 may be bonded to each other; the R54 and the R55 may be bonded to each other; the R56 and the R57 may be bonded to each other; any two or more of the R58 to the R60 may be bonded to one another; and any two or more of the R61 to the R63 may be bonded to one another,

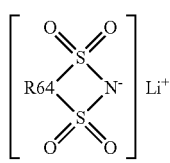
(15)

where R64 is a divalent halogenated hydrocarbon group,

Li[N(SO$_2$R65)(SO$_2$R66)]     (16)

where R65 and R66 are each one of a halogen group, a monovalent hydrocarbon group, and a monovalent halogenated hydrocarbon group; and the R65, the R66, or both are each one of a halogen group and a monovalent halogenated hydrocarbon group, Li(SO$_3$F)     (17).

According to an embodiment of the present technology, there is provided an electronic apparatus including a secondary battery as an electric power supply source. The secondary battery includes a cathode, an anode, and an electrolytic solution. The electrolytic solution includes: an unsaturated cyclic ester carbonate represented by the following Formula (1); and one or more selected from a group configured of aromatic compounds represented by the following Formula (2) to Formula (5), dinitrile compounds represented by the following Formula (6), sulfinyl compounds represented by the following Formula (7) to Formula (14), and lithium salts represented by the following Formula (15) to Formula (17),

(1)

where X is a divalent group in which m-number of >C=CR1-R2 and n-number of >CR3R4 are bonded to one another in any order; R1 to R4 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R1 to the R4 may be bonded to one another; and m and n satisfy m≥1 and n≥0,

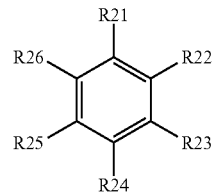
(2)

(3)

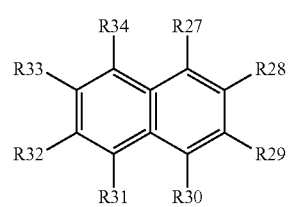

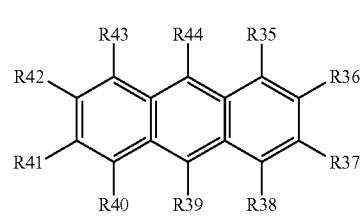
(4)

(5)

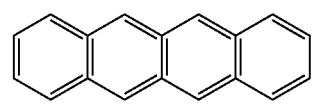

where R21 to R44 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R21 to the R26 may be bonded to one another; any two or more of the R27 to the R34 may be bonded to one another; any two or more of the R35 to the R44 may be bonded to one another; and total number of carbon atoms in each of the aromatic compounds represented by the Formula (2) to the Formula (4) is from 7 to 18 both inclusive,

NC—R45-CN     (6)

where R45 is one of a divalent hydrocarbon group and a divalent halogenated hydrocarbon group,

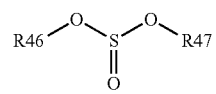
(7)

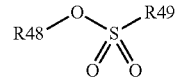
(8)

-continued

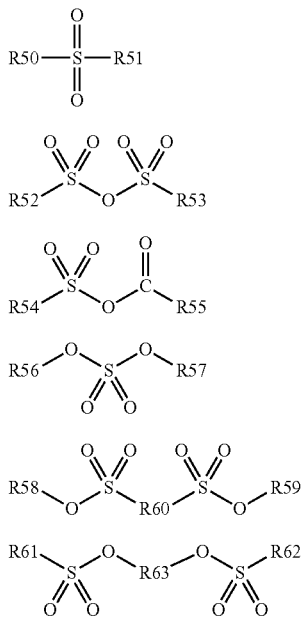

where R46 to R59, R61, and R62 are each one of a monovalent hydrocarbon group and a monovalent halogenated hydrocarbon group; R60 and R63 are each one of a divalent hydrocarbon group and a divalent halogenated hydrocarbon group; the R46 and the R47 may be bonded to each other; the R48 and the R49 may be bonded to each other; the R50 and the R51 may be bonded to each other; the R52 and the R53 may be bonded to each other; the R54 and the R55 may be bonded to each other; the R56 and the R57 may be bonded to each other; any two or more of the R58 to the R60 may be bonded to one another; and any two or more of the R61 to the R63 may be bonded to one another,

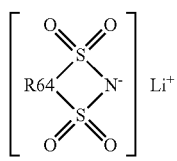         (15)

where R64 is a divalent halogenated hydrocarbon group,

where R65 and R66 are each one of a halogen group, a monovalent hydrocarbon group, and a monovalent halogenated hydrocarbon group; and the R65, the R66, or both are each one of a halogen group and a monovalent halogenated hydrocarbon group,

According to the electrolytic solution and the secondary battery according to the embodiments of the present technology, the electrolytic solution includes the unsaturated cyclic ester carbonate and one or more selected from the group configured of the aromatic compounds, the dinitrile compounds, the sulfinyl compounds, and the lithium salts. Therefore, superior battery characteristics are obtained. According to the battery pack, the electric vehicle, the electric power storage system, the electric power tool, and the electronic apparatus according to the embodiments of the present technology, superior battery characteristics are also obtained.

It is to be understood that both the foregoing general description and the following detailed description are exemplary, and are intended to provide further explanation of the technology as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
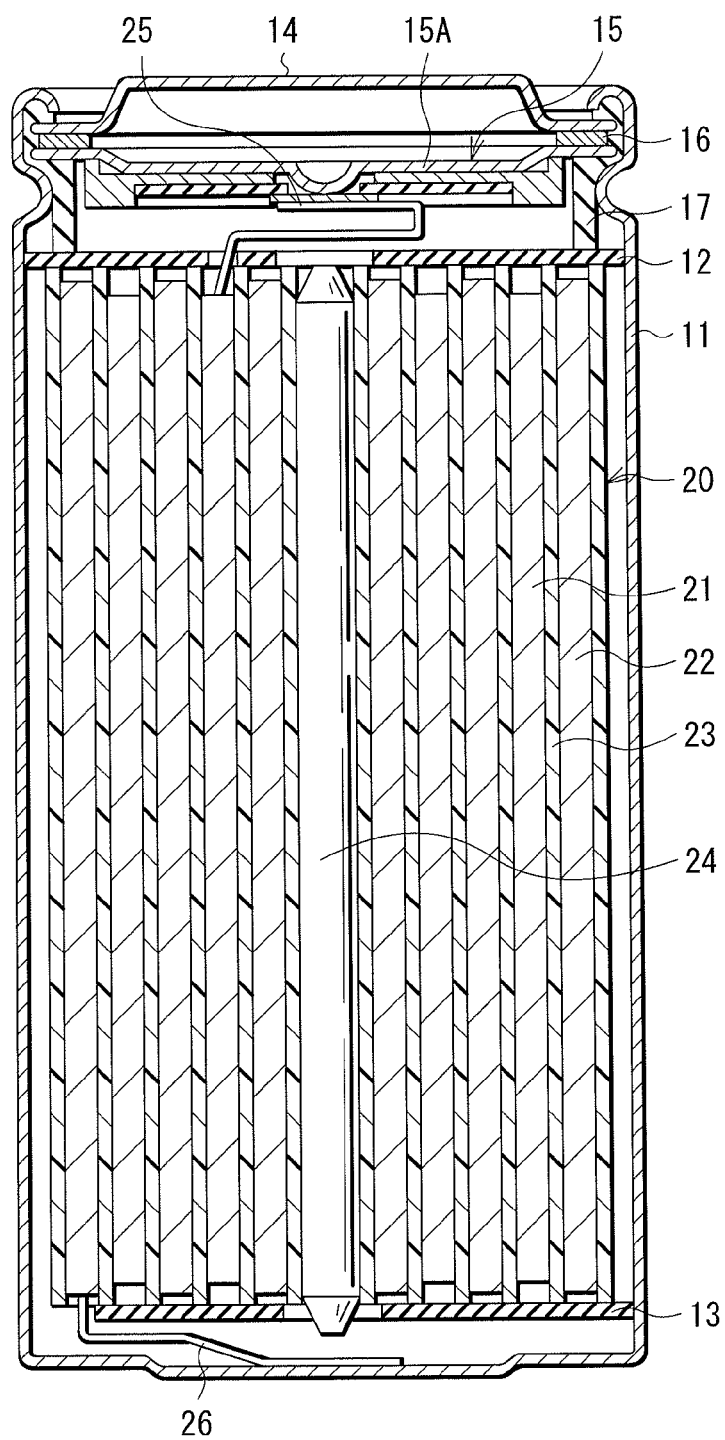
FIG. 1 is a cross-sectional view illustrating a configuration of a secondary battery (cylindrical type) that uses an electrolytic solution according to an embodiment of the present technology.

Preferred embodiments of the present technology will be hereinafter described in detail with reference to the drawings. Description will be given in the following order.
1. Electrolytic Solution and Secondary Battery
  1-1. Lithium Ion Secondary Battery (Cylindrical Type)
  1-2. Lithium Ion Secondary Battery (Laminated Film Type)
  1-3. Lithium Metal Secondary Battery (Cylindrical Type and Laminated Film Type)
2. Applications of Secondary Battery
  2-1. Battery Pack
  2-2. Electric Vehicle
  2-3. Electric Power Storage System
  2-4. Electric Power Tool
[1. Electrolytic Solution and Secondary Battery]
First, description will be given of a secondary battery that uses an electrolytic solution according to an embodiment of the present technology.
[1-1. Lithium Ion Secondary Battery (Cylindrical Type)]
FIG. 1 and FIG. 2 each illustrate a cross-sectional configuration of a secondary battery. FIG. 2 illustrates an enlarged part of a spirally wound electrode body 20 illustrated in FIG. 1.

[General Configuration of Secondary Battery]

The secondary battery described herein is a lithium ion secondary battery in which a capacity of an anode 22 is obtained by insertion and extraction of lithium (lithium ions) that is an electrode reactant.

The secondary battery described in the present embodiment may be, for example, of a so-called cylindrical type. In the secondary battery, the spirally wound electrode body 20 and a pair of insulating plates 12 and 13 are contained in a battery can 11 that has a shape of a substantially hollow cylinder. The spirally wound electrode body 20 may be configured of, for example, a cathode 21 and the anode 22 that are laminated with a separator 23 in between and are spirally wound.

The battery can 11 has a hollow structure in which one end of the battery can 11 is closed and the other end thereof is open. The battery can 11 may be formed of, for example, iron, aluminum, an alloy thereof, and/or the like. The surface of the battery can 11 may be plated with a metal material such as nickel. The pair of insulating plates 12 and 13 is arranged so as to sandwich the spirally wound electrode body 20 in between, and so as to extend perpendicularly with respect to the spirally wound periphery surface thereof.

At the open end of the battery can 11, a battery cover 14, a safety valve mechanism 15, and a positive temperature coefficient device (PTC device) 16 are attached by being swaged with a gasket 17. The battery can 11 is hermetically sealed. The battery cover 14 may be formed of, for example, a material similar to that of the battery can 11. The safety valve mechanism 15 and the PTC device 16 are provided inside the battery cover 14. The safety valve mechanism 15 is electrically connected to the battery cover 14 through the PTC device 16. In the safety valve mechanism 15, when an internal pressure becomes a certain level or higher, for example, due to reasons such as internal short circuit and external heating, a disk plate 15A inverts to cut electric connection between the battery cover 14 and the spirally wound electrode body 20. The PTC device 16 prevents abnormal heating resulting from a large current. The PTC device 16 is so configured that the resistance thereof is increased as the temperature rises. The gasket 17 may be formed of, for example, an insulating material. The surface of the gasket 17 may be coated with asphalt, for example.

A center pin 24 may be inserted in the center of the spirally wound electrode body 20. The cathode 21 may be connected to, for example, a cathode lead 25 formed of an electrically-conductive material such as aluminum, and the anode 22 may be connected to, for example, an anode lead 26 formed of an electrically-conductive material such as nickel. The cathode lead 25 is attached to the safety valve mechanism 15 and is electrically connected to the battery cover 14. The anode lead 26 is attached to the battery can 11 and is electrically connected to the battery can 11.

[Cathode]

The cathode 21 may be configured of, for example, a cathode current collector 21A and a cathode active material layer 21B that is provided on (one or both surfaces of) the cathode current collector 21A. The cathode current collector 21A may be formed of, for example, an electrically-conductive material such as aluminum, nickel, and stainless steel.

The cathode active material layer 21B includes, as a cathode active material, one or more of cathode materials that are capable of inserting and extracting lithium ions. The cathode active material layer 21B may include other materials such as a cathode binder and a cathode conductive agent where appropriate.

The cathode material is preferably a lithium-containing compound. Thus, high energy density is obtained. The lithium-containing compound may be, for example, a compound such as a lithium transition metal composite oxide and a lithium transition metal phosphate compound. The lithium transition metal composite oxide is an oxide that includes Li and one or more transition metal elements as constituent elements. The lithium transition metal phosphate compound is a compound that includes Li and one or more transition elements as constituent elements. In particular, the transition metal is preferably one or more of elements such as Co, Ni, Mn, and Fe. Thus, higher voltage is obtained. The chemical formulas of the compounds may be, for example, one of $Li_xM1O_2$ and $Li_yM2PO_4$. In the formulas, M1 and M2 each represent one or more transition metal elements. The values of x and y vary depending on the charge and discharge states of the battery. However, the values of x and y generally satisfy $0.05 \leq x \leq 1.10$ and $0.05 \leq y \leq 1.10$.

Examples of the lithium transition metal composite oxide include $LiCoO_2$, $LiNiO_2$, and lithium-nickel-based composite oxides represented by Formula (50) below. Examples of the lithium transition metal phosphate compound include $LiFePO_4$ and $LiFe_{1-u}Mn_uPO_4$ (u<1). Thus, high battery capacity and superior cycle characteristics are obtained. However, lithium transition metal composite oxides and lithium transition metal phosphate compounds other than those described above may also be used.

$$LiNi_{1-z}M_zO_2 \qquad (50)$$

(M is one or more of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb, and Nb, and z satisfies 0.005<z<0.5.)

Other than the above-described materials, the cathode material may be, for example, oxides, disulfides, calcogenides, and electrically-conductive polymers. Examples of the oxides include titanium oxide, vanadium oxide, and manganese dioxide. Examples of the disulfides include titanium disulfide and molybdenum sulfide. Examples of the calcogenides include niobium selenide. Examples of the electrically-conductive copolymer include sulfur, polyaniline, and polythiophene. However, the cathode material may be materials other than those described above as long as the material is capable of inserting and extracting lithium ions.

The cathode binder may include, for example, one or more of synthetic rubbers and polymer materials. Examples of the synthetic rubbers include styrene-butadiene-based rubber, fluorine-based rubber, and ethylene propylene diene. Examples of the polymer materials include polyvinylidene fluoride and polyimide.

The cathode conductive agent may be, for example, one or more of materials such as carbon materials. Examples of the carbon materials include graphite, carbon black, acetylene black, and Ketjen black. It is to be noted that the cathode conductive agent may be metal materials or electrically-conductive polymers as long as the material has electrical conductivity.

[Anode]

The anode 22 may be configured of, for example, an anode current collector 22A and an anode active material layer 22B that is provided on one or both surfaces of the anode current collector 22A.

The anode current collector 22A may be formed of, for example, an electrically-conductive material such as copper, nickel, and stainless steel. The surface of the anode current collector 22A is preferably roughened, since adhesive characteristics of the anode active material layer 22B with respect to the anode current collector 22A is improved due to a so-called anchor effect. In this case, it may be enough that the surface of the anode current collector 22A in a region opposed to the anode active material layer 22B is roughened at least. Examples of roughening methods include a method of forming fine particles by electrolytic treatment. The electrolytic treatment is a method of providing concavity and convexity by forming fine particles on the surface of the anode current collector 22A by an electrolytic method in an electrolytic bath. A copper foil formed by the electrolytic method is generally called "electrolytic copper foil".

The anode active material layer 22B includes, as an anode active material, one or more of anode materials that are capable of inserting and extracting lithium ions. The anode active material layer 22B may include other materials such as an anode binder and an anode conductive agent where appropriate. Details of the anode binder and the anode conductive agent may be, for example, similar to those of the cathode binder and the cathode conductive agent, respectively. A chargeable capacity of the anode material is preferably larger than a discharge capacity of the cathode 21, so as to prevent unintentional precipitation of lithium metal at the time of charge and discharge.

The anode material may be, for example, a carbon material. One reason for this is that, in the carbon material, a change in crystal structure at the time of insertion and extraction of lithium ions is extremely small, and therefore, the carbon material provides high energy density and superior cycle characteristics. Another reason is that the carbon material also functions as an anode conductive agent. Examples of the carbon material include graphitizable carbon, non-graphitizable carbon in which the spacing of (002) plane is equal to or larger than 0.37 nm, and graphite in which the spacing of (002) plane is equal to or smaller than 0.34 nm. More specifically, examples of the carbon material include pyrolytic carbons, cokes, glassy carbon fiber, an organic polymer compound fired body, activated carbon, and carbon blacks. Of the foregoing, examples of the cokes include pitch coke, needle coke, and petroleum coke. The organic polymer compound fired body is a material in which a polymer compound such as phenol resin and furan resin is fired (carbonized) at appropriate temperature. In addition to the above-mentioned materials, the carbon material may be low crystalline carbon or amorphous carbon that are heat-treated at temperature equal to or lower than about 1000° C. It is to be noted that the shape of the carbon material may be any of a fibrous shape, a spherical shape, a granular shape, and a scale-like shape.

Further, the anode material may be, for example, a material (metal-based material) that includes one or more of metal elements and metalloid elements as constituent elements, since high energy density is thereby obtained. The metal-based material may be a simple substance, an alloy, or a compound, may be two or more thereof, or may have one or more phases thereof in part or all of the material. It is to be noted that "alloy" includes a material that includes one or more metal elements and one or more metalloid elements, in addition to a material configured of two or more metal elements. Further, "alloy" may contain a non-metal element. Example of a texture thereof include a solid solution, a eutectic crystal (eutectic mixture), an intermetallic compound, and a texture in which two or more thereof coexist.

The above-described metal element and metalloid element may be, for example, one or more of metal elements and metalloid elements that are capable of forming an alloy with lithium. Specific examples thereof include Mg, B, Al, Ga, In, Si, Ge, Sn, Pb, Bi, Cd, Ag, Zn, Hf, Zr, Y, Pd, and Pt. In particular, one or both of Si and Sn are preferably used. Si and Sn have a high ability of inserting and extracting lithium ions, and therefore provide high energy density.

A material that includes one or both of Si and Sn may be a simple substance, an alloy, or a compound of Si or Sn; two or more thereof; or a material that has one or more phases thereof in part or all of the material. It is to be noted that "simple substance" merely refers to a simple substance in a general meaning (a small amount of impurity may be contained therein), and does not necessarily refer to a simple substance of a purity 100%.

The alloy of Si may be, for example, a material that includes one or more of elements such as Sn, Ni, Cu, Fe, Co, Mn, Zn, In, Ag, Ti, Ge, Bi, Sb, and Cr as constituent elements other than Si. The compounds of Si may be, for example, a material that includes one or more elements such as C and O as constituent elements other than Si. It is to be noted that the compound of Si may include, for example, one or more of the elements described for the alloys of Si as constituent elements other than Si.

Examples of the alloys and the compounds of Si include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0 \leq v \leq 2$), and LiSiO. It is to be noted that v in $SiO_v$ may satisfy $0.2 < v < 1.4$.

Examples of the alloys of Sn include a material that includes one or more of elements such as Si, Ni, Cu, Fe, Co, Mn, Zn, In, Ag, Ti, Ge, Bi, Sb, and Cr as constituent elements other than Sn. Examples of the compounds of Sn include a material that includes one or more of elements such as C and O as constituent elements. It is to be noted that the compounds of Sn may contain, for example, one or more of the elements described for the alloys of Sn as constituent elements other than Sn. Examples of the alloys and the compounds of Sn include $SnO_w$ ($0 < w \leq 2$), $SnSiO_3$, LiSnO, and $Mg_2Sn$.

Further, as a material that includes Sn, for example, it is preferable to use a material that includes Sn as a first constituent element and includes a second constituent element and a third constituent element in addition thereto. The second constituent element may be, for example, one or more of elements such as Co, Fe, Mg, Ti, V, Cr, Mn, Ni, Cu, Zn, Ga, Zr, Nb, Mo, Ag, In, Ce, Hf, Ta, W, Bi, and Si. The third constituent element may be, for example, one or more of elements such as B, C, Al, and P. When the material that includes Sn includes the second and third constituent elements, for example, a high battery capacity, superior cycle characteristics, and the like are obtained.

In particular, the material that includes Sn is preferably a material (SnCoC-containing material) that includes Sn, Co, and C as constituent elements. Concerning the composition of the SnCoC-containing material, for example, the C content may be from 9.9 mass % to 29.7 mass % both inclusive, and the ratio of Sn and Co contents (Co/(Sn+Co)) may be from 20 mass % to 70 mass % both inclusive, since such a composition range provides high energy density.

The SnCoC-containing material includes a phase that includes Sn, Co, and C. The phase is preferably low crystalline or amorphous. The phase is a reactive phase capable of reacting with lithium, and further superior characteristics are obtained by the presence of the phase. A half bandwidth of a diffraction peak of the phase obtained by X-ray diffraction is preferably 1° or larger at a diffraction angle of 2θ in the case where a CuKα ray is used as a specific X ray and the sweep rate is 1°/min. This allows lithium ions to be inserted and extracted more smoothly, and reduces reactivity with the electrolytic solution. It is to be noted that the SnCoC-containing material may include a phase that includes the simple substance of each constituent element or part of the constituent elements in addition to a low crystalline phase or an amorphous phase.

Whether or not the diffraction peak obtained by X-ray diffraction corresponds to a reactive phase capable of reacting with lithium is easily determined by comparing X-ray diffraction charts before and after electrochemical reaction with lithium. For example, when the position of the diffraction peak before the electrochemical reaction with lithium is different from that after the electrochemical reaction, the diffraction peak corresponds to a reactive phase capable of reacting with lithium. In this case, for example, the diffraction peak of a low crystalline reactive phase or an amorphous reactive phase may be detected within a range of $2\theta=20°$ to $50°$. Such a reactive phase may include, for example, the above-described constituent elements, and is considered to be changed to be low crystalline or amorphous mainly due to the presence of carbon.

In the SnCoC-containing material, part or all of carbon which is a constituent element is preferably bonded to a metal element or a metalloid element which is another constituent element. Thus, aggregation and crystallization of, for example, materials such as tin is suppressed. The bonding state of elements may be determined by, for example, X-ray photoelectron spectroscopy (XPS). In a commercially-available apparatus, for example, an Al—K$\alpha$ ray or an Mg—K$\alpha$ ray may be used as a soft X ray. In the case where part or all of carbon is bonded to an element such as a metal element and a metalloid element, the peak of a composite wave of the 1s orbit (C1s) of C is observed in a region lower than 284.5 eV. It is to be noted that energy calibration is performed so as to allow the peak of the 4f orbit (Au4f) of a gold atom to be obtained at 84.0 eV. In this case, typically, since surface contamination carbon is present on a material surface, the peak of C1s of the surface contamination carbon is defined at 284.8 eV, and is used as an energy reference. In XPS measurement, the waveform of the peak of C1s is obtained in a form that includes the peak of the surface contamination carbon and the peak of carbon in the SnCoC-containing material. Therefore, the peak of the surface contamination carbon and the peak of carbon in the SnCoC-containing material are separated, for example, by analysis with the use of commercially-available software. In the analysis of the waveform, the position of a main peak that is in a region closer to the lowest binding energy is used as the energy reference (284.8 eV).

It is to be noted that SnCoC-containing material is not limited to a material (SnCoC) that is configured only of Sn, Co, and C. In other words, the SnCoC-containing material may further include, for example, one or more of elements such as Si, Fe, Ni, Cr, In, Nb, Ge, Ti, Mo, Al, P, Ga, and Bi as constituent elements where appropriate.

In addition to the SnCoC-containing material, a material (SnCoFeC-containing material) that includes Sn, Co, Fe, and C as constituent elements is also preferable. The composition of the SnCoFeC-containing material may be arbitrarily set. For example, in the composition in which the Fe content is set smaller, the C content may be from 9.9 mass % to 29.7 mass % both inclusive, the Fe content may be from 0.3 mass % to 5.9 mass % both inclusive, and the ratio of contents of Sn and Co (Co/(Sn+Co)) may be from 30 mass % to 70 mass % both inclusive. Further, for example, in the composition in which the Fe content is set larger, the C content may be from 11.9 mass % to 29.7 mass % both inclusive, the ratio of contents of Sn, Co, and Fe ((Co+Fe)/(Sn+Co+Fe)) may be from 26.4 mass % to 48.5 mass % both inclusive, and the ratio of contents of Co and Fe (Co/(Co+Fe)) may be from 9.9 mass % to 79.5 mass % both inclusive. In such a composition range, high energy density is obtained. The physical properties (such as half bandwidth) of the SnCoFeC-containing material are similar to those of the above-described SnCoC-containing material.

In addition to the above-mentioned materials, the anode material may be, for example, a material such as a metal oxide and a polymer compound. Examples of the metal oxide include iron oxide, ruthenium oxide, and molybdenum oxide. Examples of the polymer compound include polyacetylene, polyaniline, and polypyrrole.

The anode active material layer 22B may be formed by, for example, a coating method, a vapor-phase method, a liquid-phase method, a spraying method, a firing method (sintering method), or a combination of two or more of these methods. The coating method may be, for example, a method in which, after a particulate (powder) anode active material is mixed with materials such as the anode binder, the mixture is dispersed in a solvent such as an organic solvent, and the anode current collector is coated with the resultant. Examples of the vapor-phase method include a physical deposition method and a chemical deposition method. Specifically, examples thereof include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase method include an electrolytic plating method and an electroless plating method. The spraying method may be, for example, a method in which an anode active material in a fused state or a semi-fused state is sprayed. The firing method may be, for example, a method in which, after the anode current collector is coated by a coating method, heat treatment is performed at temperature higher than the melting point of the materials such as the anode binder. As the firing method, a publicly-known technique may be used. Examples of such methods include an atmosphere firing method, a reactive firing method, and a hot press firing method.

In the secondary battery, as described above, in order to prevent unintentional precipitation of lithium metal on the anode 22 in the middle of charge, the electrochemical equivalent of the anode material capable of inserting and extracting lithium ions is larger than the electrochemical equivalent of the cathode. Further, the open circuit voltage (that is, a battery voltage) at the time of completely-charged state is equal to or greater than 4.25 V, the extraction amount of lithium ions per unit mass is larger than that in the case where the open circuit voltage is 4.20 V even if the same cathode active material is used. Therefore, amounts of the cathode active material and the anode active material are adjusted in accordance therewith. Thus, high energy density is obtained.

[Separator]

The separator 23 separates the cathode 21 from the anode 22, and passes lithium ions while preventing current short circuit resulting from contact of the both electrodes. The separator 23 may be, for example, a porous film made of a material such as a synthetic resin and ceramics. The separator 23 may be a laminated film in which two or more porous films are laminated. Examples of the synthetic resin include polytetrafluoroethylene, polypropylene, and polyethylene.

In particular, the separator 23 may include, for example, the above-described porous film (base material), and a polymer compound layer that is provided on one or both surfaces of the base material layer. Thus, adhesive characteristics of the separator 23 with respect to the cathode 21 and the anode 22 are improved, and therefore, distortion of the spirally wound electrode body 20 which is a spirally wound body is suppressed. Hence, a decomposition reaction of the electrolytic solution is suppressed, and liquid leakage of the electrolytic solution with which the base material layer is impregnated is suppressed. Accordingly, the resistance of the secondary battery is less likely to be increased, and battery swollenness is suppressed even if the battery is charged and discharged repeatedly.

The polymer compound layer may include, for example, a polymer material such as polyvinylidene fluoride, since such a polymer material has a superior physical strength and is electrochemically stable. However, the polymer material may be a material other than polyvinylidene fluoride. The polymer compound layer may be formed, for example, by preparing a solution in which the polymer material is dissolved, then coating the surface of the base material layer with the solution, and drying the resultant. It is to be noted that the base material layer may be soaked in the solution and then be dried.

[Electrolytic Solution]

The separator 23 is impregnated with the electrolytic solution that is an liquid electrolyte. The electrolytic solution includes an unsaturated cyclic ester carbonate represented by the following Formula (1), and one or more selected from a group configured of aromatic compounds represented by the following Formula (2) to Formula (5), dinitrile compounds represented by the following Formula (6), sulfinyl compounds represented by the following Formula (7) to Formula (14), and lithium salts represented by the following Formula (15) to Formula (17) (hereinafter, also collectively referred to as "aromatic compounds and the like").

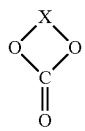

(1)

(X is a divalent group in which m-number of >C=CR1-R2 and n-number of >CR3R4 are bonded to one another in any order. R1 to R4 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group. Any two or more of the R1 to the R4 may be bonded to one another; and m and n satisfy m≥1 and n≥0.)

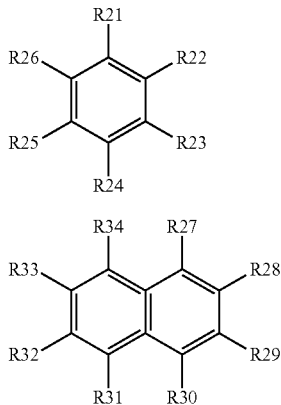

(2)

(3)

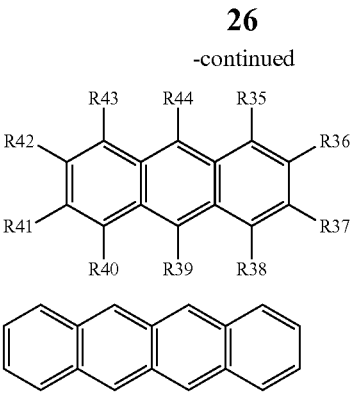

(4)

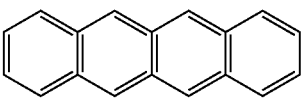

(5)

(R21 to R44 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group. Any two or more of R21 to R26 may be bonded to one another. Any two or more of R27 to R34 may be bonded to one another. Any two or more of R35 to R44 may be bonded to one another. Total number of carbon atoms in each of the aromatic compounds represented by the Formula (2) to the Formula (4) is from 7 to 18 both inclusive.)

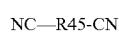

(6)

(R45 is one of a divalent hydrocarbon group and a divalent halogenated hydrocarbon group.)

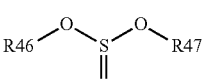

(7)

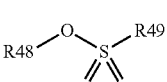

(8)

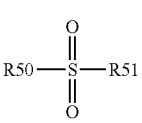

(9)

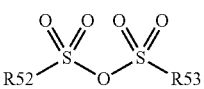

(10)

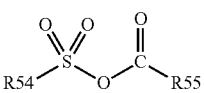

(11)

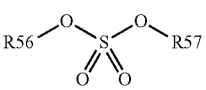

(12)

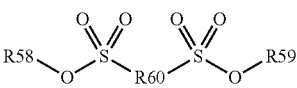

(13)

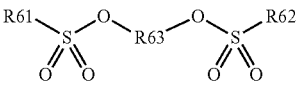

(14)

(R46 to R59, R61, and R62 are each one of a monovalent hydrocarbon group and a monovalent halogenated hydrocarbon group. R60 and R63 are each one of a divalent hydrocarbon group and a divalent halogenated hydrocarbon group. R46 and R47 may be bonded to each other. R48 and R49 may be bonded to each other. R50 and R51 may be bonded to each other. R52 and the R53 may be bonded to each other. R54 and the R55 may be bonded to each other. R56 and R57 may be bonded to each other. Any two or more of R58 to R60 may be bonded to one another. Any two or more of R61 to R63 may be bonded to one another.)

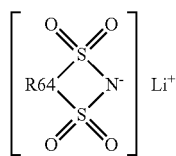

(15)

(R64 is a divalent halogenated hydrocarbon group.)

$$Li[N(SO_2R65)(SO_2R66)] \quad (16)$$

(R65 and R66 are each one of a halogen group, a monovalent hydrocarbon group, and a monovalent halogenated hydrocarbon group. R65, R66, or both are each one of a halogen group and a monovalent halogenated hydrocarbon group.)

$$Li(SO_3F) \quad (17)$$

One of the reasons why the electrolytic solution includes both the unsaturated cyclic ester carbonate and the aromatic compounds and the like is that chemical stability of the electrolytic solution is thereby significantly improved. Accordingly, the decomposition reaction of the electrolytic solution is significantly suppressed and the battery characteristics are improved.

In detail, when the electrolytic solution includes the unsaturated cyclic ester carbonate, a rigid film is formed on the surface of the anode 22 due to the unsaturated cyclic ester carbonate at the time of charge and discharge. Therefore, the anode 22 is protected from the electrolytic solution. In addition thereto, when the electrolytic solution includes the aromatic compounds and the like, the above-described film is easily maintained even when the battery is charged and discharged repeatedly. Thus, the decomposition reaction of the electrolytic solution due to reactivity of the anode active material becomes difficult to progress. Accordingly, degradation in battery characteristics is suppressed.

[Unsaturated Cyclic Ester Carbonate]

An unsaturated cyclic ester carbonate is a cyclic ester carbonate that has one or more carbon-carbon double bonds (>C=C<).

X in Formula (1) is a group in which m-number of >C=CR1-R2 and n-number of >CR3R4 are bonded to one another so that the group is a divalent group as a whole (the group has an uncombined hand on each of both ends thereof). The adjacent groups (groups to be bonded to each other) may be the same group, for example, as a case where both groups are >C=CR1-R2. Alternatively, the adjacent groups may be different groups, for example, as a case where one group is >C=CR1-R2 and the other group is >CR3R4. In other words, the number (m) of >C=CR1-R2 and the number (n) of >CR3R4 that are used to form a divalent group are set arbitrarily and the bonding order thereof is also arbitrary.

>C=CR1-R2 is a divalent unsaturated group that has the above-described carbon-carbon double bond. On the other hand, >CR3R4 is a divalent saturated group that does not have any carbon-carbon double bond. Here, >CR3R4, which is a saturated group, may not be included in X since n is equal to or larger than 0. However, one or more >C=CR1-R2, which are unsaturated groups, are included in X since m is equal to or larger than 1. Therefore, X may be configured of only >C=CR1-R2, or may be configured of both >C=CR1-R2 and >CR3R4. One reason for this is that the unsaturated cyclic ester carbonate may need to have one or more unsaturated groups in the chemical structure thereof.

The values of m and n are not specifically limited as long as the values satisfy the conditions of m≥1 and n≥0. In particular, when >C=CR1-R2 is >C=CH$_2$ and >CR3R4 is >CH$_2$, the values of m and n preferably satisfy a condition of (m+n)≤ 5. Thus, the carbon number of X is not excessively large. Therefore, solubility and compatibility of the unsaturated cyclic ester carbonate are secured.

It is to be noted that arbitrary two or more of R1 to R4 in >C=CR1-R2 and >CR3R4 are bonded to one another and the bonded groups may form a ring. For example, R1 and R2 may be bonded to each other, R3 and R4 may be bonded to each other, and R2 and R3 or R4 may be bonded to each other.

Details of R1 to R4 are as follows. It is to be noted that R1 to R4 may be the same type of group or may be different types of group. Alternatively, arbitrary two or three of R1 to R4 may be the same type of group.

The type of each of R1 to R4 is not specifically limited as long as R1 to R4 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group. One reason for this is that, when X has one or more carbon-carbon double bonds (>C=CR1-R2), the above-described advantages are obtained irrespective of the types of R1 to R4.

The halogen group includes, for example, one or more of groups such as a fluorine group (—F), a chlorine group (—Cl), a bromine group (—Br), and an iodine group (—I). In particular, a fluorine group is preferable since a film due to the unsaturated cyclic ester carbonate is thereby easily formed.

"Hydrocarbon group" collectively refers to a group configured of C and H, and may be a linier group or may be a branched group that has one or more side chains. Examples of the monovalent hydrocarbon group include an alkyl group with carbon number from 1 to 12 both inclusive, an alkenyl group with carbon number from 2 to 12 both inclusive, an alkynyl group with carbon number from 2 to 12 both inclusive, an aryl group with carbon number from 6 to 18 both inclusive, and cycloalkyl group with carbon number from 3 to 18 both inclusive. Thus, the above-described advantages are obtained while solubility, compatibility, etc. of the unsaturated cyclic ester carbonate are secured.

More specifically, examples of the alkyl group include a methyl group (—CH$_3$), an ethyl group (—C$_2$H$_5$), and a propyl group (—C$_3$H$_7$). Examples of the alkenyl group include a vinyl group (—CH=CH$_2$) and an allyl group (—CH$_2$—CH=CF$_{12}$). Examples of the alkynyl group include an ethynyl group (—CH≡CH). Examples of the aryl group include a phenyl group and a naphtyl group. Examples of the cycloalkyl group include a cyclopropyl group, a cyclobutyl group, a cyclopentyl group, a cyclohexyl group, a cycloheptyl group, and a cyclooctyl group.

"Oxygen-containing hydrocarbon group" is a group configured of C and H, and O. Examples of the monovalent oxygen-containing hydrocarbon group include an alkoxy group with carbon number from 1 to 12 both inclusive. Thus, the above-described advantages are obtained while, for example, solubility, compatibility, and the like of the unsaturated cyclic ester carbonate are secured. More specifically, examples of the alkoxy group include a methoxy group (—OCH$_3$) and an ethoxy group (—OC$_2$H$_5$).

It is to be noted that a group obtained by bonding two or more of the above-described alkyl group and the like to one another so that the obtained group is a monovalent group as a whole may be used. Examples thereof include a group in which an alkyl group and an aryl group are bonded to each other, and a group in which an alkyl group and a cycloalkyl group are bonded to each other. More specifically, the group in which an alkyl group and an aryl group are bonded to each other may be, for example, a benzyl group "Monovalent halogenated hydrocarbon group" is a group obtained by substituting each of part or all of hydrogen groups (—H) of any of the above-described monovalent hydrocarbon groups by a halogen group (halogenating). The types of the halogen group are as described above. Similarly, "monovalent halogenated oxygen-containing hydrocarbon group" refers to a group obtained by substituting each of part or all of hydrogen groups of any of the above-described monovalent oxygen-containing hydrocarbon group by a halogen group. The types of the halogen group are as described above.

More specifically, examples of a group obtained by halogenating a group such as an alkyl group include a trifluoromethyl group (—CF$_3$) and a pentafluoroethyl group (—C$_2$F$_5$). Further, examples of the monovalent halogenated oxygen-containing hydrocarbon group include a group obtained by substituting each of part or all of hydrogen groups of the above-described group such as an alkoxy group by a halogen group. More specifically, examples of the group obtained by halogenating a group such as an alkoxy group include trifluoromethoxy group (—OCF$_3$) and a pentafluoroethoxy group (—OC$_2$F$_5$).

It is to be noted that R1 to R4 each may be a group other than the above-described groups. Specifically, R1 to R4 each may be, for example, a derivative of one of the above-described series of groups. The derivative herein is a group obtained by introducing one or more substituent groups into any of the above-described series of groups. The type of the substituent group may be selected arbitrarily. The same is applicable to R5 and so on which will be described later. In other words, R5 and so on may be, for example, derivatives.

In particular, the unsaturated cyclic ester carbonate is preferably represented by one of the following Formula (18) to Formula (20). Such unsaturated cyclic ester carbonates provide the above-described advantages and are easily synthesized.

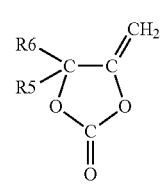

(18)

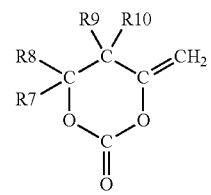

(19)

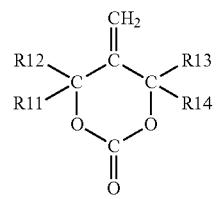

(20)

(R5 to R14 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group. R5 and R6 may be bonded to each other. Any two or more of R7 to R10 may be bonded to one another. Any two or more of R11 to R14 may be bonded to one another.)

Focusing on the relationship between Formula (1) and Formula (18), the unsaturated cyclic ester carbonate represented by Formula (18) includes, as X in Formula (1), one unsaturated group (>C=CH$_2$) corresponding to >C=CR1-R2 and one saturated group (>CR5R6) corresponding to >CR3R4. On the other hand, focusing on the relationship between Formula (1) and Formula (19) or (20), the unsaturated cyclic ester carbonate represented by Formula (19) or (20) includes, as X, one unsaturated group (>C=CH$_2$) corresponding to >C=CR1-R2 and two saturated groups (>CR7R8 and >CR9R10, or >CR11R12 and >CR13R14) corresponding to >CR3R4. It is to be noted that, concerning the one unsaturated group and the two saturated groups, >CR7R8, >CR9R10, and >C=CH$_2$ are bonded in this order in Formula (19), and >CR11R12, >C=CH$_2$, and >CR13R14 are bonded in this order in Formula (20).

Details of R5 and R6 in Formula (18), R7 to R10 in Formula (19), and R11 to R14 in Formula (20) will not be described since the details thereof are similar to those of R1 to R4 in Formula (1).

Here, specific examples of the unsaturated cyclic ester carbonate are represented by Formula (1-1) to Formula (1-56) below, and include geometric isomers thereof. However, specific examples of the unsaturated cyclic ester carbonate are not limited to those mentioned below.

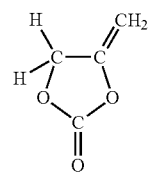

(1-1)

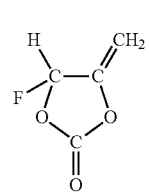

(1-2)

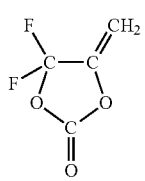 (1-3)
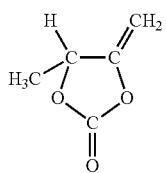 (1-4)
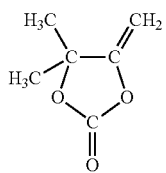 (1-5)
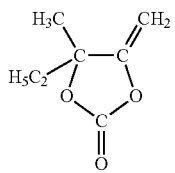 (1-6)
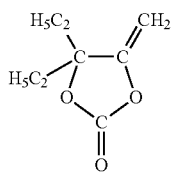 (1-7)
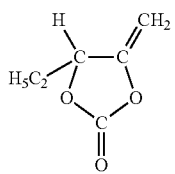 (1-8)
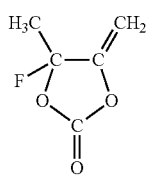 (1-9)
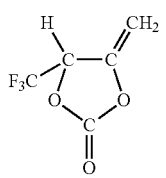 (1-10)
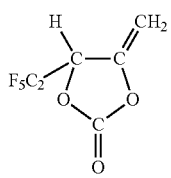 (1-11)
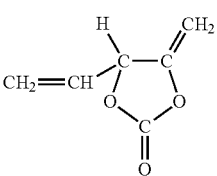 (1-12)
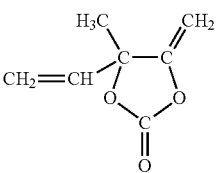 (1-13)
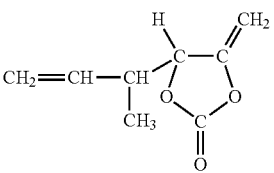 (1-14)
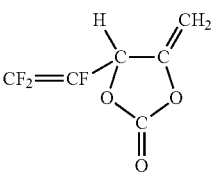 (1-15)
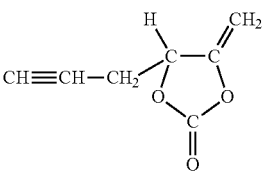 (1-16)
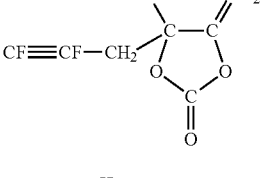 (1-17)
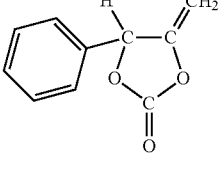 (1-18)
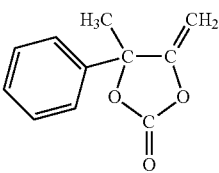 (1-19)
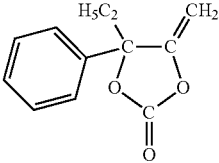 (1-20)

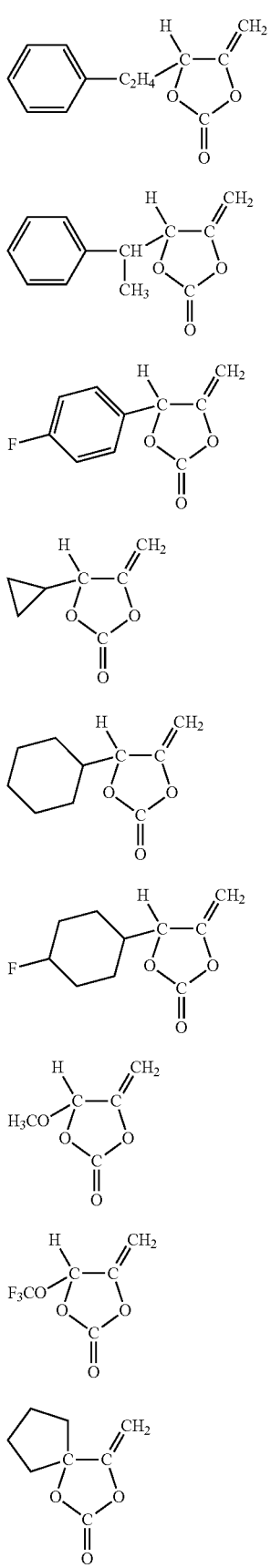
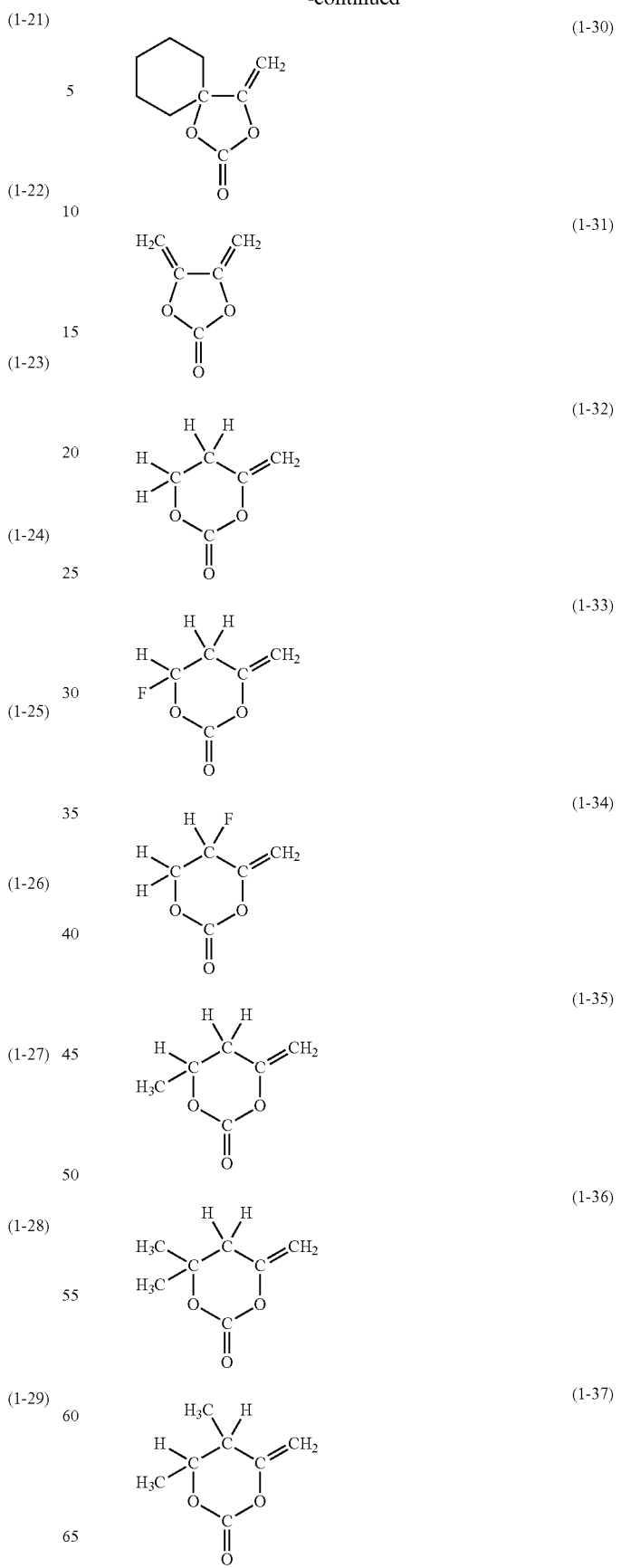

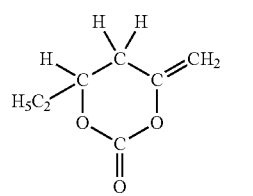 (1-38)
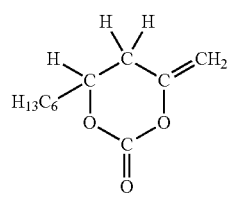 (1-39)
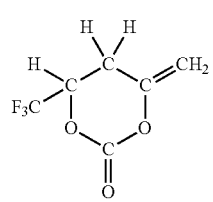 (1-40)
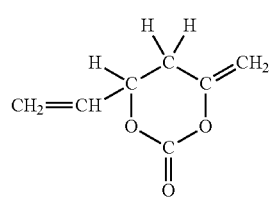 (1-41)
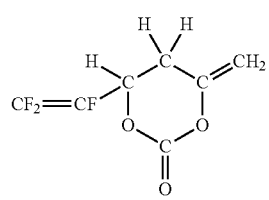 (1-42)
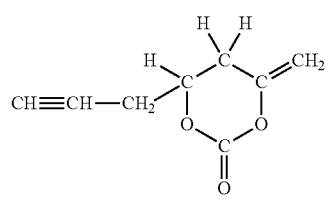 (1-43)
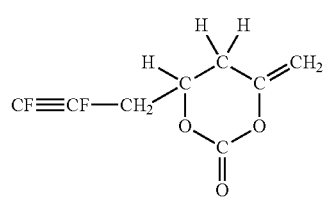 (1-44)
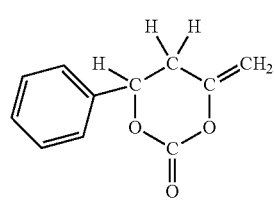 (1-45)
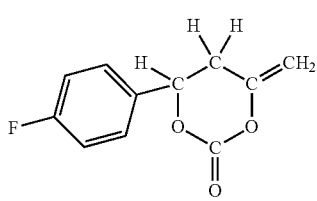 (1-46)
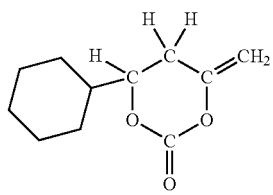 (1-47)
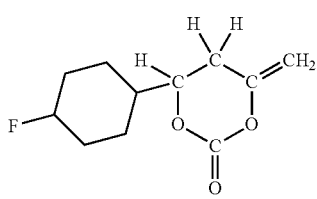 (1-48)
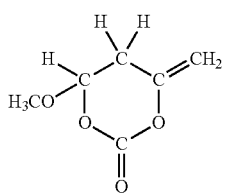 (1-49)
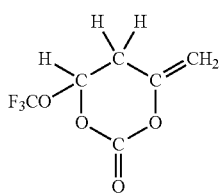 (1-50)
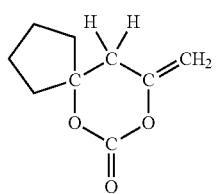 (1-51)
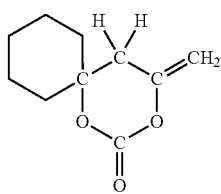 (1-52)
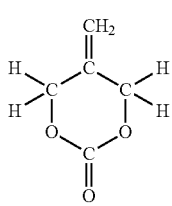 (1-53)

-continued (1-54)
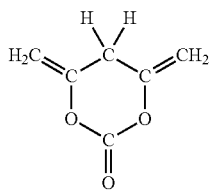

(1-55)
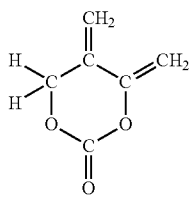

(1-56)
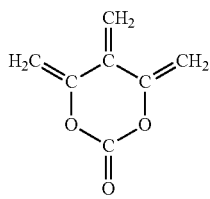

In particular, Formula (1-1) etc. corresponding to Formula (18), Formula (1-32) etc. corresponding to Formula (19), and Formula (1-53) etc. corresponding to Formula (20) are preferable, since a higher effect is thereby obtained.

A content of the unsaturated cyclic ester carbonate in the electrolytic solution is not particularly limited, however, in particular, the content thereof is preferably from 0.01 wt % to 10 wt % both inclusive, and is more preferably from 0.1 wt % to 10 wt % both inclusive. Thus, higher effect is obtained.

[Aromatic Compound]

An aromatic compound is a compound that has a single ring (one benzene ring) or a condensed ring (condensed ring of 2 to 4 benzene rings) as a main part (base). It is to be noted that the total number of carbon atoms which configure each aromatic compound is from 7 to 18, irrelevant of the type of the base thereof, as described below.

The type of each of R21 to R44 is not particularly limited as long as the type thereof is one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group. One reason for this is that, since R21 to R44 each have a base of a single ring or a condensed ring and the total number of carbon atoms is from 7 to 18, the above-described advantages are obtained irrespective of the types of R21 to R44. It is to be noted that details of R21 to R44 in Formula (2) to Formula (4) will not be described since the details thereof are similar to those of R1 to R4 in Formula (1).

The aromatic compound represented by Formula (2) has a single ring (benzene ring) as a base. R21 to R26 may be the same group or may be different groups. Alternatively, part of R21 to R26 may be the same group. In these aromatic compounds, the number of carbon atoms in the base is 6. Therefore, in order to make the total number of carbon atoms to be 7 or larger, one or more of R21 to R26 each may need to be one of a monovalent hydrocarbon group, a monovalent halogenated hydrocarbon group, a monovalent oxygen-containing hydrocarbon group, and a monovalent halogenated oxygen-containing hydrocarbon group.

The aromatic compound represented by Formula (3) has a condensed ring (naphthalene) as a base. R27 to R34 may be the same group, or may be different groups. Alternatively, part of R27 to R34 may be the same group. In these aromatic compounds, since the total number of carbon atoms of the base is 10, all of R27 to R34 may be hydrogen groups.

The aromatic compound represented by Formula (4) has a condensed ring (anthracene) as a base. R35 to R44 may be the same group, or may be different groups. Alternatively, part of R35 to R44 may be the same group. In these aromatic compounds, since the total number of carbon atoms of the base is 14, all of R35 to R44 may be hydrogen groups.

The aromatic compound represented by Formula (5) is a condensed ring (tetracene) and the total number of carbon atoms is 18.

One of the reasons why the total number of carbon atoms is from 7 to 18 is that superior solubility and superior compatibility are thereby obtained while obtaining the above-described advantages. In detail, when the total number of carbon atoms is smaller than 7, the aromatic compound is allowed to include one or more benzene rings, but is not allowed to include, for example, a substituent group such as an alkyl group. Therefore, the film due to the unsaturated cyclic ester carbonate is easily decomposed after charge and discharge. On the other hand, when the total number of carbon atoms is larger than 18, solubility of the aromatic compound with respect to solvents typically used for a secondary battery is lowered and compatibility is also lowered.

Here, specific examples of the aromatic compounds are represented by the following Formula (2-1) to Formula (2-14), Formula (3-1), and Formula (4-1). However, specific examples of the aromatic compounds are not limited to those mentioned below.

(2-1)
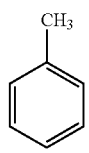

(2-2)
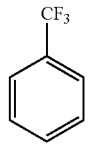

(2-3)
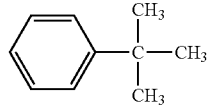

(2-4)
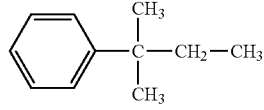

(2-5)
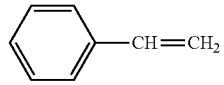

(2-6)
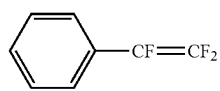

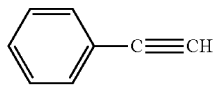 (2-7)

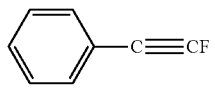 (2-8)

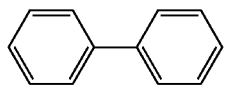 (2-9)

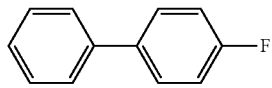 (2-10)

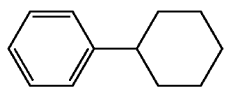 (2-11)

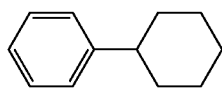 (2-12)

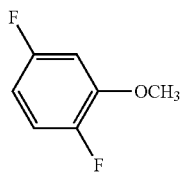 (2-13)

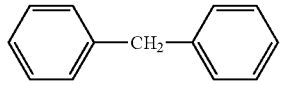 (2-14)

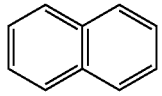 (3-1)

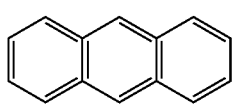 (4-1)

In particular, for example, Formula (2-3) etc. corresponding to Formula (2) is preferable since a higher effect is thereby obtained.

A content of the aromatic compound in the electrolytic solution is not particularly limited. However, in particular, the content thereof is preferably from 0.01 wt % to 10 wt % both inclusive, is more preferably from 0.1 wt % to 10 wt % both inclusive, and is further more preferably 0.1 wt % to 5 wt % both inclusive since a higher effect is thereby obtained.

[Dinitrile Compound]

A dinitrile compound is a compound that has a nitrile group (or a cyano group: —C≡N) at each of the both ends thereof.

The type of R45 is not particularly limited as long as R45 is one of a divalent hydrocarbon group and a divalent halogenated hydrocarbon group. One reason for this is that, since R45 has a nitrile group on each of the both ends thereof, the above-described advantages are obtained irrespective of the type of R45.

Examples of the divalent hydrocarbon group include an alkylene group with carbon number from 2 to 12 both inclusive, an alkenylene group with carbon number from 2 to 12 both inclusive, an alkynylene group with carbon number from 2 to 12 both inclusive, an arylene group with carbon number from 6 to 18 both inclusive, a cycloalkylene group with carbon number from 3 to 18 both inclusive, a group obtained by bonding two or more of the foregoing groups with one another, and a group obtained by substituting each of part or all of hydrogen groups of any of the foregoing groups by a halogen group. These examples of the divalent hydrocarbon group secure, for example, solubility, compatibility, and the like of the dinitrile compound and provide the above-described advantages. In particular, the carbon numbers of the alkylene group, the alkenylene group, and the alkynylene group are each preferably 6 or smaller, since superior solubility and superior compatibility are thereby obtained.

More specifically, examples of the alkylene group include a methylene group (—CH$_2$—), an ethylene group (—C$_2$H$_4$—), a propylene group (—C$_3$H$_6$—), and a butylene group (—C$_4$H$_8$—). Examples of the alkenylene group include a vinylene group (—CH═CH—). Examples of the alkynylene group include an ethynylene group (—C≡C—). Examples of the arylene group include a phenylene group. Examples of the cycloalkylene group include a cyclopropylene group and a cyclobutylene group.

"Group obtained by bonding two or more of the foregoing groups with one another" may refer to, for example, a group obtained by bonding two or more of the above-described groups such as the alkylene group to one another so that the group is a divalent group as a whole. Examples thereof include a group obtained by bonding an alkylene group and an arylene group to each other.

"Divalent halogenated hydrocarbon group" is a group obtained by halogenating the above-described divalent hydrocarbon group. More specifically, examples of a group obtained by halogenating a group such as an alkylene group include a difluoromethylene group (—CF$_2$—).

Here, specific examples of the dinitrile compound are expressed by the following Formula (6-1) to Formula (6-11). However, specific examples of the dinitrile compound are not limited to those mentioned below.

 (6-1)

 (6-2)

 (6-3)

 (6-4)

 (6-5)

 (6-6)

 (6-7)

 (6-8)

 (6-9)

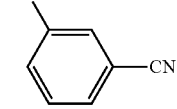 (6-10)

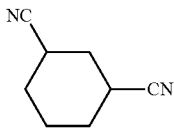

(6-11)

A content of the dinitrile compound in the electrolytic solution is not particularly limited. However, in particular, the content thereof is preferably from 0.01 wt % to 10 wt % both inclusive, is more preferably 0.1 wt % to 10 wt %, and is further more preferably from 0.1 wt % to 5 wt % both inclusive, since a higher effect is thereby obtained.

[Sulfinyl Compound]

A sulfinyl compound is a chain or cyclic compound that has one or two sulfinyl groups (—S(=O)—).

The type of each of R46 to R59, R61, and R62 is not particularly limited as long as the type thereof is one of a monovalent hydrocarbon group and a monovalent halogenated hydrocarbon group. Further, the type of each of R60 and R63 is not particularly limited as long as the type thereof is one of a divalent hydrocarbon group and a divalent halogenated hydrocarbon group. One reason for this is that, when R46 to R63 each include one or two sulfinyl groups, the above-described advantages are obtained irrespective of the types of R46 to R63. It is to be noted that details of R46 to R59, R61 and R62 in Formula (7) to Formula (14) will not be described here since the details thereof are similar to those of R1 to R4 in Formula (1). Further, details of R60 in Formula (13) and R63 in Formula (14) will not be described here since the details thereof are similar to those of R45 in Formula (6).

Formula (7) represents a state in which R46 and R47 at the both ends are not bonded to each other, namely, a case in which the sulfynil compound is a chain compound. However, the sulfynil compound may be a cyclic compound in which R46 and R47 is bonded to each other to form a ring. The same is applicable to the sulfynil compounds represented by Formula (8) to Formula (14).

Here, specific examples of the sulfynil compound include compounds represented by the following Formula (7-1) to Formula (7-10), Formula (8-1) to Formula (8-6), Formula (9-1) to Formula (9-5), Formula (10-1) to Formula (10-17), Formula (11-1) to Formula (11-18), Formula (12-1) to Formula (12-9), and Formula (13-1) to Formula (13-14). However, specific examples of the sulfynil compounds are not limited to those mentioned below.

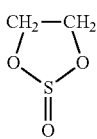

(7-1)

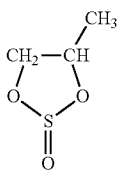

(7-2)

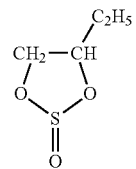

(7-3)

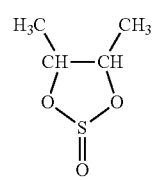

(7-4)

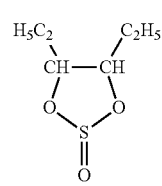

(7-5)

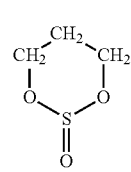

(7-6)

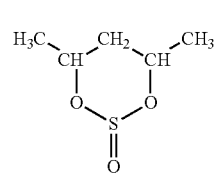

(7-7)

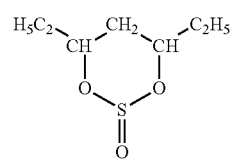

(7-8)

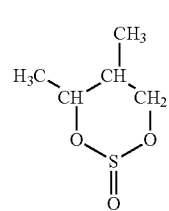

(7-9)

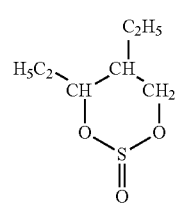

(7-10)

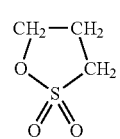

(8-1)

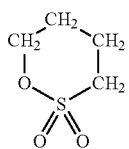 (8-2)
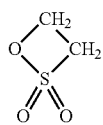 (8-3)
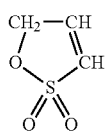 (8-4)
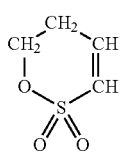 (8-5)
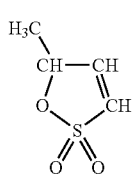 (8-6)
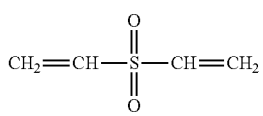 (9-1)
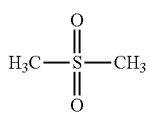 (9-2)
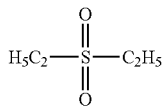 (9-3)
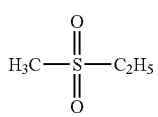 (9-4)
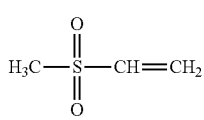 (9-5)
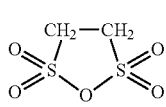 (10-1)
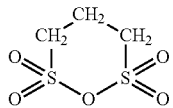 (10-2)
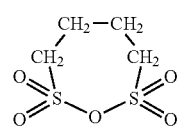 (10-3)
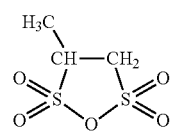 (10-4)
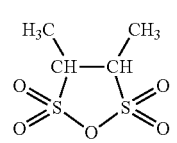 (10-5)
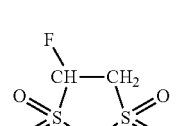 (10-6)
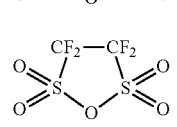 (10-7)
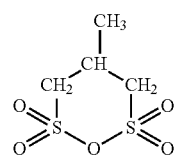 (10-8)
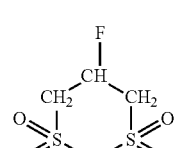 (10-9)
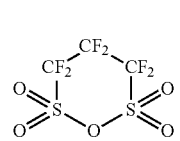 (10-10)
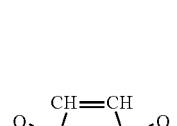 (10-11)
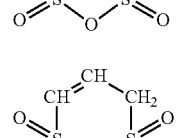 (10-12)
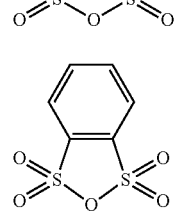 (10-13)

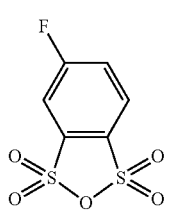 (10-14)
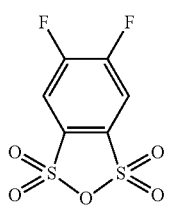 (10-15)
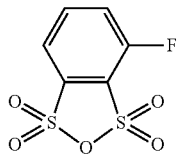 (10-16)
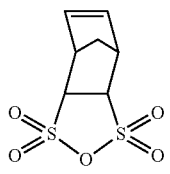 (10-17)
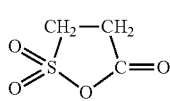 (11-1)
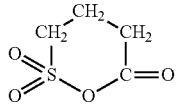 (11-2)
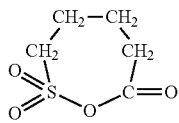 (11-3)
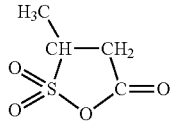 (11-4)
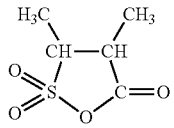 (11-5)
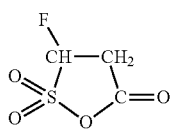 (11-6)
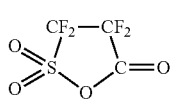 (11-7)
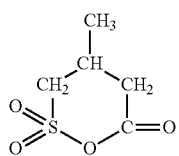 (11-8)
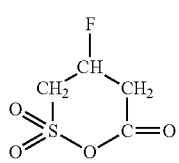 (11-9)
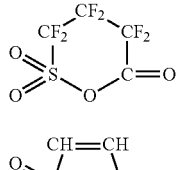 (11-10)
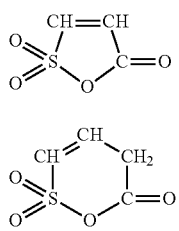 (11-11)
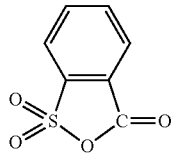 (11-12)
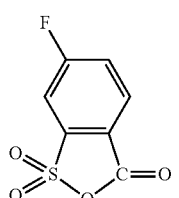 (11-13)
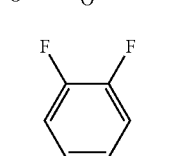 (11-14)
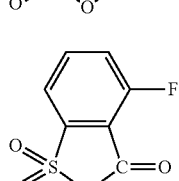 (11-15)
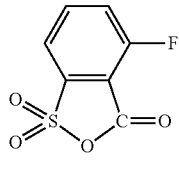 
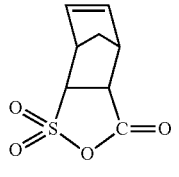 (11-16)
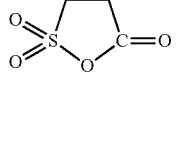 (11-17)

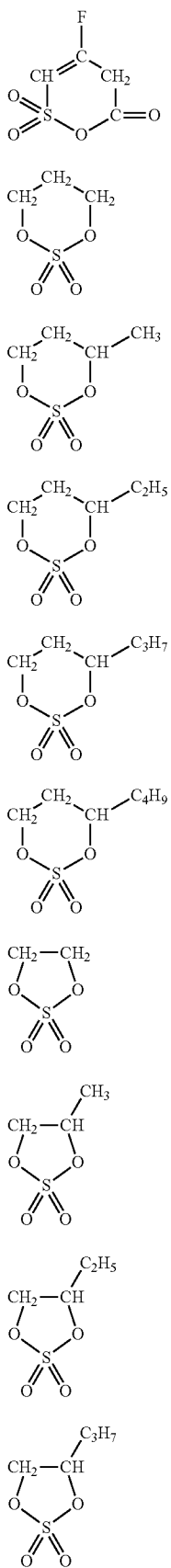
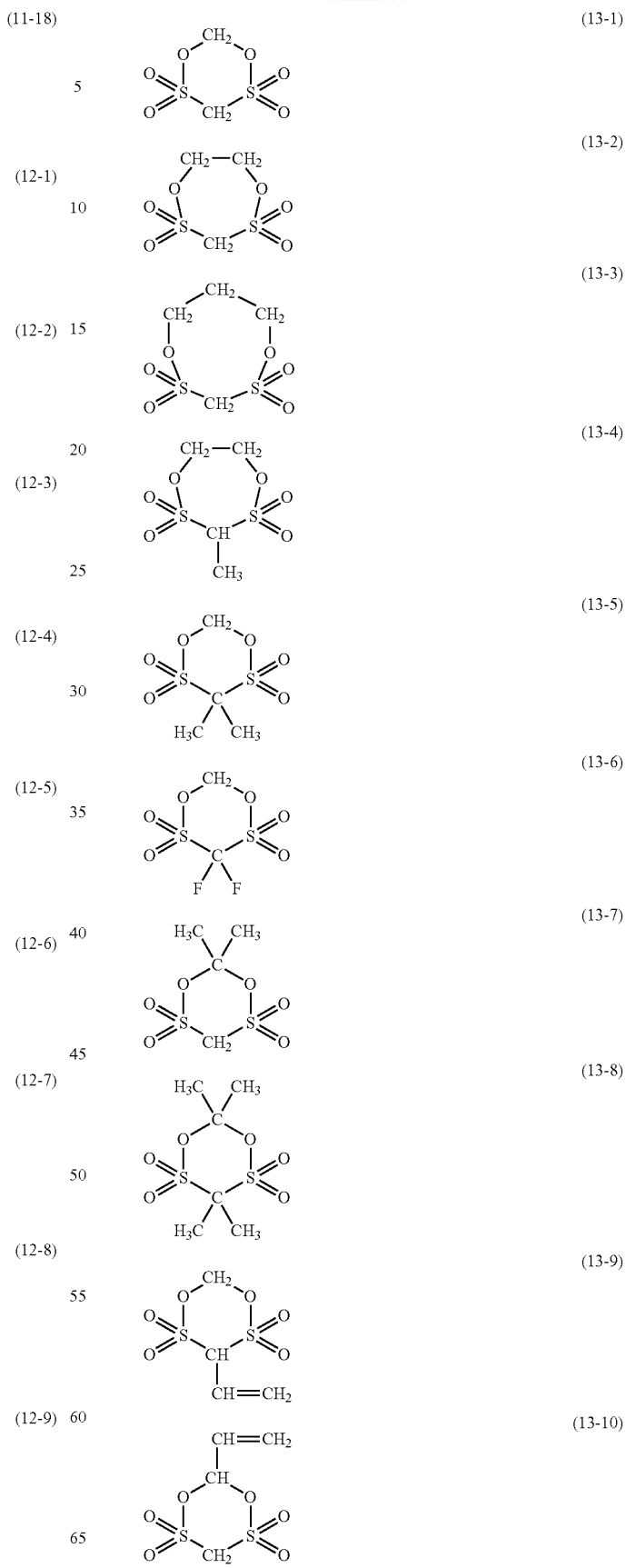

-continued (13-11)

(13-12)

(13-13)

(13-14)

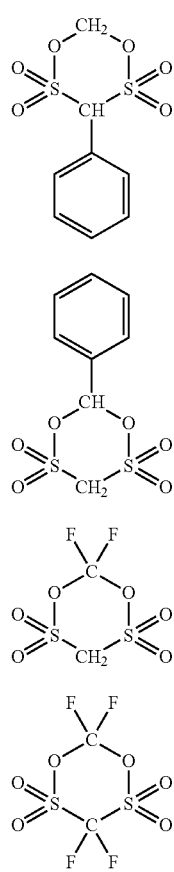

(15-1)

(15-2)

(15-3)

(15-4)

A content of the sulfynil compound in the electrolytic solution is not particularly limited. However, in particular, the content thereof is preferably from 0.01 wt % to 10 wt % both inclusive, and is more preferably from 0.1 wt % to 5 wt % both inclusive since a higher effect is thereby obtained.

[Lithium Salt]

The type of R64 is not particularly limited as long as R64 is a divalent halogenated hydrocarbon group. Further, the type of each of R65 and R66 is not particularly limited as long as each of R65 and R66 is one of a halogen group, a monovalent hydrocarbon group, a monovalent halogenated hydrocarbon group. Thus, the above-described advantages are obtained irrelevant of the types of R64 to R66. It is to be noted that details of R64 in Formula (15) will not be described since the details thereof are similar to those of R45 (divalent halogenated hydrocarbon group) in Formula (6). Further, details of R65 and R66 in Formula (16) will not be described since the details thereof are similar to those of R1 to R4 in Formula (1).

It is to be noted that one or both of R65 and R66 are each one of a halogen group and a monovalent halogenated hydrocarbon group. Thus, the above-described advantages are obtained while, for example, solubility, compatibility, and the like of lithium salt is secured.

Here, specific examples of the lithium salts include compounds represented by Formula (15-1) to Formula (15-4) below, Li[N(SO$_2$F)$_2$], and Li(SO$_3$F). However, specific examples of the lithium salts are not limited to those mentioned below.

A content of the lithium salts in the electrolytic solution is not particularly limited. However, the content thereof is preferably from 0.01 mol/kg to 1 mol/kg both inclusive since a higher effect is thereby obtained.

[Solvent]

The solvent provided for the electrolytic solution includes one or more of non-aqueous solvents (excluding the above-described unsaturated cyclic ester carbonate and the like) such as organic solvents.

Examples of the non-aqueous solvent include cyclic ester carbonate, chain ester carbonate, lactone, chain carboxylic ester, and nitrile. Thus, for example, superior battery capacity, superior cycle characteristics, superior conservation characteristics, and the like are obtained. Examples of the cyclic ester carbonate include ethylene carbonate, propylene carbonate, and butylene carbonate. Examples of the chain ester carbonate include dimethyl carbonate, diethyl carbonate, ethyl methyl carbonate, and methyl propyl carbonate. Examples of the lactone include γ-butyrolactone and γ-valerolactone. Examples of the carboxylic ester include methyl acetate, ethyl acetate, methyl propionate, ethyl propionate, methyl butyrate, methyl isobutyrate, methyl trimethylacetate, and ethyl trimethylacetate. Examples of the nitrile include acetonitrile, glutaronitrile, adiponitrile, methoxyacetonitrile, and 3-methoxypropionitrile.

In addition thereto, examples of the non-aqueous solvent include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. The above-described materials similarly provide, for example, superior battery capacity and the like.

In particular, the solvent is preferably one or more of ethylene carbonate, propylene carbonate, dimethyl carbonate, diethyl carbonate, and ethyl methyl carbonate, since, for example, a superior battery capacity, superior cycle characteristics, superior conservation characteristics, and the like are thereby obtained. In this case, a combination of a high viscosity (high dielectric constant) solvent (for example, specific dielectric constant $\in \geq 30$) such as ethylene carbonate and propylene carbonate and a low viscosity solvent (for example, viscosity ≤1 mPa·s) such as dimethyl carbonate, ethyl methyl carbonate, and diethyl carbonate is more preferable. Thus, the dissociation properties of the electrolyte salt and ion mobility are improved.

In particular, the solvent preferably includes one or more of other unsaturated cyclic ester carbonates represented by the following Formula (21) and Formula (22). Thus, a stable protective film is formed mainly on a surface of the anode 22 at the time of charge and discharge. Therefore, a decomposition reaction of the electrolytic solution is suppressed. R71 and R72 may be the same group, or may be different groups. R73 to R76 may be the same group, or may be different groups. Alternatively, part of R73 to R76 may be the same group. A content of the other unsaturated cyclic ester carbonates in the solvent is not particularly limited. However, the content thereof may be, for example, from 0.01 wt % to 10 wt % both inclusive. However, specific examples of the other unsaturated cyclic ester carbonates are not limited to those mentioned below.

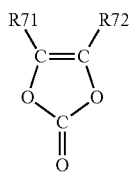
(21)

(R71 and R72 are each one of a hydrogen group and an alkyl group.)

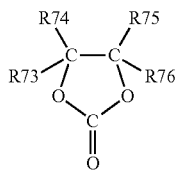
(22)

(R73 to R76 are each one of a hydrogen group, an alkyl group, a vinyl group, and an allyl group. One or more of R73 to R76 are each one of a vinyl group and an allyl group.)

The other unsaturated cyclic ester carbonates represented by Formula (21) are vinylene-carbonate-based compounds. The type of each of R71 and R72 is not particularly limited as long as the type thereof is one of a hydrogen group and an alkyl group. Examples of the alkyl group include a methyl group and an ethyl group. The carbon number of the alkyl group is preferably from 1 to 12 both inclusive. Thus, superior solubility and superior compatibility are obtained. Specific examples of the vinylene-carbonate-based compounds include vinylene carbonate (1,3-dioxole-2-one), methylvinylene carbonate (4-methyl-1,3-dioxole-2-one), ethylvinylene carbonate (4-ethyl-1,3-dioxole-2-one), 4,5-dimethyl-1,3-dioxole-2-one, and 4,5-diethyl-1,3-dioxole-2-one. It is to be noted that each of R71 and R72 may be a group obtained by substituting each of part or all of hydrogen groups of the alkyl group by a halogen group. Specific examples of the vinylene-carbonate-based compounds in this case include 4-fluoro-1,3-dioxole-2-one, and 4-trifluoromethyl-1,3-dioxole-2-one. In particular, vinylene carbonate is preferable since vinylene carbonate is easily obtained and provides a high effect.

The other unsaturated cyclic ester carbonates represented by Formula (22) are vinyl-ethylene-carbonate-based compounds. The type of each of R73 to R76 is not particularly limited as long as the type thereof is one of a hydrogen group, an alkyl group, a vinyl group, and allyl group. However, each of one or more of R73 to R76 shall be one of a vinyl group and an allyl group. The type and the carbon number of the alkyl group are similar to those of R71 and R72. Specific examples of the vinyl-ethylene-carbonate-based compound include vinyl ethylene carbonate (4-vinyl-1,3-dioxolan-2-one), 4-methyl-4-vinyl-1,3-dioxolan-2-one, 4-ethyl-4-vinyl-1,3-dioxolan-2-one, 4-n-propyl-4-vinyl-1,3-dioxolan-2-one, 5-methyl-4-vinyl-1,3-dioxolan-2-one, 4,4-divinyl-1,3-dioxolan-2-one, and 4,5-divinyl-1,3-dioxolan-2-one. In particular, vinyl ethylene carbonate is preferable since vinyl ethylene carbonate is easily obtained and provides a high effect. Obviously, all of R73 to R76 may be vinyl groups or may be allyl groups. Alternatively, some of R73 to R76 may be vinyl groups and others thereof may be allyl groups.

It is to be noted that the other unsaturated cyclic ester carbonates each may be catechol carbonate having a benzene ring, other than the compounds represented by Formula (21) and Formula (22).

Further, the solvent preferably includes one or more of halogenated ester carbonates represented by the following Formula (23) and Formula (24). Thus, a stable protective film is formed mainly on the surface of the anode 22 at the time of charge and discharge. Therefore, the decomposition reaction of the electrolytic solution is suppressed. The halogenated ester carbonate represented by Formula (23) is a cyclic ester carbonate (halogenated cyclic ester carbonate) that includes one or more halogens as constituent elements. The halogenated ester carbonate represented by Formula (24) is a chain ester carbonate (halogenated chain ester carbonate) that includes one or more halogens as constituent elements. It is to be noted that R77 to R80 may be the same group, or may be different groups. Alternatively, part of R77 to R80 may be the same group. The same is applicable to R81 to R86. A content of the halogenated ester carbonate in the solvent is not particularly limited. However, the content thereof may be, for example, from 0.01 wt % to 50 wt % both inclusive. However, specific examples of the halogenated ester carbonate are not limited to those mentioned below.

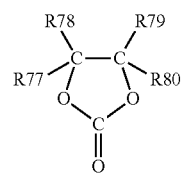
(23)

(R77 to R88 are each one of a hydrogen group, a halogen group, an alkyl group, and a halogenated alkyl group. One or more of R77 to R80 are each one of a halogen group and a halogenated alkyl group.)

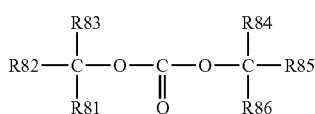
(24)

(R81 to R86 are each one of a hydrogen group, a halogen group, an alkyl group, and a halogenated alkyl group. One or more of R81 to R86 are each one of a halogen group and a halogenated alkyl group.)

The type of the halogen is not particularly limited. However, in particular, the halogen is preferably one of fluorine (F), chlorine (Cl), and bromine (B), and is more preferably fluorine, since a higher effect is thereby obtained compared to other halogens. However, the number of the halogen is preferably two than one, and may be three or more. Thus, the ability to form a protective film is improved and a more rigid and more stable protective film is formed. Therefore, the decomposition reaction of the electrolytic solution is more suppressed.

Examples of the halogenated cyclic ester carbonate include compounds represented by the following Formula (23-1) to Formula (23-21). The examples of the halogenated cyclic ester carbonate include geometric isomers thereof. In particular, 4-fluoro-1,3-dioxolan-2-one represented by Formula (23-1) and 4,5-difluoro-1,3-dioxolan-2-one represented by Formula (23-3) are preferable, and the latter compound is more preferable. Also, as 4,5-difluoro-1,3-dioxolan-2-one, a trans isomer thereof is more preferable than a cis isomer thereof since the trans isomer thereof is easily obtained and provides a high effect. Examples of the halogenated chain ester carbonate include fluoromethyl methyl carbonate, bis(fluoromethyl) carbonate, and difluoromethyl methyl carbonate.

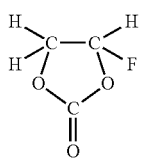
(23-1)

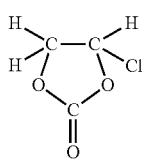
(23-2)

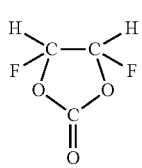
(23-3)

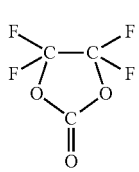
(23-4)

-continued

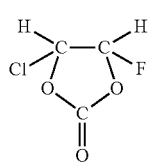
(23-5)

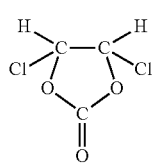
(23-6)

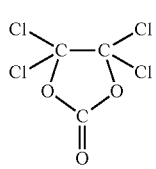
(23-7)

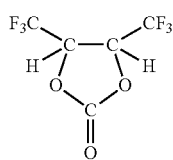
(23-8)

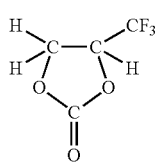
(23-9)

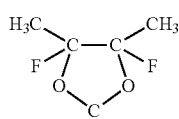
(23-10)

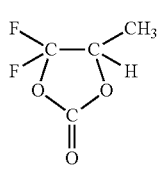
(23-11)

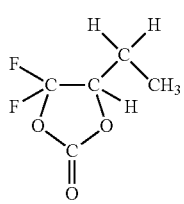
(23-12)

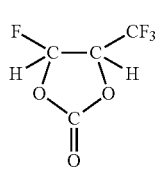
(23-13)

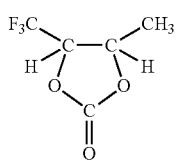
(23-14)

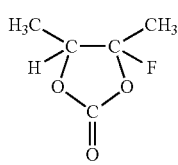
(23-15)

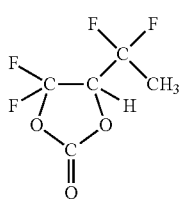
(23-16)

(23-17)

(23-18)

(23-19)

(23-20)

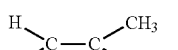
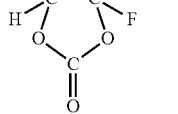
(23-21)

Further, the solvent preferably includes sultone (cyclic ester sulfonate). Thus, chemical stability of the electrolytic solution is more improved. Examples of the sultone include propane sultone and propene sultone. A content of the sulton in the solvent is not particularly limited. However, the content thereof may be, for example, from 0.5 wt % to 5 wt % both inclusive. However, specific examples of the sultone are not limited to the compounds described above, and may be other compounds.

Further, the solvent preferably includes an acid anhydride since the chemical stability of the electrolytic solution is thereby further improved. Examples of the acid anhydride include carboxylic anhydride, disulfonic anhydride, and carboxylic acid sulfonic acid anhydride. Examples of the carboxylic anhydride include succinic anhydride, glutaric anhydride, and maleic anhydride. Examples of the disulfonic anhydride include ethane disulfonic anhydride and propane disulfonic anhydride. Examples of the carboxylic acid sulfonic acid anhydride include sulfobenzoic anhydride, sulfopropionic anhydride, and sulfobutyric anhydride. A content of the acid anhydride in the solvent is not particularly limited. However, the content thereof may be, for example, from 0.5 wt % to 5 wt % both inclusive. However, specific examples of the acid anhydrides are not limited to the above-described compounds, and may be other compounds.

The electrolyte salt provided for the electrolytic solution may include, for example, one or more of salts such as other lithium salts. However, the electrolyte salt may include, for example, salts (such as light metal salts other than lithium salts) other than lithium salts.

Examples of the other lithium salts include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr), since, for example, superior battery characteristics, superior cycle characteristics, superior conservation characteristics, and the like are thereby obtained. However, specific examples of the lithium salt are not limited to the above-described compounds, and may be other compounds.

In particular, one or more of $LiPF_6$, $LiBF_4$, $LiClO_4$, and $LiAsF_6$ are preferable, and $LiPF_6$ is more preferable, since the internal pressure is thereby lowered and a higher effect is obtained.

In particular, the electrolyte salt preferably includes one or more of compounds represented by the following Formula (25) to Formula (27), since a higher effect is thereby obtained. It is to be noted that R31 and R33 may be the same group, or may be different groups. The same is applicable to R41 to R43, and to R51 and R52. However, specific examples of the compounds represented by Formula (25) to Formula (27) are not limited to those mentioned below.

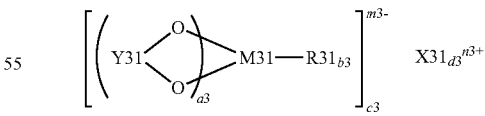
(25)

(X31 is one of Group 1 elements and Group 2 elements in the long-period periodic table and Al. M31 is one of transition metals and Group 13 elements, Group 14 elements, and Group 15 elements in the long-period periodic table. R31 is a halogen group. Y31 is one of —C(=O)—R32-C(=O)—, —C(=O)—CR33$_2$-, and —C(=O)—C(=O)—. It is to be noted that R32 is one of an alkylene group, a halogenated alkylene group, an arylene group, and a halogenated arylene group. R33 is one of an alkyl group, a halogenated alkyl group, an aryl group, and a halogenated aryl group. It is to be noted that a3 is an integer from 1 to 4, b3 is an integer of one of 0, 2, and 4, and c3, d3, m3, and n3 are each an integer from 1 to 3.)

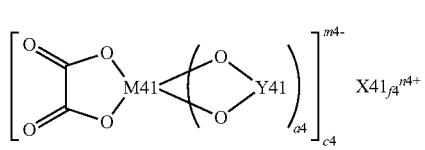
(26)

(X41 is one of Group 1 elements and Group 2 elements in the long-period periodic table. M41 is one of transition metals, and Group 13 elements, Group 14 elements, and Group 15 elements in the long-period periodic table. Y41 is one of —C(=O)—(CR41$_2$)$_{b4}$-C(=O)—, —R43$_2$C—(CR42$_2$)$_{c4}$-C(=O)—, —R43$_2$C—(CR42$_2$)$_{c4}$-CR43$_2$-, —R43$_2$C—(CR42$_2$)$_{c4}$-S(=O)$_2$—, —S(=O)$_2$—(CR42$_2$)$_{d4}$-S(=O)$_2$—, and —C(=O)—(CR42$_2$)$_{d4}$-S(=O)$_2$—. It is to be noted that R41s and R43s are each one of a hydrogen group, an alkyl group, a halogen group, and a halogenated alkyl group, and one or more of R41s and one or more of R43s are each one of a halogen group and a halogenated alkyl group. R42s are each one of a hydrogen group, an alkyl group, a halogen group, and a halogenated alkyl group. It is to be noted that a4, e4, and n4 are each an integer of 1 or 2, b4 and d4 are each an integer from 1 to 4, c4 is an integer from 0 to 4, and f4 and m4 are each an integer from 1 to 3.)

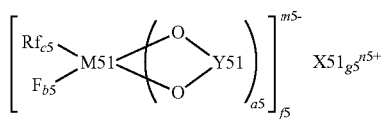
(27)

(X51 is one of Group 1 elements and Group 2 elements in the long-period periodic table. M51 is one of transition metals and Group 13 elements, Group 14 elements, and Group 15 elements in the long-period periodic table. Rfs are each one of a fluorinated alkyl group and a fluorinated aryl group, and carbon number of any of Rfs is from 1 to 10. Y51 is one of —C(=O)—(CR51$_2$)$_{d5}$-C(=O)—, —R52$_2$C—(CR51$_2$)$_{d5}$-C(=O)—, —R52$_2$C—(CR51$_2$)$_{d5}$-CR52$_2$-, —R52$_2$C—(CR51$_2$)$_{d5}$-S(=O)$_2$—, —S(=O)$_2$—(CR51$_2$)$_{e5}$-S(=O)$_2$—, and —C(=O)—(CR51$_2$)$_{e5}$-S(=O)$_2$—. It is to be noted that R51 is one of a hydrogen group, an alkyl group, a halogen group, and a halogenated alkyl group. R52s are each one of a hydrogen group, an alkyl group, a halogen group, and a halogenated alkyl group, and one or more of R52s are each one of a halogen group and a halogenated alkyl group. It is to be noted that a5, f5, and n5 are each an integer of 1 or 2, b5, c5, and e5 are each an integer from 1 to 4, d5 is an integer from 0 to 4, and g5 and m5 are each an integer from 1 to 3.)

It is to be noted that Group 1 elements include H, Li, Na, K, Rb, Cs, and Fr. Group 2 elements include Be, Mg, Ca, Sr, Ba, and Ra. Group 13 elements include B, Al, Ga, In, and Tl. Group 14 elements include C, Si, Ge, Sn, and Pb. Group 15 elements include N, P, As, Sb, and Bi.

Examples of the compound represented by Formula (25) include compounds represented by Formula (25-1) to Formula (25-6). Examples of the compound represented by Formula (26) include compounds represented by Formula (26-1) to Formula (26-8). Examples of the compound represented by Formula (27) include a compound represented by Formula (27-1).

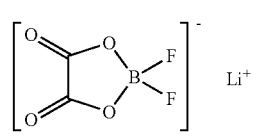
(25-1)

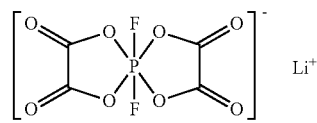
(25-2)

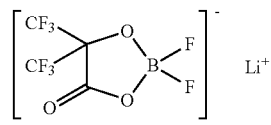
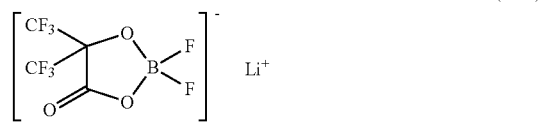
(25-3)

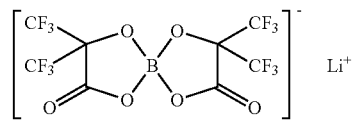
(25-4)

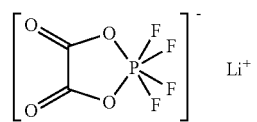
(25-5)

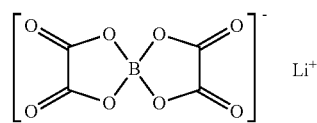
(25-6)

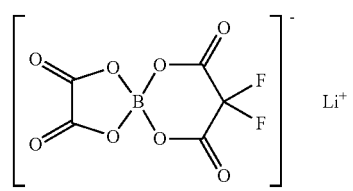
(26-1)

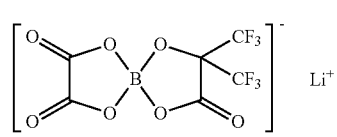
(26-2)

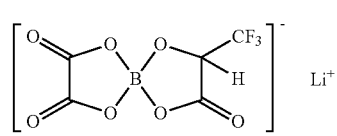
(26-3)

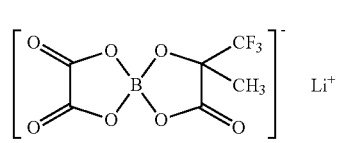
(26-4)

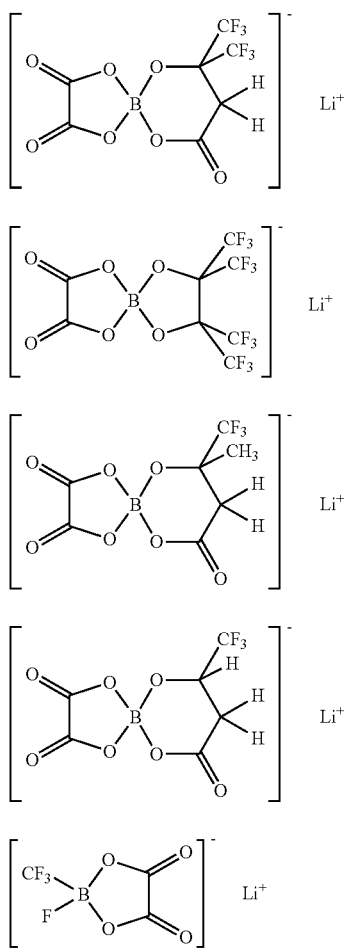

(26-5)

(26-6)

(26-7)

(26-8)

(27-1)

Further, the electrolyte salt preferably includes one or more of compounds represented by Formula (28) and Formula (29) below. Thus, a higher effect is obtained. It is to be noted that m and n may be the same value, or may be different values. The same is applicable to p, q, and r. However, specific examples of the compounds represented by Formula (23) and Formula (24) are not limited to compounds described below, and may be other compounds that correspond to Formula (23) and Formula (24).

$$LiN(C_mF_{2m+1}SO_2)(C_nF_{2n+1}SO_2) \quad (28)$$

(m and n are each an integer of 1 or larger.)

$$LiC(C_pF_{2p+1}SO_2)(C_qF_{2q+1}SO_2)(C_rF_{2r+1}SO_2) \quad (29)$$

(p, q, and r are each an integer of 1 or larger.)

The compound represented by Formula (28) is a chain imide compound. Examples thereof include bis(trifluoromethanesulfonyl)imide lithium (LiN(CF$_3$SO$_2$)$_2$), bis(pentafluoroethanesulfonyl)imide lithium (LiN(C$_2$F$_5$SO$_2$)$_2$), (trifluoromethanesulfonyl) (pentafluoroethanesulfonyl) imide lithium (LiN(CF$_3$SO$_2$)(C$_2$F$_5$SO$_2$)), (trifluoromethanesulfonyl)(heptafluoropropanesulfonyl) imide lithium (LiN(CF$_3$SO$_2$)(C$_3$F$_7$SO$_2$)), and (trifluoromehtanesulfonyl)(nonafluorobuthanesulfonyl) imide lithium (LiN(CF$_3$SO$_2$)(C$_4$F$_9$SO$_2$)).

The compound represented by Formula (29) is a chain methide compound. Examples thereof include lithium tris(trifluoromethanesulfonyl)methide (LiC(CF$_3$SO$_2$)$_3$).

A content of the electrolyte salt is not particularly limited. However, in particular, the content thereof is preferably from 0.3 mol/kg to 3.0 mol/kg both inclusive with respect to the non-aqueous solvent. Thus, high ion conductivity is obtained.

[Operation of Secondary Battery]

In the secondary battery, for example, lithium ions extracted from the cathode 21 may be inserted in the anode 22 through the electrolytic solution at the time of charge, and lithium ions extracted from the anode 22 may be inserted in the cathode 21 through the electrolytic solution at the time of discharge.

[Method of Manufacturing Secondary Battery]

The secondary battery may be manufactured, for example, by the following procedure.

First, the cathode 21 is formed. A cathode active material is mixed with, for example, a cathode binder, a cathode conductive agent, and the like where appropriate to prepare a cathode mixture. Subsequently, the cathode mixture is dispersed, for example, in an organic solvent or the like to obtain paste cathode mixture slurry. Subsequently, both surfaces of the cathode current collector 21A are coated with the cathode mixture slurry, and the resultant is dried. Thus, the cathode active material layer 21B is formed. Subsequently, the cathode active material layer 21B is compression-molded with the use of, for example, a roll pressing machine and/or the like while being heated where appropriate. In this case, compression-molding may be repeated several times.

Further, the anode 22 is formed by procedures similar to those described above of the cathode 21. An anode mixture in which the anode active material, and, where appropriate, the anode binder, the anode conductive agent, and the like are mixed is dispersed in an organic solvent and/or the like to obtain paste anode mixture slurry. Subsequently, both surfaces of the anode current collector 22A are coated with the anode mixture slurry, and the resultant is dried. Thus, the anode active material layer 22B is formed. After that, the anode active material layer 22B is compression-molded where appropriate.

Further, the electrolyte salt is dispersed in the solvent, and then, materials such as the unsaturated cyclic ester carbonate and the aromatic compound are added to the resultant to prepare the electrolytic solution.

Finally, the secondary battery is assembled with the cathode 21 and the anode 22. First, the cathode lead 25 is attached to the cathode current collector 21A and the anode lead 26 is attached to the anode current collector 22A, for example, by a welding method and/or the like. Subsequently, the cathode 21 and the anode 22 are laminated with the separator 23 in between and are spirally wound. Thus, the spirally wound electrode body 20 is formed. After that, the center pin 24 is inserted in the center of the spirally wound electrode body 20. Subsequently, the spirally wound electrode body 20 is sandwiched between the pair of insulating plates 12 and 13, and is contained in the battery can 11. In this case, the end tip of the cathode lead 25 is attached to the safety valve mechanism 15 and the end tip of the anode lead 26 is attached to the battery can 11, for example, by a welding method and/or the like. Subsequently, the electrolytic solution is injected into the battery can 11, and the separator 23 is impregnated with the electrolytic solution. Subsequently, the battery cover 14, the safety valve mechanism 15, and the PTC device 16 are fixed by being swaged with the gasket 17 at the open end of the battery can 11.

[Functions and Effects of Secondary Battery]

According to the present cylindrical type secondary battery, the electrolytic solution includes an aromatic compounds and the like together with the unsaturated cyclic ester carbonate. In this case, chemical stability of the electrolytic solution is specifically improved as described above. Therefore, the decomposition reaction of the electrolytic solution is significantly suppressed. Accordingly, the electrolytic solution is less likely to be decomposed even when the secondary battery is charged and discharged, and is stored. Thus, superior battery characteristics are obtained.

In particular, when the content of the unsaturated cyclic ester carbonate in the electrolytic solution is from 0.01 wt % to 10 wt % both inclusive, a higher effect is obtained. Also, when the content of the aromatic compound or the dinitrile compounds, is from 0.1 wt % to 10 wt % both inclusive, a higher effect is obtained. When the content of the sulfinyl compounds is from 0.1 wt % to 10 wt % both inclusive, a higher effect is obtained. In addition thereto, when the content of the lithium salt in the electrolytic solution is from 0.01 mol/kg to 1 mol/kg both inclusive, a higher effect is obtained.

[1-2. Lithium Ion Secondary Battery (Laminated Film Type)]

Figure 3:
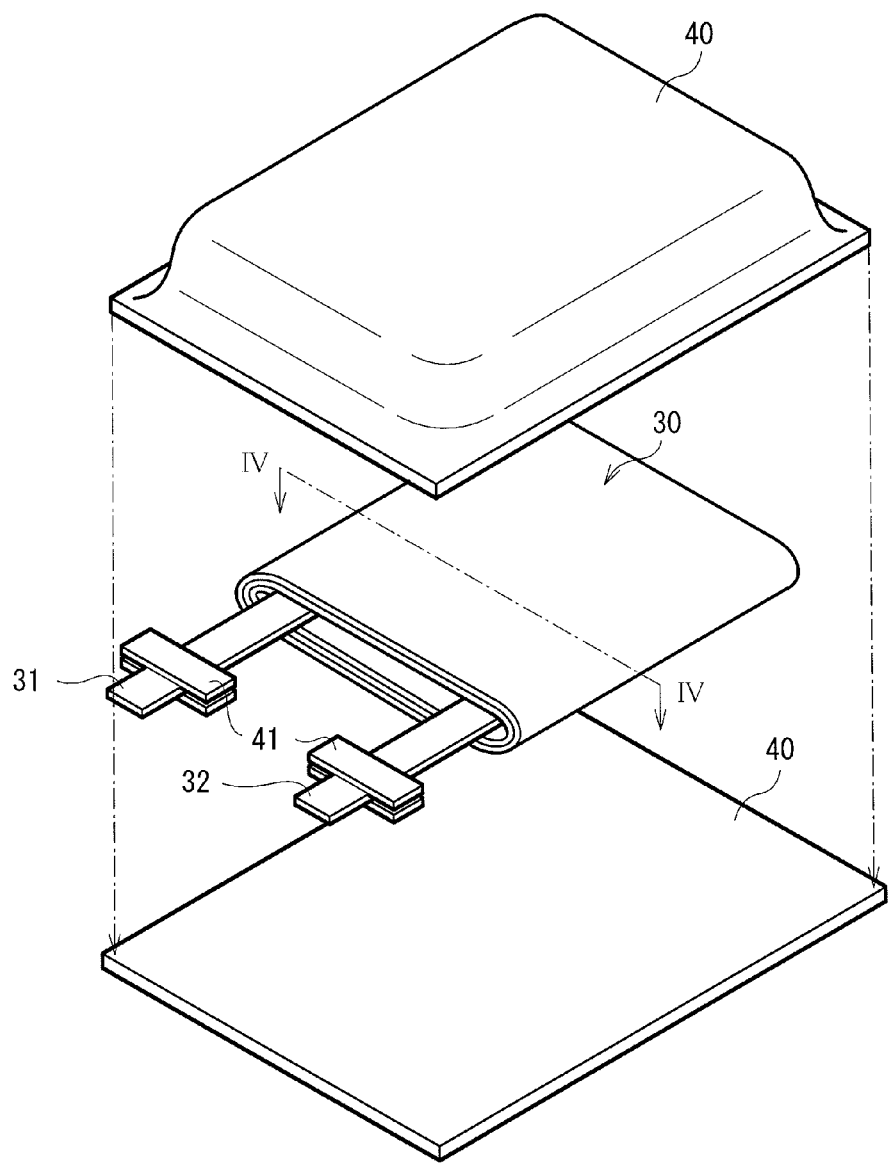
FIG. 3 is a perspective view illustrating a configuration of another secondary battery (laminated film type) that uses the electrolytic solution according to the embodiment of the present technology.
Figure 4:
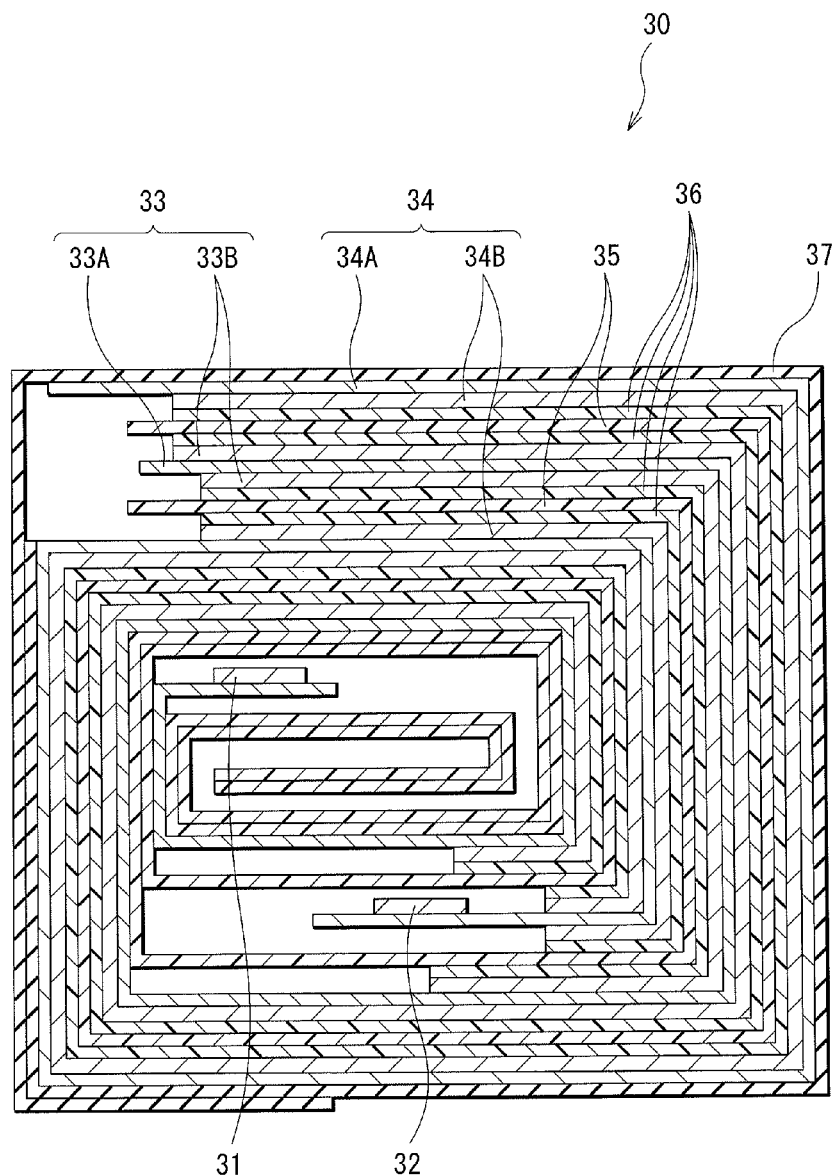
FIG. 4 is a cross-sectional view of a spirally wound electrode body taken along a line IV-IV in FIG. 3.

FIG. 3 illustrates an exploded perspective configuration of another secondary battery. FIG. 4 illustrates an enlarged cross section taken along a line IV-IV of a spirally wound electrode body 30 illustrated in FIG. 3. The elements of the cylindrical type secondary battery described above will be used as necessary in the following description.

[General Configuration of Secondary Battery]

The secondary battery is a so-called laminated film type lithium ion secondary battery. In the secondary battery, the spirally wound electrode body 30 is contained in a film-like outer package member 40. The spirally wound electrode body 30 includes the cathode 33 and an anode 34 that are laminated with a separator 35 and an electrolyte layer 36 in between, and are spirally wound. A cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 may be, for example, led out from inside to outside of the outer package member 40 in the same direction. The cathode lead 31 may be formed of, for example, an electrically-conductive material such as aluminum, and the anode lead 32 may be formed of, for example, an electrically-conducive material such as copper, nickel, and stainless steel. These electrically-conductive materials may be in the shape of, for example, a thin plate or mesh.

The outer package member 40 may be, for example, a laminated film in which a fusion bonding layer, a metal layer, and a surface protective layer are laminated in this order. In the laminated film, for example, the respective outer edges of the fusion bonding layers of two films are bonded to each other, for example, by fusion bonding, an adhesive, or the like so that the fusion bonding layers face the spirally wound electrode body 30. Examples of the fusion bonding layer include a film made of a material such as polyethylene and polypropylene. Examples of the metal layer include an aluminum foil. Examples of the surface protective layer include a film made of a material such as nylon and polyethylene terephthalate.

In particular, as the outer package member 40, an aluminum laminated film in which a polyethylene film, an aluminum foil, and a nylon film are laminated in this order is preferable. However, the outer package member 40 may be a laminated film that has other laminated structure, a polymer film such as a polypropylene film, or a metal film.

An adhesive film 41 is inserted between the outer package member 40, and the cathode lead 31 and the anode lead 32 to prevent outside air intrusion. The adhesive film 41 is formed of a material that has adhesion characteristics with respect to the cathode lead 31 and the anode lead 32. Examples of such an adhesive material include a polyolefin resin such as polyethylene, polypropylene, modified polyethylene, and modified polypropylene.

The cathode 33 may include, for example, a cathode current collector 33A and a cathode active material layer 33B that is provided on both surfaces of the cathode current collector 33A. The anode 34 may include, for example, an anode current collector 34A and an anode active material layer 34B that is provided on both surfaces of the anode current collector 34A. The configurations of the cathode current collector 33A, the cathode active material layer 33B, the anode current collector 34A, and the anode active material layer 34B are similar to those of the cathode current collector 21A, the cathode active material layer 21B, the anode current collector 22A, and the anode active material layer 22B, respectively. Further, the configuration of the separator 35 is similar to that of the separator 23.

The electrolyte layer 36 includes an electrolytic solution that is held by a polymer compound, and is a so-called gel electrolyte. Thus, high ion conductivity (for example, 1 mS/cm or more at room temperature) is obtained and liquid leakage of the electrolytic solution is prevented. The electrolyte layer 36 may contain other materials such as an additive where appropriate.

Examples of the polymer compound include one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethacrylic acid methyl, polyacrylic acid, polymethacrylic acid, styrene-butadiene rubber, nitrile-butadiene rubber, polystyrene, polycarbonate, and a copolymer of vinylidene fluoride and hexafluoro propylene. In particular, polyvinylidene fluoride or the copolymer of vinylidene fluoride and hexafluoro propylene is preferable, and polyvinylidene fluoride is more preferable, since such polymer compounds are electrochemically stable.

The composition of the electrolytic solution is similar to that of the cylindrical type secondary battery and the electrolytic solution thereof includes the unsaturated cyclic ester carbonate and the aromatic compounds and the like. However, in the electrolyte layer 36 that is a gel electrolyte, the solvent of the electrolytic solution refers to a wide concept that includes not only a liquid solvent but also a material that has ion conductivity capable of dissociating electrolyte salts. Therefore, when a polymer compound that has ion conductivity is used, the polymer compound is also included in the solvent.

It is to be noted that the electrolytic solution may be used as it is instead of the gel electrolyte layer 36. In this case, the separator 35 is impregnated with the electrolytic solution.

[Operation of Secondary Battery]

In the secondary battery, for example, lithium ions extracted from the cathode 33 may be inserted in the anode 34 through the electrolyte layer 36 at the time of charge, and lithium ions extracted from the anode 34 may be inserted in the cathode 33 through the electrolyte layer 36 at the time of discharge.

[Method of Manufacturing Secondary Battery]

The secondary battery that includes the gel electrolyte layer 36 may be manufactured, for example, by the following three types of procedures.

In the first procedure, the cathode 33 and the anode 34 are formed by a formation procedure similar to that of the cathode 21 and the anode 22. In this case, the cathode 33 is formed by forming the cathode active material layer 33B on both surfaces of the cathode current collector 33A, and the anode 34 is formed by forming the anode active material layer 34B on both surfaces of the anode current collector 34A. Subsequently, a precursor solution that includes an electrolytic solution, a polymer compound, and a solvent such as an organic solvent is prepared. After that, the cathode 33 and the anode 34 are coated with the precursor solution to form the gel electrolyte layer 36. Subsequently, the cathode lead 31 is attached to the cathode current collector 33A and the anode lead 32 is attached to the anode current collector 34A, for example, by a welding method and/or the like. Subsequently, the cathode 33 and the anode 34 provided with the electrolyte layer 36 are laminated with the separator 35 in between and are spirally wound to form the spirally wound electrode body 30. After that, the protective tape 37 is adhered to the outermost periphery thereof. Subsequently, after the spirally wound electrode body 30 is sandwiched between two pieces of film-like outer package members 40, the outer edges of the outer package members 40 are bonded, for example, by a thermal fusion bonding method and/or the like to enclose the spirally wound electrode body 30 in the outer package members 40. In this case, the adhesive films 41 are inserted between the cathode lead 31 and the anode lead 32, and the outer package member 40.

In the second procedure, the cathode lead 31 is attached to the cathode 33, and the anode lead 32 is attached to the anode 34. Subsequently, the cathode 33 and the anode 34 are layered with the separator 35 in between and are spirally wound to form a spirally wound body that is a precursor of the spirally wound electrode body 30. After that, the protective tape 37 is adhered to the outermost periphery thereof. Subsequently, after the spirally wound body is sandwiched between two pieces of the film-like outer package members 40, the outermost peripheries except for one side are bonded, for example, by a thermal fusion bonding method and/or the like to obtain a pouched state. The spirally wound body is contained in the pouch-like outer package member 40. Subsequently, a composition for electrolyte that includes an electrolytic solution, a monomer as a raw material of the polymer compound, a polymerization initiator, and other materials such as a polymerization inhibitor where appropriate is prepared. The composition for electrolyte is injected into the pouch-like outer package member 40. After that, the outer package member 40 is hermetically sealed, for example, by a thermal fusion bonding method and/or the like. Subsequently, the monomer is thermally polymerized. Thus, a polymer compound is formed, and therefore, the gel electrolyte layer 36 is formed.

In the third procedure, the spirally wound body is formed and contained in the pouch-like outer package member 40 in a manner similar to that of the foregoing second procedure, except that the separator 35 with both surfaces coated with a polymer compound is used. Examples of the polymer compound with which the separator 35 is coated include a polymer (a homopolymer, a copolymer, or a multicomponent copolymer) that includes vinylidene fluoride as a component. Specific examples thereof include polyvinylidene fluoride, a binary copolymer that includes vinylidene fluoride and hexafluoro propylene as components, and a ternary copolymer that includes vinylidene fluoride, hexafluoro propylene, and chlorotrifluoroethylene as components. It is to be noted that other one or more polymer compounds may be used in addition to the polymer that includes vinylidene fluoride as a component. Subsequently, an electrolytic solution is prepared and is injected into the outer package member 40. After that, the opening of the outer package member 40 is hermetically sealed, for example, by a thermal fusion bonding method and/or the like. Subsequently, the resultant is heated while a weight is applied to the outer package member 40, and the separator 35 is adhered to the cathode 33 and the anode 34 with the polymer compound in between. Thus, the polymer compound is impregnated with the electrolytic solution, and accordingly, the polymer compound is gelated to form the electrolyte layer 36.

In the third procedure, swollenness of the secondary battery is suppressed more than in the first procedure. Further, in the third procedure, little of the materials such as the monomer as the raw material of the polymer compound and the solvent is left in the electrolyte layer 36, compared to in the second procedure. Therefore, the formation step of the polymer compound is favorably controlled. Therefore, sufficient adhesive characteristics are obtained between the cathode 33, the anode 34, and the separator 35, and the electrolyte layer 36.

[Functions and Effects of Secondary Battery]

According to this laminated film type secondary battery, the electrolytic solution in the electrolyte layer 36 includes the aromatic compounds and the like together with the unsaturated cyclic ester carbonate. Therefore, superior battery characteristics are obtained for a reason similar to that in the cylindrical type secondary battery. Other functions and effects other than this are similar to those of the cylindrical type secondary battery.

[1-3. Lithium Metal Secondary Battery (Cylindrical Type, Laminated Film Type)]

A secondary battery described herein is a lithium metal secondary battery in which the capacity of the anode 22 is obtained by precipitation and dissolution of lithium (lithium metal) which is an electrode reactant. The secondary battery has a configuration similar to that of the above-described lithium ion secondary battery (cylindrical type) and is manufactured by procedures similar to those of the above-described lithium ion secondary battery (cylindrical type) except that the anode active material layer 22B is formed of lithium metal.

In this secondary battery, lithium metal is used as the anode active material. Therefore, high energy density is obtainable. The anode active material layer 22B may exist from the time of assembling. However, the anode active material layer 22B may not exist at the time of assembling and may be formed by precipitated lithium metal at the time of charge. Further, the anode active material layer 22B may be utilized as a current collector and the anode current collector 22A may not be provided.

In this secondary battery, for example, lithium ion extracted from the cathode 21 is precipitated as lithium metal on the surface of the anode current collector 22A through the electrolytic solution, at the time of charge. Further, for example, lithium metal is dissolved in the electrolytic solution as lithium ions from the anode active material layer 22B, and the lithium ions are inserted to the cathode 21 through the electrolytic solution, at the time of discharge.

According to the present lithium metal secondary battery, the electrolytic solution includes the aromatic compounds and the like together with the unsaturated cyclic ester carbonate. Therefore, superior characteristics are obtained for a reason similar to that of the cylindrical secondary battery. Functions and effects other than this are similar to those of the cylindrical type secondary battery. It is to be noted that the lithium metal secondary battery described above is not limited to the cylindrical type and may be of a laminated film type. Similar effects are also obtained in this case.

[2. Applications of Secondary Battery]

Next, application examples of the above-described secondary battery will be described.

Applications of the secondary battery are not particularly limited as long as the secondary battery is used for applications such as a machine, a device, an instrument, an apparatus, a system (collective entity of a plurality of devices and the like) that are capable of using the secondary battery, for example, as a driving electric power source, an electric power storage source for electric power storage, or the like. When the secondary battery is used as an electric power source, the secondary battery may be used as a main electric power source (electric power source used preferentially), or an auxiliary electric power source (electric power source used instead of a main electric power source or used being switched from the main electric power source). In the latter case, the main electric power source type is not limited to the secondary battery.

Examples of applications of the secondary battery include mobile electronic apparatuses such as video camcoders, digital still cameras, mobile phones, notebook personal computers, cordless phones, headphone stereos, portable radios, portable televisions, and personal digital assistants. Further examples thereof include mobile lifestyle electric appliances such as electric shavers; memory devices such as backup electric power sources and memory cards; electric power tools such as electric drills and electric saws; battery packs used as an electric power source of, for example, notebook personal computers or the like; medical electronic apparatuses such as pacemakers and hearing aids; electric vehicles such as electric automobiles (including hybrid automobiles); and electric power storage systems such as home battery systems for storing electric power, for example, for emergency or the like. Obviously, the secondary battery may be also used for applications other than the foregoing applications.

In particular, the secondary battery is effective in applications such as the battery pack, the electric vehicle, the electric power storage system, the electric power tool, and the electronic apparatus. In these applications, since superior battery characteristics are demanded, the performance thereof is effectively improved by using the secondary battery according to the embodiments of the present technology. It is to be noted that the battery pack is an electric power source that uses a secondary battery, such as a so-called assembled battery. The electric vehicle is a vehicle that operates (runs) with the use of a secondary battery as a driving electric power source. As described above, the electric vehicle may be an automobile (such as a hybrid automobile) that includes a drive source other than a secondary battery. The electric power storage system is a system that uses a secondary battery as an electric power storage source. For example, in a home electric power storage system, electric power is stored in the secondary battery that is an electric power storage source, and the electric power is consumed as necessary. Thus, for example, home electric products and the like become usable. The electric power tool is a tool in which a movable section (such as a drill) is moved with the use of a secondary battery as a driving electric power source. The electronic apparatus is an apparatus that executes various functions with the use of a secondary battery as a driving electric power source (electric power supply source).

A description will be specifically given of some application examples of the secondary battery. It is to be noted that configurations of the respective application examples explained below are merely examples, and may be changed as appropriate.

[2-1. Battery Pack]

Figure 5:
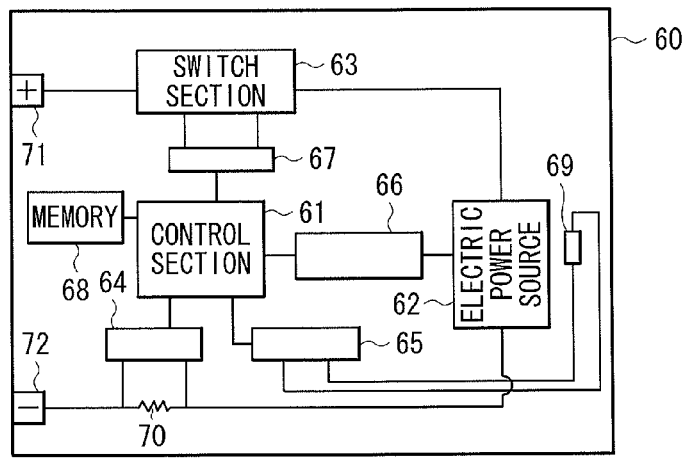
FIG. 5 is a block diagram illustrating a configuration of an application example (battery pack) of the secondary battery.

FIG. 5 illustrates a block configuration of a battery pack. The battery pack may include, for example, a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 in a housing 60 made of materials such as a plastic material, as shown in FIG. 5.

The control section 61 controls operations of the battery pack as a whole (including a used state of the electric power source 62), and may include, for example, a central processing unit (CPU) and/or the like. The electric power source 62 includes one or more secondary batteries (not illustrated). The electric power source 62 may be, for example, an assembled battery that includes two or more secondary batteries. The secondary batteries may be connected to one another in series, in parallel, or in a combination thereof. As an example, the electric power source 62 includes six secondary batteries connected two in parallel and three in series.

The switch section 63 switches the used state of the electric power source 62 (whether or not the electric power source 62 is connectable to an external device) according to an instruction of the control section 61. The switch section 63 may include, for example, a charge control switch, a discharge control switch, a charging diode, a discharging diode, and the like (not illustrated). The charge control switch and the discharge control switch each may be, for example, a semiconductor switch such as a field-effect transistor (MOSFET) that uses a metal oxide semiconductor.

The current measurement section 64 measures a current with the use of the current detection resistance 70, and outputs the measurement result to the control section 61. The temperature detection section 65 measures temperature with the use of the temperature detection device 69, and outputs the measurement result to the control section 61. The temperature measurement result may be used, for example, for a case in which the control section 61 controls charge and discharge at the time of abnormal heat generation, or for a case in which the control section 61 performs correction processing at the time of calculating a remaining capacity. The voltage detection section 66 measures a voltage of the secondary battery in the electric power source 62, performs analog-to-digital conversion (A/D conversion) on the measured voltage, and supplies the resultant to the control section 61.

The switch control section 67 controls operations of the switch section 63 according to signals inputted from the current measurement section 64 and the voltage measurement section 66.

The switch control section 67 disconnects the switch section 63 (charge control switch) so that a charge current is prevented from flowing in a current path of the electric power source 62 when a battery voltage reaches an overcharge detection voltage, for example. Thus, the electric power source 62 is only to be discharged through the discharging diode. It is to be noted that the switch control section 67 blocks the charge current in the case where a large current flows at the time of charge, for example.

The switch control section 67 disconnects the switch section 63 (discharge control switch) so that a discharge current is prevented from flowing in the current path of the electric power source 62 when a battery voltage reaches an overdischarge detection voltage, for example. Thus, the electric power source 62 is allowed only to be charged through the charging diode. It is to be noted that the switch control section 67 blocks the discharge current in the case where a large current flows at the time of discharge, for example.

It is to be noted that, in the secondary battery, for example, the overcharge detection voltage may be 4.2 V±0.05 V, and the over-discharge detection voltage may be 2.4 V±0.1 V.

The memory 68 may be, for example, a memory such as an EEPROM that is a nonvolatile memory. The memory 68 may store, for example, numerical values calculated by the control section 61 and information (such as an internal resistance in the initial state) of the secondary battery measured in a manufacturing step. It is to be noted that, when the memory 68 stores a full charge capacity of the secondary battery, the control section 10 comprehends information such as a remaining capacity.

The temperature detection device 69 measures temperature of the electric power source 62, and outputs the measurement result to the control section 61. The temperature detection device 69 may be a device such as a thermistor.

The cathode terminal 71 and the anode terminal 72 are terminals connected to an external device (such as a notebook personal computer) driven with the use of the battery pack, or terminals connected to an external device (such as a battery charger) provided for charging the battery pack. The electric power source 62 is charged and discharged through the cathode terminal 71 and the anode terminal 72.

[2-2. Electric Vehicle]

Figure 6:
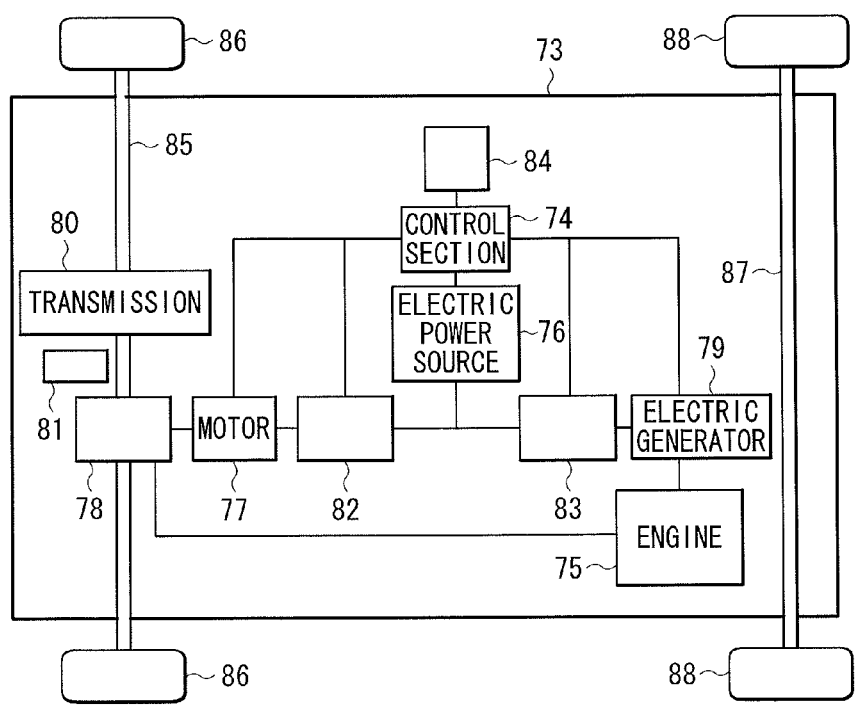
FIG. 6 is a block diagram illustrating a configuration of an application example (electric vehicle) of the secondary battery.

FIG. 6 illustrates a block configuration of a hybrid automobile that is an example of electric vehicles. The electric vehicle may include, for example, a control section 74, an engine 75, an electric power source 76, a driving motor 77, a differential 78, an electric generator 79, a transmission 80, a clutch 81, inverters 82 and 83, and various sensors 84 in a housing 73 made of metal, as illustrated in FIG. 6. In addition thereto, the electric vehicle may include, for example, a front tire drive axis 85 and a front tire 86 that are connected to the differential 78 and the transmission 80, a rear tire drive axis 87, and a rear tire 88.

The electric vehicle is runnable with the use of one of the engine 75 and the motor 77 as a drive source. The engine 75 is a main power source, and may be an engine such as a petrol engine. In the case where the engine 75 is used as a power source, drive power (torque) of the engine 75 is transferred, for example, to the front tire 86 or the rear tire 88 through the differential 78, the transmission 80, and the clutch 81 that are drive sections. It is to be noted that the torque of the engine 75 is also transferred to the electric generator 79. Due to the torque, the electric generator 79 generates alternating-current electric power, and the alternating-current electric power is converted to direct-current electric power through the inverter 83 and is stored in the electric power source 76. On the other hand, in the case where the motor 77 that is a conversion section is used as a power source, electric power (direct-current electric power) supplied from the electric power source 76 is converted to alternating-current electric power through the inverter 82. The motor 77 is driven by the alternating-current electric power. Drive power (torque) converted from the electric power by the motor 77 is transferred, for example, to the front tire 86 or the rear tire 88 through the differential 78, the transmission 80, and the clutch 81 that are the drive sections.

It is to be noted that the mechanism may be adopted in which, when speed of the electric vehicle is reduced by an unillustrated brake mechanism, the resistance at the time of speed reduction is transferred to the motor 77 as torque, and the motor 77 generates alternating-current electric power by the torque. It is preferable that the alternating-current electric power be converted to direct-current electric power through the inverter 82, and the direct-current regenerative electric power be stored in the electric power source 76.

The control section 74 controls operations of the electric vehicle as a whole, and, for example, may include a CPU and/or the like. The electric power source 76 includes one or more secondary batteries (not illustrated). The electric power source 76 may be connected to an external electric power source, and may be allowed to store electric power by receiving electric power from the external electric power source. The various sensors 84 may be used, for example, for controlling the number of revolutions of the engine 75 or for controlling opening level (throttle opening level) of an unillustrated throttle valve. The various sensors 84 may include sensors such as, a speed sensor, an acceleration sensor, and an engine frequency sensor.

It is to be noted that the description has been given above of the hybrid automobile as an electric vehicle. However, the electric vehicle may be a vehicle (electric automobile) that operates by using only the electric power source 76 and the motor 77 without using the engine 75.

[2-3. Electric Power Storage System]

Figure 7:
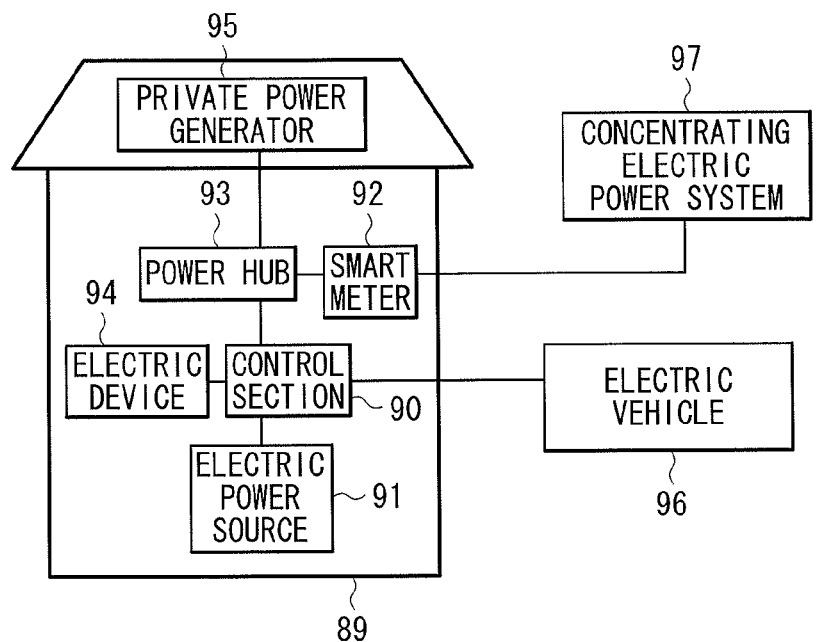
FIG. 7 is a block diagram illustrating a configuration of an application example (electric power storage system) of the secondary battery.

FIG. 7 illustrates a block configuration of an electric power storage system. The electric power storage system may include, for example, a control section 90, an electric power source 91, a smart meter 92, and a power hub 93 inside a house 89 such as a general residence and a commercial building, as illustrated in FIG. 7.

In this example, the electric power source 91 may be connected to an electric device 94 arranged inside the house 89, and may be connectable to an electric vehicle 96 parked outside the house 89, for example. Further, the electric power source 91 may be connected to a private power generator 95 arranged in the house 89 through the power hub 93, and may be connectable to an external concentrating electric power system 97 thorough the smart meter 92 and the power hub 93, for example.

It is to be noted that the electric device 94 may include, for example, one or more home electric appliances such as a refrigerator, an air conditioner, a television, and a water heater. The private power generator 95 may be, for example, one or more of generators such as a solar power generator and a wind-power generator. The electric vehicle 96 may be, for example, one or more of vehicles such as an electric automobile, an electric motorcycle, and a hybrid automobile. The concentrating electric power system 97 may be, for example, one or more of electric power systems such as a thermal power plant, an atomic power plant, a hydraulic power plant, and a wind-power plant.

The control section 90 controls operations of the electric power storage system as a whole (including a used state of the electric power source 91), and, may include, for example, a CPU and/or the like. The electric power source 91 includes one or more secondary batteries (not illustrated). The smart meter 92 may be, for example, an electric power meter compatible with a network arranged in the house 89 that demands electric power, and may be communicable with an electric power supplier. Accordingly, for example, while the smart meter 92 communicates with the outside as necessary, the smart meter 92 controls the balance between supply and demand in the house 89 and allows effective and stable energy supply.

In the electric power storage system, for example, electric power is stored in the electric power source 91 from the concentrating electric power system 97 that is an external electric power source through the smart meter 92 and the power hub 93, and electric power is stored in the electric power source 91 from the private power generator 95 that is an independent electric power source through the power hub 93. The electric power stored in the electric power source 91 is supplied to the electric device 94 or the electric vehicle 96 as necessary according to an instruction of the control section 90. Therefore, the electric device 94 becomes operable, and the electric vehicle 96 becomes chargeable. In other words, the electric power storage system is a system that achieves storing and supplying of electric power in the house 89 with the use of the electric power source 91.

The electric power stored in the electric power source 91 is arbitrarily used. Therefore, for example, electric power may be stored in the electric power source 91 from the concentrating electric power system 97 in the middle of the night when an electric rate is inexpensive, and the electric power stored in the electric power source 91 may be used during daytime hours when the electric rate is expensive.

It is to be noted that the above-described electric power storage system may be arranged for each household (family unit), or may be arranged for a plurality of households (a plurality of family units).

[2-4. Electric Power Tool]

Figure 8:
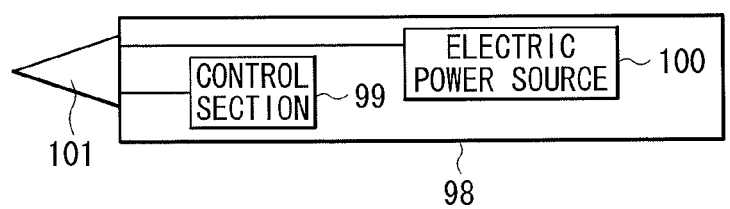
FIG. 8 is a block diagram illustrating a configuration of an application example (electric power tool) of the secondary battery.

FIG. 8 illustrates a block configuration of an electric power tool. The electric power tool may be, for example, an electric drill, and may include, for example, a control section 99 and an electric power source 100 in a tool body 98 made of materials such as a plastic material, as illustrated in FIG. 8. For example, a drill section 101 that is a movable section may be attached to the tool body 98 in an operable (rotatable) manner.

The control section 99 controls operations of the electric power tool as a whole (including a used state of the electric power source 100), and may include, for example, a CPU and/or the like. The electric power source 100 includes one or more secondary batteries (not illustrated). The control section 99 controls each section so that electric power is supplied from the electric power source 100 to the drill section 101 as necessary according to an operation of an unillustrated operation switch to operate the drill section 101.

EXAMPLES

Specific Examples according to the embodiments of the present technology will be described in detail.

[(1) Unsaturated Cyclic Ester Carbonate and Aromatic Compound]

First, various characteristics of the secondary battery were examined with use of the aromatic compounds together with the unsaturated cyclic ester carbonate.

Examples 1-1 to 1-35

Figure 2:
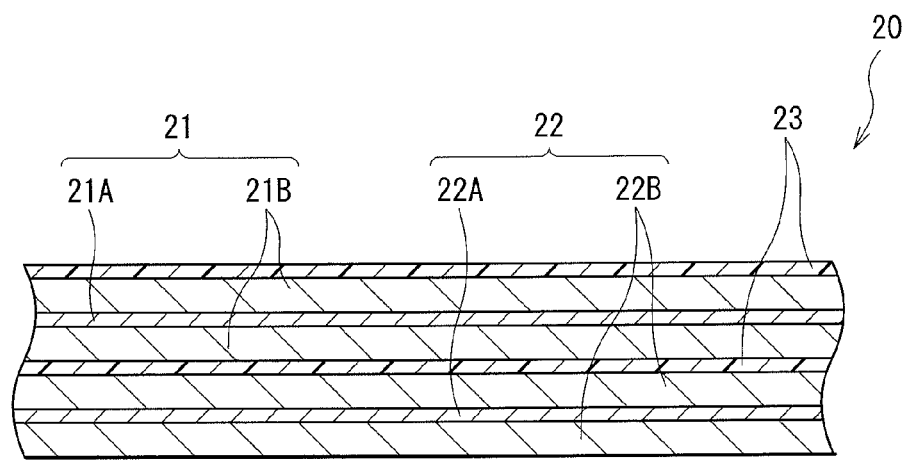
FIG. 2 is a cross-sectional view illustrating an enlarged part of a spirally wound electrode body illustrated in FIG. 1.

The cylindrical type lithium ion secondary batteries illustrated in FIG. 1 and FIG. 2 were manufactured by the following procedures.

In preparing the cathode 21, first, lithium carbonate ($Li_2CO_3$) and cobalt carbonate ($CoCO_3$) were mixed so that the molar ratio thereof was $Li_2CO_3:CoCO_3=0.5:1$. Subsequently, the mixture was fired (at 900° C. for 5 hours) in the air to obtain a lithium-cobalt composite oxide ($LiCoO_2$). Subsequently, 91 parts by mass of the cathode active material ($LiCoO_2$), 3 parts by mass of the cathode binder (polyvinylidene fluoride: PVDF), and 6 parts by mass of the cathode conductive agent (graphite) were mixed to prepare a cathode mixture. Subsequently, the cathode mixture was dispersed in an organic solvent (N-methyl-2-pyrolidone: NMP) to prepare paste cathode mixture slurry. Subsequently, the both surfaces of the strip-like cathode current collector 21A (an aluminum foil with a thickness of 20 μm) were uniformly coated with the cathode mixture slurry with use of a coating device, and the resultant was dried to form the cathode active material layer 21B. Lastly, the cathode active material layer 21B was compression-molded with a roll-pressing machine.

In preparing the anode 22, 90 parts by mass of the anode active material (artificial graphite which is a carbon material) and 10 parts by mass of the anode binder (PVDF) were mixed to prepare an anode mixture. Subsequently, the anode mixture was dispersed in an organic solvent (NMP) to prepare paste anode mixture slurry. Subsequently, both surfaces of the stripe-like anode current collector 22A were uniformly coated with the anode mixture slurry with use of the coating device, and the resultant was dried to form the anode active material layer 22B. Lastly, the anode active material layer 22B was compression-molded with a roll-pressing machine.

In preparing the electrolytic solvent, electrolyte salt ($LiPF_6$) was dissolved in a solvent (ethylene carbonate (EC) and dimethyl carbonate (DMC)). After that, the unsaturated cyclic ester carbonate and the aromatic compound were added to the resultant where appropriate as shown in Table 1 and Table 2. In this example, the composition of the solvent was set to be EC:DMC=50:50 at weight ratio, and the content of the electrolyte salt with respect to the solvent was set to be 1 mol/kg. It is to be noted that benzene was used together with the unsaturated cyclic ester carbonate where appropriate for the sake of comparison.

In assembling the secondary battery, first, the cathode lead 25 made of aluminum was welded to the cathode current collector 21A, and the anode lead 26 made of nickel was welded to the anode current collector 22A. Subsequently, the cathode 21 and the anode 22 were laminated with the separator 23 (microporous polypropylene film with a thickness of 25 μm) in between and were spirally wound. After that, the end of the wound portion was fixed with an adhesive tape to prepare the spirally wound electrode body 20. Subsequently the center pin 24 was inserted in the center of the spirally wound electrode body 20. Subsequently, the spirally wound electrode body 20 was sandwiched between the pair of insulating plates 12 and 13 and contained inside the battery can 11 that is made of iron and plated with nickel. In this example, one end of the cathode lead 25 was welded to the safety valve mechanism 15, and one end of the anode lead 26 was welded to the battery can 11. Subsequently, the electrolytic solution was injected into the battery can 11 by depressurization to allow the separator 23 to be impregnated with the electrolytic solution. Lastly, the battery cover 14, the safety valve mechanism 15, and the PTC device 16 were swaged with the gasket 17 in between to be fixed onto the open end of the battery can 11. Thus, the cylindrical type secondary battery was completed. It is to be noted that the thickness of the cathode active material layer 21B was adjusted in manufacturing the secondary battery so that lithium metal did not precipitate on the anode 22 when the battery is fully charged.

Battery characteristics (cycle characteristics and safety) of the secondary battery were examined and results shown in Table 1 and Table 2 were obtained.

In examining cycle characteristics, the secondary battery was charged and discharged for 1 cycle in an ambient temperature environment (23° C.) to stabilize the battery state. After that, the secondary battery was charged and discharged for another cycle in the same environment, and the discharge capacity thereof was measured. Subsequently, the secondary battery were charged and discharged repeatedly in a high temperature environment (40° C.) until the total number of cycle reached 100, and then, the discharge capacity thereof was measured. Based on this result, cycle retention ratio (%)=(discharge capacity at the 100th cycle/discharge capacity at the 2nd cycle)×100 was calculated. At the time of charging, the secondary battery was charged at a current of 0.2 C until the voltage reached the upper limit voltage of 4.2 V, and then, the secondary battery was charged at a voltage of 4.2 V until the current reached 0.05 C. At the time of discharging, the secondary battery was discharged at a current of 0.2 C until the voltage reached the final voltage of 2.5 V. It is to be noted that "0.2 C" and "0.05 C" refer to current values with which the battery capacity (theoretical capacity) is completely discharged in 5 hours and in 20 hours, respectively.

In examining safety, the secondary battery with a battery state that was stabilized with procedures similar to those in examining the cycle characteristics was used. The secondary battery was charged and discharged for 1 cycle at the ambient temperature environment (23° C.), and then, the secondary battery was over-charged in a high temperature environment (50° C.). After that, whether or not gas was blasted was examined. In this example, whether or not gas was blasted was confirmed for five secondary batteries for each Example. The number of the secondary battery with no gas blast was determined as the number of good batteries. At the time of charge and discharge at the initial cycle, the secondary battery was charged at a current of 0.2 C until the voltage reached the upper limit voltage of 4.2 V, and the secondary battery was further charged at a voltage of 4.2 V until the current reached 0.05 C. After that, the secondary battery was discharged at a current of 0.2 C until the voltage reached the final voltage of 3 V. At the time of over-charge, the secondary battery was charged at a constant current of 1 C until the voltage reached a voltage of 18 V.

TABLE 1

Anode active material: artificial graphite

| Example | Electrolyte salt | Solvent | Unsaturated cyclic ester carbonate Type | Content (wt %) | Aromatic Compound Type | Content (wt %) | Cycle retention ratio (%) | Number of good batteries |
|---|---|---|---|---|---|---|---|---|
| 1-1 | LiPF$_6$ | EC + DMC | Formula (1-1) | 2 | Formula (2-3) | 0.1 | 82 | 2/5 |
| 1-2 | | | | | | 0.5 | 85 | 3/5 |
| 1-3 | | | | | | 1 | 85 | 5/5 |
| 1-4 | | | | | | 2 | 83 | 5/5 |
| 1-5 | | | | | | 5 | 81 | 5/5 |
| 1-6 | | | | | | 10 | 77 | 5/5 |
| 1-7 | | | Formula (1-1) | 0.01 | Formula (2-3) | 1 | 77 | 5/5 |
| 1-8 | | | | 0.1 | | | 80 | 5/5 |
| 1-9 | | | | 0.5 | | | 82 | 5/5 |
| 1-10 | | | | 1 | | | 85 | 5/5 |
| 1-11 | | | | 5 | | | 85 | 5/5 |
| 1-12 | | | | 10 | | | 83 | 5/5 |
| 1-13 | | | Formula (1-1) | 2 | Formula(2-4) | 1 | 83 | 5/5 |
| 1-14 | | | | | Formula (2-9) | | 85 | 5/5 |
| 1-15 | | | | | Formula (2-11) | | 84 | 5/5 |
| 1-16 | | | | | Formula (2-13) | | 84 | 5/5 |
| 1-17 | | | Formula (1-4) | 2 | Formula (2-3) | 1 | 82 | 5/5 |
| 1-18 | | | Formula (1-16) | | | | 83 | 5/5 |
| 1-19 | | | Formula (1-18) | | | | 83 | 5/5 |
| 1-20 | | | Formula (1-32) | | | | 84 | 5/5 |
| 1-21 | | | Formula (1-53) | | | | 84 | 5/5 |

TABLE 2

Anode active material: artificial graphite

| Example | Electrolyte salt | Solvent | Unsaturated cyclic ester carbonate Type | Content (wt %) | Aromatic compound Type | Content (wt %) | Cycle retention ratio (%) | Number of good batteries |
|---|---|---|---|---|---|---|---|---|
| 1-22 | LiPF$_6$ | EC + DMC | — | — | — | — | 75 | 0/5 |
| 1-23 | | | Formula (1-1) | 2 | — | — | 75 | 0/5 |

TABLE 2-continued

Anode active material: artificial graphite

| Example | Electrolyte salt | Solvent | Unsaturated cyclic ester carbonate Type | Content (wt %) | Aromatic compound Type | Content (wt %) | Cycle retention ratio (%) | Number of good batteries |
|---|---|---|---|---|---|---|---|---|
| 1-24 | | | Formula (1-4) | | | | 74 | 0/5 |
| 1-25 | | | Formula (1-16) | | | | 74 | 0/5 |
| 1-26 | | | Formula (1-18) | | | | 74 | 0/5 |
| 1-27 | | | Formula (1-32) | | | | 75 | 0/5 |
| 1-28 | | | Formula (1-53) | | | | 75 | 0/5 |
| 1-29 | | | — | — | Formula (2-3) | 1 | 60 | 3/5 |
| 1-30 | | | | | Formula (2-4) | | 62 | 4/5 |
| 1-31 | | | | | Formula (2-9) | | 60 | 4/5 |
| 1-32 | | | | | Formula (2-11) | | 58 | 4/5 |
| 1-33 | | | | | Formula (2-13) | | 58 | 4/5 |
| 1-34 | | | — | — | benzene | 1 | 45 | 0/5 |
| 1-35 | | | Formula (1-1) | 2 | benzene | 1 | 45 | 0/5 |

In the examples in which a non-metal-based material (carbon material) was used as the anode active material, when the electrolytic solution included the aromatic compound together with the unsaturated cyclic ester carbonate, high cycle retention ratio was obtained and good batteries were secured.

In detail, the example (Example 1-22) in which the electrolytic solution include neither the unsaturated cyclic ester carbonate nor the aromatic compound was used as a reference. In the examples (Examples 1-23 to 1-28) in which the electrolytic solution included only the unsaturated cyclic ester carbonate, the cycle retention ratio was only as substantially the same as that of the above-described reference, and no good battery was obtained. Further, in the examples (Examples 1-29 to 1-33) in which the electrolytic solution included only the aromatic compound, good batteries were obtained but the cycle retention ratio was decreased compared to the above-described reference. On the other hand, in the examples (Examples 1-1 to 1-21) in which the electrolytic solution included the unsaturated cyclic ester carbonate and the aromatic compound, the cycle retention ratio was increased and good batteries were obtained compared to the above-described reference. It can be seen from these results that, when the electrolytic solution includes both the unsaturated cyclic ester carbonate and the aromatic compound, the decomposition reaction of the electrolytic solution is significantly suppressed due to the synergetic action of the unsaturated cyclic ester carbonate and the aromatic compound.

In particular, in the examples in which the electrolytic solution included the unsaturated cyclic ester carbonate and the aromatic compound, when the content of the unsaturated cyclic ester carbonate was from 0.01 wt % to 10 wt % both inclusive and the content of the aromatic compound was from 0.1 wt % to 10 wt % both inclusive, favorable results were obtained.

It is to be noted that, in the examples (Examples 1-34 and 1-35) in which benzene was used, the cycle retention ratio and the number of good batteries did not vary depending on whether or not the unsaturated cyclic ester carbonate was included. It can be seen from this result that the decomposition reaction of the electrolytic solution is not significantly suppressed when the unsaturated cyclic ester carbonate is used in combination with benzene, which is different in the examples in which the unsaturated cyclic ester carbonate is used in combination with the aromatic compound.

Examples 2-1 to 2-15

Secondary batteries were manufactured in procedures similar to those in Example 1-3 except that the composition of the solvent was changed as shown in Table 3, and various characteristics thereof were examined.

The solvents used in combination with EC were diethyl carbonate (DEC), ethyl methyl carbonate (EMC), and propyl carbonate (PC). Other than these materials, vinylene carbonate (VC) was used as the other unsaturated cyclic ester carbonate. 4-fluoro-1,3-dioxolan-2-one (FEC), cis-4,5-difluoro-1,3-dioxolan-2-one (c-DFEC), trans-4,5-difluoro-1,3-dioxolan-2-one (t-DFEC), and bis(fluoromethyl) carbonate (DFDMC) were used as the halogenated ester carbonate. Propene sultone (PRS) was used as the sultone. succinic anhydride (SCAH) and sulfopropionic anhydride (PSAH) were used as the acid anhydride.

The composition of the solvent was set to be EC:PC:DMC=10:20:70 at weight ratio. In the solvent, the content of VC was 2 wt %, the content of FEC, c-DFEC, t-DFEC, or DFDMC was 5 wt %, and the content of PRS, SCAH, or PSAH was 1 wt %.

TABLE 3

| | | | Unsaturated cyclic ester carbonate | | Aromatic compound | | Cycle retention | Number of |
|---|---|---|---|---|---|---|---|---|
| Example | Electrolyte salt | Solvent | Type | Content (wt %) | Type | Content (wt %) | ratio (%) | good batteries |
| | | Anode active material: artificial graphite | | | | | | |
| 2-1 | LiPF$_6$ | EC + DEC | Formula (1-1) | 2 | Formula (2-3) | 1 | 85 | 5/5 |
| 2-2 | | EC + EMC | | | | | 86 | 5/5 |
| 2-3 | | EC + PC + DMC | | | | | 88 | 5/5 |
| 2-4 | | EC + VC | | | | | 90 | 5/5 |
| 2-5 | | DMC FEC | | | | | 91 | 5/5 |
| 2-6 | | c-DFEC | | | | | 90 | 5/5 |
| 2-7 | | t-DFEC | | | | | 90 | 5/5 |
| 2-8 | | DFDMC | | | | | 89 | 5/5 |
| 2-9 | | PRS | | | | | 90 | 5/5 |
| 2-10 | | SCAH | | | | | 90 | 5/5 |
| 2-11 | | PSAH | | | | | 92 | 5/5 |
| 2-12 | LiPF$_6$ | EC + VC | — | — | — | — | 80 | 0/5 |
| 2-13 | | DMC FEC | | | | | 79 | 0/5 |
| 2-14 | | t-DFEC | | | | | 79 | 0/5 |
| 2-15 | | DFDMC | | | | | 78 | 0/5 |

High cycle retention ratio and large number of good batteries were obtained even when the composition of the solvent was changed. In particular, the cycle retention ratio was further increased when the electrolytic solution included the other unsaturated cyclic ester carbonates, the halogenated ester carbonate, the sultone, or the acid anhydride.

Example 3-1 to 3-3

Secondary batteries were manufactured in procedures similar to those in Example 1-3 except that the composition of the electrolyte salt was changed as shown in Table 4, and various characteristics thereof were examined.

The electrolyte salt used in combination with LiPF$_6$ was one of lithium tetrafluoroborate (LiBF$_4$), bis[oxalato-O,O'] lithium borate (LiBOB), and bis(trifluoromethane sulfonyl) imide lithium (LiN(CF$_3$SO$_2$)$_2$:LiTFSI). In this example, the content of LiPF$_6$ with respect to the non-aqueous solvent was set to be 0.9 mol/kg, and the content of LiBF$_4$ and the like with respect to the non-aqueous solvent was set to be 0.1 mol/kg.

TABLE 4

| | | | | Unsaturated cyclic ester carbonate | | Aromatic compound | | Cycle retention | Number of |
|---|---|---|---|---|---|---|---|---|---|
| Example | Electrolyte salt | | Solvent | Type | Content (wt %) | Type | Content (wt %) | ratio (%) | good batteries |
| | | | Anode active material: artificial graphite | | | | | | |
| 3-1 | LiPF$_6$ | LiBF$_4$ | EC + | Formula (1-1) | 2 | Formula (2-3) | 1 | 88 | 5/5 |
| 3-2 | | LiBOB | DMC | | | | | 90 | 5/5 |
| 3-3 | | LiTFSI | | | | | | 88 | 5/5 |

High cycle retention ratio and large number of good batteries were obtained even when the composition of the electrolyte salt was changed. In particular, the cycle retention ratio was further increased when the electrolytic solution included other electrolyte salts such as LiBF$_4$.

Examples 4-1 to 4-35, 5-1 to 5-15, and 6-1 to 6-3

Secondary batteries were manufactured in procedures similar to those in Examples 1-1 to 1-35, 2-1 to 2-15, and 3-1 to 3-3 except that the anode active material layer 22B was formed with use of a metal-based material (silicon) as the anode active material, and the various characteristics thereof were examined as shown in Table 5 to Table 8.

In forming the anode active material layer 22B, the anode active material (silicon) was deposited on the both surfaces of the anode current collector 22A (electrolytic copper foil with a thickness of 15 μm) by an electron beam evaporation method. It is to be noted that the deposition process was repeated for ten times until the thickness of the anode active material layer 22B on one surface of the anode current collector 22A became 6 μm.

TABLE 5

Anode active material: silicon

| Example | Electrolyte salt | Solvent | Unsaturated cyclic ester carbonate Type | Unsaturated cyclic ester carbonate Content (wt %) | Aromatic compound Type | Aromatic compound Content (wt %) | Cycle retention ratio (%) | Number of good batteries |
|---|---|---|---|---|---|---|---|---|
| 4-1  | LiPF$_6$ | EC + DMC | Formula (1-1)  | 2    | Formula (2-3)  | 0.1 | 55 | 2/5 |
| 4-2  |          |          |                |      |                | 0.5 | 58 | 3/5 |
| 4-3  |          |          |                |      |                | 1   | 60 | 5/5 |
| 4-4  |          |          |                |      |                | 2   | 60 | 5/5 |
| 4-5  |          |          |                |      |                | 5   | 58 | 5/5 |
| 4-6  |          |          |                |      |                | 10  | 50 | 5/5 |
| 4-7  |          |          | Formula (1-1)  | 0.01 | Formula (2-3)  | 1   | 48 | 5/5 |
| 4-8  |          |          |                | 0.1  |                |     | 50 | 5/5 |
| 4-9  |          |          |                | 0.5  |                |     | 55 | 5/5 |
| 4-10 |          |          |                | 1    |                |     | 58 | 5/5 |
| 4-11 |          |          |                | 5    |                |     | 58 | 5/5 |
| 4-12 |          |          |                | 10   |                |     | 52 | 5/5 |
| 4-13 |          |          | Formula (1-1)  | 2    | Formula (2-4)  | 1   | 59 | 5/5 |
| 4-14 |          |          |                |      | Formula (2-9)  |     | 58 | 5/5 |
| 4-15 |          |          |                |      | Formula (2-11) |     | 58 | 5/5 |
| 4-16 |          |          |                |      | Formula (2-13) |     | 58 | 5/5 |
| 4-17 |          |          | Formula (1-4)  | 2    | Formula (2-3)  | 1   | 55 | 5/5 |
| 4-18 |          |          | Formula (1-16) |      |                |     | 56 | 5/5 |
| 4-19 |          |          | Formula (1-18) |      |                |     | 56 | 5/5 |
| 4-20 |          |          | Formula (1-32) |      |                |     | 56 | 5/5 |
| 4-21 |          |          | Formula (1-53) |      |                |     | 59 | 5/5 |

TABLE 6

Anode active material: silicon

| Example | Electrolyte salt | Solvent | Unsaturated cyclic ester carbonate Type | Unsaturated cyclic ester carbonate Content (wt %) | Aromatic compound Type | Aromatic compound Content (wt %) | Cycle retention ratio (%) | Number of good batteries |
|---|---|---|---|---|---|---|---|---|
| 4-22 | LiPF$_6$ | EC + DMC | —              | — | —              | — | 40 | 0/5 |
| 4-23 |          |          | Formula (1-1)  | 2 | —              |   | 42 | 0/5 |
| 4-24 |          |          | Formula (1-4)  |   |                |   | 41 | 0/5 |
| 4-25 |          |          | Formula (1-16) |   |                |   | 41 | 0/5 |
| 4-26 |          |          | Formula (1-18) |   |                |   | 41 | 0/5 |
| 4-27 |          |          | Formula (1-32) |   |                |   | 41 | 0/5 |
| 4-28 |          |          | Formula (1-53) |   |                |   | 42 | 0/5 |
| 4-29 |          |          | —              | — | Formula (2-3)  | 1 | 28 | 2/5 |
| 4-30 |          |          |                |   | Formula (2-4)  |   | 30 | 4/5 |
| 4-31 |          |          |                |   | Formula (2-9)  |   | 28 | 3/5 |
| 4-32 |          |          |                |   | Formula (2-11) |   | 29 | 3/5 |
| 4-33 |          |          |                |   | Formula (2-13) |   | 30 | 3/5 |
| 4-34 |          |          | —              | — | benzene        | 1 | 10 | 0/5 |
| 4-35 |          |          | Formula (1-1)  | 2 | benzene        | 1 | 10 | 0/5 |

TABLE 7

| Example | Electrolyte salt | Solvent | Unsaturated cyclic ester carbonate Type | Unsaturated cyclic ester carbonate Content (wt %) | Aromatic compound Type | Aromatic compound Content (wt %) | Cycle Retention ratio (%) | Number of good batteries |
|---|---|---|---|---|---|---|---|---|
| 5-1 | LiPF$_6$ | EC + DEC       | Formula (1-1) | 2 | Formula (2-3) | 1 | 60 | 5/5 |
| 5-2 |          | EC + EMC       |               |   |               |   | 62 | 5/5 |
| 5-3 |          | EC + PC + DMC  |               |   |               |   | 62 | 5/5 |
| 5-4 |          | EC + DMC   VC  |               |   |               |   | 80 | 5/5 |
| 5-5 |          |            FEC |               |   |               |   | 82 | 5/5 |
| 5-6 |          |            c-DFEC |            |   |               |   | 88 | 5/5 |

TABLE 7-continued

| Example | Electrolyte salt | Solvent | Unsaturated cyclic ester carbonate Type | Content (wt %) | Aromatic compound Type | Content (wt %) | Cycle Retention ratio (%) | Number of good batteries |
|---|---|---|---|---|---|---|---|---|
| 5-7 | | | t-DFEC | | | | 88 | 5/5 |
| 5-8 | | | DFDMC | | | | 80 | 5/5 |
| 5-9 | | | PRS | | | | 75 | 5/5 |
| 5-10 | | | SCAH | | | | 75 | 5/5 |
| 5-11 | | | PSAH | | | | 77 | 5/5 |
| 5-12 | LiPF$_6$ | EC + | VC | — | — | — | 47 | 0/5 |
| 5-13 | | DMC | FEC | | | | 53 | 0/5 |
| 5-14 | | | t-DFEC | | | | 53 | 0/5 |
| 5-15 | | | DFDMC | | | | 53 | 0/5 |

Anode active material: silicon

TABLE 8

Anode active material: silicon

| Example | Electrolyte salt | Solvent | Unsaturated cyclic ester carbonate Type | Content (wt %) | Aromatic compound Type | Content (wt %) | Cycle retention ratio (%) | Number of good batteries |
|---|---|---|---|---|---|---|---|---|
| 6-1 | LiPF$_6$ LiBF$_4$ | EC + | Formula (1-1) | 2 | Formula (2-3) | 1 | 65 | 5/5 |
| 6-2 | LiBOB | DMC | | | | | 68 | 5/5 |
| 6-3 | LiTFSI | | | | | | 68 | 5/5 |

Results similar to those shown in Table 1 to Table 4 were obtained even when the type of the anode active material was changed. In other words, when the electrolytic solution included the unsaturated cyclic ester carbonate and the aromatic compound, high cycle retention ratio and large number of good batteries were obtained. Tendencies other than this will not be described since the tendencies were similar to those described for the results shown in Table 1 to Table 4.

[(2) Unsaturated Cyclic Ester Carbonate and Dinitrile Compound]

Next, various characteristics of the secondary battery were examined with use of dinitrile compounds together with the unsaturated cyclic ester carbonate.

Examples 7-1 to 7-33, 8-1 to 8-15, 9-1 to 9-3, 10-1 to 10-33, 11-1 to 11-15, and 12-1 to 12-3

Secondary batteries were manufactured in procedures similar to those in Examples 1-1 to 1-33, 2-1 to 2-15, 3-1 to 3-3, 4-1 to 4-33, 5-1 to 5-15, and 6-1 to 6-3 except that a dinitrile compound was used instead of the aromatic compound. Types and contents of the dinitrile compound were as shown in Table 9 to Table 16. It is to be noted that mononitrile compound (acetonitrile: AN) was used together with the unsaturated cyclic ester carbonate where appropriate for the sake of comparison.

Battery characteristics (cycle characteristics and safety) of the secondary battery were examined and results shown in Table 9 to Table 16 were obtained. The procedures of examining the cycle characteristics were similar to those in the case in which the aromatic compound was used (Table 1 to Table 8). In examining the safety, the secondary battery in which the battery state thereof was stabilized by procedures similar to those in examining the cycle characteristics was used. The secondary battery was charged again in the same environment (23° C.) at a constant current of 0.2 C until the voltage reached the upper limit voltage of 4.2 V. Subsequently, the secondary battery was charged at a constant current of 0.5 C in a high temperature environment (60° C.) until the secondary battery was fully charged. After that, the charge was switched to constant voltage charge and the secondary battery was continuously charged (for 600 hours). Then, the leakage current (mA) was measured. It is to be noted that "0.5 C" is a value of current with which the battery capacity is discharged in 2 hours.

TABLE 9

Anode active material: artificial graphite

| Example | Electrolyte salt | Solvent | Unsaturated cyclic ester carbonate Type | Content (wt %) | Dinitrile compound Type | Content (wt %) | Cycle retention ratio (%) | Leakage current (mA) |
|---|---|---|---|---|---|---|---|---|
| 7-1 | LiPF$_6$ | EC + | Formula (1-1) | 2 | Formula (6-2) | 0.1 | 80 | 4.4 |
| 7-2 | | DMC | | | | 0.5 | 81 | 3 |
| 7-3 | | | | | | 1 | 85 | 2 |

TABLE 9-continued

Anode active material: artificial graphite

| Example | Electrolyte salt | Solvent | Unsaturated cyclic ester carbonate Type | Content (wt %) | Dinitrile compound Type | Content (wt %) | Cycle retention ratio (%) | Leakage current (mA) |
|---|---|---|---|---|---|---|---|---|
| 7-4 | | | | | | 2 | 85 | 1 |
| 7-5 | | | | | | 5 | 83 | 0.6 |
| 7-6 | | | | | | 10 | 80 | 0.6 |
| 7-7 | | | Formula (1-1) | 0.01 | Formula (6-2) | 1 | 80 | 2.5 |
| 7-8 | | | | 0.1 | | | 81 | 2.8 |
| 7-9 | | | | 0.5 | | | 84 | 2.5 |
| 7-10 | | | | 1 | | | 85 | 2.2 |
| 7-11 | | | | 5 | | | 86 | 1.5 |
| 7-12 | | | | 10 | | | 84 | 0.8 |
| 7-13 | | | Formula (1-1) | 2 | Formula (6-1) | 1 | 83 | 1.8 |
| 7-14 | | | | | Formula (6-3) | | 87 | 1.8 |
| 7-15 | | | | | Formula (6-4) | | 85 | 2 |
| 7-16 | | | | | Formula (6-10) | | 84 | 2 |
| 7-17 | | | Formula (1-4) | 2 | Formula (6-2) | 1 | 83 | 2 |
| 7-18 | | | Formula (1-16) | | | | 84 | 2 |
| 7-19 | | | Formula (1-18) | | | | 84 | 2 |
| 7-20 | | | Formula (1-32) | | | | 84 | 2 |

TABLE 10

Anode active material: artificial graphite

| Example | Electrolyte salt | Solvent | Unsaturated cyclic ester carbonate Type | Content (wt %) | Dinitrile compound Type | Content (wt %) | Cycle retention ratio (%) | Leakage current (mA) |
|---|---|---|---|---|---|---|---|---|
| 7-21 | LiPF$_6$ | EC + DMC | — | — | — | — | 75 | 5.5 |
| 7-22 | | | Formula (1-1) | 2 | — | | 75 | 5.5 |
| 7-23 | | | Formula (1-4) | | | | 74 | 5.5 |
| 7-24 | | | Formula (1-16) | | | | 74 | 5.5 |
| 7-25 | | | Formula (1-18) | | | | 74 | 5.5 |
| 7-26 | | | Formula (1-32) | | | | 75 | 5.5 |
| 7-27 | | | — | — | Formula (6-1) | 1 | 56 | 2.8 |
| 7-28 | | | | | Formula (6-2) | | 60 | 3 |
| 7-29 | | | | | Formula (6-3) | | 62 | 3.2 |
| 7-30 | | | | | Formula (6-4) | | 62 | 3.5 |
| 7-31 | | | | | Formula (6-10) | | 56 | 3.5 |
| 7-32 | LiPF$_6$ | EC + DMC | — | — | acetonitrile | 2 | 40 | 4 |
| 7-33 | | | Formula (1-1) | 2 | acetonitrile | 2 | 41 | 4 |

TABLE 11

Anode active material: artificial graphite

| Example | Electrolyte salt | Solvent | Unsaturated cyclic ester carbonate Type | Content (wt %) | Dinitrile compound Type | Content (wt %) | Cycle retention ratio (%) | Leakage current (mA) |
|---|---|---|---|---|---|---|---|---|
| 8-1 | LiPF$_6$ | EC + DEC | Formula (1-1) | 2 | Formula (6-2) | 1 | 86 | 1.6 |
| 8-2 | | EC + EMC | | | | | 87 | 1.8 |
| 8-3 | | EC + PC + DMC | | | | | 87 | 1.6 |
| 8-4 | | EC + VC | | | | | 90 | 1.4 |
| 8-5 | | DMC FEC | | | | | 88 | 2 |
| 8-6 | | c-DFEC | | | | | 87 | 2 |
| 8-7 | | t-DFEC | | | | | 87 | 2 |
| 8-8 | | DFDMC | | | | | 88 | 2 |

TABLE 11-continued

Anode active material: artificial graphite

| Example | Electrolyte salt | Solvent | Unsaturated cyclic ester carbonate Type | Content (wt %) | Dinitrile compound Type | Content (wt %) | Cycle retention ratio (%) | Leakage current (mA) |
|---|---|---|---|---|---|---|---|---|
| 8-9 | | | PRS | | | | 90 | 1.2 |
| 8-10 | | | SCAH | | | | 90 | 1.4 |
| 8-11 | | | PSAH | | | | 95 | 0.8 |
| 8-12 | LiPF$_6$ | EC + | VC | — | — | — | 80 | 5.2 |
| 8-13 | | DMC | FEC | | | | 79 | 5.8 |
| 8-14 | | | t-DFEC | | | | 78 | 6 |
| 8-15 | | | DFDMC | | | | 78 | 5.5 |

TABLE 12

Anode active material: artificial graphite

| Example | Electrolyte salt | Solvent | Unsaturated cyclic ester carbonate Type | Content (wt %) | Dinitrile compound Type | Content (wt %) | Cycle retention ratio (%) | Leakage current (mA) |
|---|---|---|---|---|---|---|---|---|
| 9-1 | LiPF$_6$ LiBF$_4$ | EC + | Formula (1-1) | 2 | Formula (6-2) | 1 | 88 | 1.8 |
| 9-2 | LiBOB | DMC | | | | | 90 | 0.8 |
| 9-3 | LiTFSI | | | | | | 88 | 1.4 |

TABLE 13

Anode active material: silicon

| Example | Electrolyte salt | Solvent | Unsaturated cyclic ester carbonate Type | Content (wt %) | Dinitrile compound Type | Content (wt %) | Cycle retention ratio (%) | Leakage current (mA) |
|---|---|---|---|---|---|---|---|---|
| 10-1 | LiPF$_6$ | EC + | Formula (1-1) | 2 | Formula (6-2) | 0.1 | 59 | 5 |
| 10-2 | | DMC | | | | 0.5 | 60 | 4.2 |
| 10-3 | | | | | | 1 | 62 | 3 |
| 10-4 | | | | | | 2 | 62 | 2 |
| 10-5 | | | | | | 5 | 60 | 1.2 |
| 10-6 | | | | | | 10 | 58 | 0.8 |
| 10-7 | | | Formula (1-1) | 0.01 | Formula (6-2) | 1 | 57 | 4.5 |
| 10-8 | | | | 0.1 | | | 57 | 4 |
| 10-9 | | | | 0.5 | | | 58 | 3.8 |
| 10-10 | | | | 1 | | | 60 | 3.5 |
| 10-11 | | | | 5 | | | 63 | 2 |
| 10-12 | | | | 10 | | | 62 | 1.8 |
| 10-13 | | | Formula (1-1) | 2 | Formula (6-1) | 1 | 60 | 2.5 |
| 10-14 | | | | | Formula (6-3) | | 62 | 1.8 |
| 10-15 | | | | | Formula (6-4) | | 62 | 1.7 |
| 10-16 | | | | | Formula (6-10) | | 60 | 3 |
| 10-17 | | | Formula (1-4) | 2 | Formula (6-2) | 1 | 61 | 3 |
| 10-18 | | | Formula (1-16) | | | | 60 | 3 |
| 10-19 | | | Formula (1-18) | | | | 60 | 3 |
| 10-20 | | | Formula (1-32) | | | | 60 | 3 |

TABLE 14

Anode active material: silicon

| Example | Electrolyte salt | Solvent | Unsaturated cyclic ester carbonate Type | Content (wt %) | Dinitrile compound Type | Content (wt %) | Cycle retention ratio (%) | Leakage current (mA) |
|---|---|---|---|---|---|---|---|---|
| 10-21 | LiPF$_6$ | EC + DMC | — | — | — | — | 40 | 7.9 |
| 10-22 | | | Formula (1-1) | 2 | — | — | 42 | 7.9 |
| 10-23 | | | Formula (1-4) | | | | 41 | 7.9 |
| 10-24 | | | Formula (1-16) | | | | 41 | 7.9 |
| 10-25 | | | Formula (1-18) | | | | 41 | 7.9 |
| 10-26 | | | Formula (1-32) | | | | 41 | 7.9 |
| 10-27 | | | — | — | Formula (6-1) | 1 | 30 | 3.8 |
| 10-28 | | | | | Formula (6-2) | | 30 | 4 |
| 10-29 | | | | | Formula (6-3) | | 32 | 4.5 |
| 10-30 | | | | | Formula (6-4) | | 32 | 4.5 |
| 10-31 | | | | | Formula (6-10) | | 30 | 5 |
| 10-32 | LiPF$_6$ | EC + DMC | — | — | acetonitrile | 2 | 20 | 6.2 |
| 10-33 | | | Formula (1-1) | 2 | acetonitrile | 2 | 22 | 6.2 |

TABLE 15

Anode active material: silicon

| Example | Electrolyte salt | Solvent | Unsaturated cyclic ester carbonate Type | Content (wt %) | Dinitrile compound Type | Content (wt %) | Cycle retention ratio (%) | Leakage current (mA) |
|---|---|---|---|---|---|---|---|---|
| 11-1 | LiPF$_6$ | EC + DEC | Formula (1-1) | 2 | Formula (6-2) | 1 | 64 | 2.8 |
| 11-2 | | EC + EMC | | | | | 63 | 2.8 |
| 11-3 | | EC + PC + DMC | | | | | 64 | 2.5 |
| 11-4 | | EC + VC | | | | | 78 | 2.5 |
| 11-5 | | DMC FEC | | | | | 64 | 3 |
| 11-6 | | c-DFEC | | | | | 63 | 3 |
| 11-7 | | t-DFEC | | | | | 64 | 3 |
| 11-8 | | DFDMC | | | | | 63 | 3 |
| 11-9 | | PRS | | | | | 70 | 2 |
| 11-10 | | SCAH | | | | | 70 | 2.5 |
| 11-11 | | PSAH | | | | | 75 | 1.8 |
| 11-12 | LiPF$_6$ | EC + VC | — | — | — | — | 47 | 7.5 |
| 11-13 | | DMC FEC | | | | | 53 | 7.9 |
| 11-14 | | t-DFEC | | | | | 53 | 8.2 |
| 11-15 | | DFDMC | | | | | 54 | 7.7 |

TABLE 16

Anode active material: silicon

| Example | Electrolyte salt | Solvent | Unsaturated cyclic ester carbonate Type | Content (wt %) | Dinitrile compound Type | Content (wt %) | Cycle retention ratio (%) | Leakage current (mA) |
|---|---|---|---|---|---|---|---|---|
| 12-1 | LiPF$_6$ LiBF$_4$ | EC + DMC | Formula (1-1) | 2 | Formula (6-2) | 1 | 68 | 1.8 |
| 12-2 | LiBOB | | | | | | 70 | 0.8 |
| 12-3 | LiTFSI | | | | | | 68 | 1.2 |

When the electrolytic solution included the dinitrile compound together with the unsaturated cyclic ester carbonate, high cycle retention ratio was obtained and the leakage current was suppressed to a low value irrespective of the type of the anode active material.

In detail, in the case where a carbon material (artificial graphite) was used as the anode active material, the example (Example 7-21) in which the electrolytic solution included neither the unsaturated cyclic ester carbonate nor the dinitrile compound was used as a reference. In the examples (Examples 7-22 to 7-26) in which the electrolytic solution included only the unsaturated cyclic ester carbonate, the cycle retention ratio and the leakage current were substantially the same with those in the above-described reference. Further, in the examples (Examples 7-27 to 7-31) in which the electrolytic solution included only the dinitrile compound, the leakage current was decreased but the cycle retention ratio was significantly decreased compared to the above-described reference. On the other hand, in the examples (Examples 7-1 to 7-20) in which the electrolyte solution included the unsaturated cyclic ester carbonate and the dinitrile compound, the cycle retention ratio was increased and the leakage current was decreased compared to the above-described reference. It can be seen from these results that, when the electrolytic solution includes the unsaturated cyclic ester carbonate and the dinitrile compound, the decomposition reaction of the electrolytic solution is significantly suppressed due to the synergetic action of the unsaturated cyclic ester carbonate and the dinitrile compound.

In particular, in the examples in which the electrolytic solution included the unsaturated cyclic ester carbonate and the dinitrile compound, favorable results were obtained when the content of the unsaturated cyclic ester carbonate was from 0.01 wt % to 10 wt % both inclusive, and the content of the dinitrile compound was from 0.1 wt % to 10 wt % both inclusive.

It is to be noted that, in the examples (Examples 7-33 and 7-34) in which acetonitrile was used, the cycle retention ratio was slightly increased depending on whether or not the unsaturated cyclic ester carbonate was included, but the leakage current did not vary. It can be seen from this result that the decomposition reaction of the electrolytic solution is not significantly suppressed when the unsaturated cyclic ester carbonate is used in combination with acetonitrile, unlike in the example in which the combination of the unsaturated cyclic ester carbonate and the dinitrile compound is used.

The tendency described above was similarly obtained in the examples in which the metal-based material (silicon) was used as the anode active material. Tendencies other than this will not be described since the tendencies were similar to those described for the results shown in Table 1 to Table 8.

[(3) Unsaturated Cyclic Ester Carbonate and Sulfynil Compound]

Next, various characteristics of the secondary battery were examined with use of the sulfynil compound together with the unsaturated cyclic ester carbonate.

Examples 13-1 to 13-36, 14-1 to 14-15, 15-1 to 15-3, 16-1 to 16-36, 17-1 to 17-15, and 18-1 to 18-3

Secondary batteries were manufactured by procedures similar to those in Examples 1-1 to 1-33, 2-1 to 2-15, 3-1 to 3-3, 4-1 to 4-33, 5-1 to 5-15, and 6-1 to 6-3 except that the sulfynil compound was used instead of the aromatic compound. Types and contents of the sulfynil compounds were as shown in Table 17 to Table 24.

Battery characteristics (cycle characteristics, continuous charge characteristics, and safety) of the secondary battery were examined, and the results shown in Table 17 to Table 24 were obtained.

Procedures of examining the cycle characteristics were similar to those using the aromatic compound (Table 1 to Table 8) except that the secondary battery was charged and discharged in a low temperature environment (10° C.) instead of in the high temperature environment, and the maximum value of the number of cycles was changed to 300. Procedures of examining the safety were similar to those in using the dinitrile compound. In examining the continuous charge characteristics, the secondary battery in which the battery state was stabilized by procedures similar to those in examining the cycle characteristics was used. The secondary battery was charged and discharged for one cycle in the same environment and the discharge capacity was measured. After that, the secondary battery was continuously charged by procedures similar to those in examining the safety, and the discharge capacity was measured. Continuous charge retention ratio (%)=(discharge capacity after continuous charge/discharge capacity before continuous charge)×100 was calculated based on this result.

TABLE 17

Anode active material: artificial graphite

| Example | Electrolyte salt | Solvent | Unsaturated cyclic ester carbonate Type | Content (wt %) | Sulfinyl compound Type | Content (wt %) | Cycle retention ratio (%) | Continuous charge retention ratio (%) | Leakage current (mA) |
|---|---|---|---|---|---|---|---|---|---|
| 13-1 | LiPF$_6$ | EC + DMC | Formula (1-1) | 2 | Formula (10-2) | 0.1 | 68 | 84 | 4.4 |
| 13-2 | | | | | | 0.5 | 70 | 88 | 3 |
| 13-3 | | | | | | 1 | 68 | 90 | 1.2 |
| 13-4 | | | | | | 2 | 65 | 90 | 1 |
| 13-5 | | | | | | 5 | 62 | 92 | 0.6 |
| 13-6 | | | Formula (1-1) | 0.01 | Formula (10-2) | 1 | 61 | 80 | 2.5 |
| 13-7 | | | | 0.1 | | | 63 | 81 | 2.8 |
| 13-8 | | | | 0.5 | | | 65 | 84 | 2.5 |
| 13-9 | | | | 1 | | | 66 | 85 | 2.2 |
| 13-10 | | | | 5 | | | 70 | 86 | 1.5 |
| 13-11 | | | | 10 | | | 68 | 84 | 0.8 |
| 13-12 | | | Formula (1-1) | 2 | Formula (7-1) | 1 | 65 | 86 | 0.8 |
| 13-13 | | | | | Formula (8-1) | | 66 | 89 | 1.2 |
| 13-14 | | | | | Formula (8-4) | | 66 | 89 | 1.2 |
| 13-15 | | | | | Formula (9-1) | | 62 | 89 | 1.2 |
| 13-16 | | | | | Formula (11-1) | | 66 | 90 | 1.2 |
| 13-17 | | | | | Formula (12-1) | | 65 | 88 | 1.2 |
| 13-18 | | | | | Formula (13-1) | | 68 | 88 | 1.2 |
| 13-19 | | | Formula (1-4) | 2 | Formula (10-2) | 1 | 66 | 87 | 1.2 |
| 13-20 | | | Formula (1-16) | | | | 65 | 88 | 1.2 |
| 13-21 | | | Formula (1-18) | | | | 66 | 88 | 1.2 |
| 13-22 | | | Formula (1-32) | | | | 67 | 88 | 1.2 |

TABLE 18

Anode active material: artificial graphite

| Example | Electrolyte salt | Solvent | Unsaturated cyclic ester carbonate Type | Content (wt %) | Sulfinyl compound Type | Content (wt %) | Cycle retention ratio (%) | Continuous charge retention ratio (%) | Leakage current (mA) |
|---|---|---|---|---|---|---|---|---|---|
| 13-23 | LiPF$_6$ | EC + DMC | — | — | — | — | 60 | 78 | 5.5 |
| 13-24 | | | Formula (1-1) | 2 | — | — | 62 | 80 | 5.5 |
| 13-25 | | | Formula (1-4) | | | | 61 | 78 | 5.5 |
| 13-26 | | | Formula (1-16) | | | | 61 | 78 | 5.5 |
| 13-27 | | | Formula (1-18) | | | | 60 | 78 | 5.5 |
| 13-28 | | | Formula (1-32) | | | | 62 | 80 | 5.5 |
| 13-29 | | | — | — | Formula (7-1) | 1 | 38 | 78 | 2.8 |
| 13-30 | | | | | Formula (8-1) | | 34 | 82 | 3.2 |
| 13-31 | | | | | Formula (8-4) | | 34 | 84 | 3.2 |
| 13-32 | | | | | Formula (9-1) | | 30 | 84 | 3.5 |
| 13-33 | | | | | Formula (10-2) | | 40 | 85 | 3 |
| 13-34 | | | | | Formula (11-1) | | 40 | 84 | 3 |
| 13-35 | | | | | Formula (12-1) | | 36 | 78 | 2.9 |
| 13-36 | | | | | Formula (13-1) | | 34 | 84 | 3.5 |

TABLE 19

Anode active material: artificial graphite

| Example | Electrolyte salt | Solvent | Unsaturated cyclic ester carbonate Type | Content (wt %) | Sulfinyl compound Type | Content (wt %) | Cycle retention ratio (%) | Continuous charge retention ratio (%) | Leakage current (mA) |
|---|---|---|---|---|---|---|---|---|---|
| 14-1 | LiPF$_6$ | EC + DEC | Formula (1-1) | 2 | Formula (10-2) | 1 | 65 | 92 | 0.8 |
| 14-2 | | EC + EMC | | | | | 66 | 91 | 1 |
| 14-3 | | EC + PC + DMC | | | | | 65 | 92 | 0.8 |
| 14-4 | | EC + DMC | VC | | | | 70 | 92 | 1.2 |
| 14-5 | | | FEC | | | | 80 | 90 | 1.2 |
| 14-6 | | | c-DFEC | | | | 70 | 90 | 1.2 |
| 14-7 | | | t-DFEC | | | | 70 | 90 | 1.2 |
| 14-8 | | | DFDMC | | | | 69 | 90 | 1.2 |
| 14-9 | | | PRS | | | | 69 | 92 | 1 |
| 14-10 | | | SCAH | | | | 70 | 91 | 1.2 |
| 14-11 | | | PSAH | | | | 68 | 90 | 1.2 |
| 14-12 | LiPF$_6$ | EC + DMC | VC | — | — | — | 50 | 80 | 5.2 |
| 14-13 | | | FEC | | | | 65 | 79 | 5.8 |
| 14-14 | | | t-DFEC | | | | 62 | 78 | 6 |
| 14-15 | | | DFDMC | | | | 62 | 78 | 5.5 |

TABLE 20

Anode active material: artificial graphite

| Example | Electrolyte salt | Solvent | Unsaturated cyclic ester carbonate Type | Content (wt %) | Sulfinyl compound Type | Content (wt %) | Cycle retention ratio (%) | Continuous charge retention ratio (%) | Leakage current (mA) |
|---|---|---|---|---|---|---|---|---|---|
| 15-1 | LiPF$_6$ LiBF$_4$ | EC + DMC | Formula (1-1) | 2 | Formula (10-2) | 1 | 68 | 92 | 1 |
| 15-2 | LiBOB | | | | | | 70 | 94 | 0.8 |
| 15-3 | LiTFSI | | | | | | 68 | 94 | 0.8 |

TABLE 21

Anode active material: silicon

| Example | Electrolyte salt | Solvent | Unsaturated cyclic ester carbonate Type | Content (wt %) | Sulfinyl compound Type | Content (wt %) | Cycle retention ratio (%) | Continuous charge retention ratio (%) | Leakage current (mA) |
|---|---|---|---|---|---|---|---|---|---|
| 16-1 | LiPF$_6$ | EC + DMC | Formula (1-1) | 2 | Formula (10-2) | 0.1 | 70 | 79 | 5 |
| 16-2 | | | | | | 0.5 | 72 | 80 | 4.2 |
| 16-3 | | | | | | 1 | 73 | 84 | 2 |
| 16-4 | | | | | | 2 | 68 | 82 | 1.5 |
| 16-5 | | | | | | 5 | 66 | 80 | 1.2 |
| 16-6 | | | Formula (1-1) | 0.01 | Formula (10-2) | 1 | 66 | 77 | 4.5 |
| 16-7 | | | | 0.1 | | | 67 | 77 | 4 |
| 16-8 | | | | 0.5 | | | 68 | 78 | 3.8 |
| 16-9 | | | | 1 | | | 70 | 80 | 3.5 |
| 16-10 | | | | 5 | | | 72 | 83 | 2 |
| 16-11 | | | | 10 | | | 70 | 82 | 1.8 |
| 16-12 | | | Formula (1-1) | 2 | Formula (7-1) | 1 | 70 | 81 | 1.5 |
| 16-13 | | | | | Formula (8-1) | | 71 | 82 | 2.1 |
| 16-14 | | | | | Formula (8-4) | | 70 | 82 | 2.1 |
| 16-15 | | | | | Formula (9-1) | | 73 | 82 | 2.1 |
| 16-16 | | | | | Formula (11-1) | | 70 | 83 | 2 |
| 16-17 | | | | | Formula (12-1) | | 71 | 81 | 2 |
| 16-18 | | | | | Formula (13-1) | | 73 | 81 | 2.2 |
| 16-19 | | | Formula (1-4) | 2 | Formula (10-2) | 1 | 70 | 81 | 2 |
| 16-20 | | | Formula (1-16) | | | | 70 | 81 | 2 |
| 16-21 | | | Formula (1-18) | | | | 72 | 81 | 2 |
| 16-22 | | | Formula (1-32) | | | | 72 | 81 | 2 |

TABLE 22

Anode active material: silicon

| Example | Electrolyte salt | Solvent | Unsaturated cyclic ester carbonate Type | Content (wt %) | Sulfinyl compound Type | Content (wt %) | Cycle retention ratio (%) | Continuous charge retention ratio (%) | Leakage current (mA) |
|---|---|---|---|---|---|---|---|---|---|
| 16-23 | LiPF$_6$ | EC + DMC | — | — | — | — | 64 | 70 | 7.9 |
| 16-24 | | | Formula (1-1) | 2 | — | | 65 | 72 | 7.9 |
| 16-25 | | | Formula (1-4) | | | | 64 | 71 | 7.9 |
| 16-26 | | | Formula (1-16) | | | | 64 | 71 | 7.9 |
| 16-27 | | | Formula (1-18) | | | | 64 | 70 | 7.9 |
| 16-28 | | | Formula (1-32) | | | | 65 | 72 | 7.9 |
| 16-29 | | | — | — | Formula (7-1) | 1 | 40 | 70 | 3.5 |
| 16-30 | | | | | Formula (8-1) | | 42 | 74 | 5.6 |
| 16-31 | | | | | Formula (8-4) | | 42 | 74 | 5.6 |
| 16-32 | | | | | Formula (9-1) | | 38 | 74 | 5.6 |
| 16-33 | | | | | Formula (10-2) | | 45 | 75 | 4 |
| 16-34 | | | | | Formula (11-1) | | 44 | 74 | 4.9 |
| 16-35 | | | | | Formula (12-1) | | 40 | 70 | 5.7 |
| 16-36 | | | | | Formula (13-1) | | 40 | 72 | 5.8 |

TABLE 23

Anode active material: silicon

| Example | Electrolyte salt | Solvent | Unsaturated cyclic ester carbonate Type | Content (wt %) | Sulfinyl compound Type | Content (wt %) | Cycle retention ratio (%) | Continuous charge retention ratio (%) | Leakage current (mA) |
|---|---|---|---|---|---|---|---|---|---|
| 17-1 | LiPF$_6$ | EC + DEC | Formula (1-1) | 2 | Formula (10-2) | 1 | 73 | 92 | 1 |
| 17-2 | | EC + EMC | | | | | 73 | 91 | 1 |

TABLE 23-continued

Anode active material: silicon

| Example | Electrolyte salt | Solvent | Unsaturated cyclic ester carbonate Type | Content (wt %) | Sulfinyl compound Type | Content (wt %) | Cycle retention ratio (%) | Continuous charge retention ratio (%) | Leakage current (mA) |
|---|---|---|---|---|---|---|---|---|---|
| 17-3 | | EC + PC + DMC | | | | | 73 | 92 | 1 |
| 17-4 | | EC + VC | | | | | 80 | 92 | 1.2 |
| 17-5 | | DMC FEC | | | | | 85 | 90 | 1.2 |
| 17-6 | | c-DFEC | | | | | 88 | 90 | 1.2 |
| 17-7 | | t-DFEC | | | | | 88 | 90 | 1.2 |
| 17-8 | | DFDMC | | | | | 84 | 90 | 1.2 |
| 17-9 | | PRS | | | | | 70 | 94 | 1 |
| 17-10 | | SCAH | | | | | 72 | 94 | 1 |
| 17-11 | | PSAH | | | | | 73 | 84 | 2 |
| 17-12 | LiPF$_6$ | EC + VC | — | — | — | — | 70 | 74 | 7.5 |
| 17-13 | | DMC FEC | | | | | 77 | 68 | 7.9 |
| 17-14 | | t-DFEC | | | | | 82 | 68 | 8.2 |
| 17-15 | | DFDMC | | | | | 72 | 68 | 7.7 |

TABLE 24

Anode active material: silicon

| Example | Electrolyte salt | Solvent | Unsaturated cyclic ester carbonate Type | Content (wt %) | Sulfinyl compound Type | Content (wt %) | Cycle retention ratio (%) | Continuous charge retention ratio (%) | Leakage current (mA) |
|---|---|---|---|---|---|---|---|---|---|
| 18-1 | LiPF$_6$ LiBF$_4$ | EC + | Formula (1-1) | 2 | Formula (10-2) | 1 | 73 | 88 | 1 |
| 18-2 | LiBOB | DMC | | | | | 73 | 90 | 0.8 |
| 18-3 | LiTFSI | | | | | | 73 | 88 | 0.8 |

When the electrolytic solution included the sulfinyl compound together with the unsaturated cyclic ester carbonate, high cycle retention ratio and high continuous charge retention ratio were obtained and leakage current was suppressed to a low value, irrespective of the type of the anode active material.

In detail, in the case where a carbon material (artificial graphite) was used as the anode active material, the example (Example 13-23) in which the electrolytic solution included neither the unsaturated cyclic ester carbonate nor the sulfynil compound was used as a reference. In the examples (Examples 13-24 to 13-28) in which the electrolytic solution included only the unsaturated cyclic ester carbonate, the cycle retention ratio and the continuous charge retention ratio were slightly increased but the leakage current was substantially the same, compared to the above-described reference. In the examples (Examples 13-29 to 13-36) in which the electrolytic solution included only the sulfynil compound, the continuous charge retention ratio was increased and the leakage current was decreased, but the cycle retention ratio was largely decreased, compared to the above-described reference. On the other hand, in the examples (Examples 13-1 to 13-22) in which the electrolytic solution included the unsaturated cyclic ester carbonate and the sulfynil compound, the cycle retention ratio and the continuous charge retention ratio were increased and the leakage current was decreased, compared to the above-described reference. It can be seen from these results that, when the electrolytic solution includes the unsaturated cyclic ester carbonate and the sulfynil compound, the decomposition reaction of the electrolytic solution is significantly suppressed due to the synergetic action of the unsaturated cyclic ester carbonate and the sulfynil compound.

In particular, in the examples in which the electrolytic solution included the unsaturated cyclic ester carbonate and the sulfynil compound, favorable results were obtained when the content of the unsaturated cyclic ester carbonate was from 0.01 wt % to 10 wt % both inclusive, and the content of the sulfynil compound was from 0.1 wt % to 10 wt % both inclusive.

The tendency described above was similarly obtained in the examples in which the metal-based material (silicon) was used as the anode active material. Tendencies other than this will not be described since the tendencies were similar to those described for the results shown in Table 1 to Table 8.

[(4) Unsaturated Cyclic Ester Carbonate and Lithium Salt]

Lastly, various characteristics of the secondary battery were examined with use of lithium salts together with the unsaturated cyclic ester carbonate.

Examples 19-1 to 19-55, 20-1 to 20-14, 21-1 to 21-3, 22-1 to 22-55, 23-1 to 23-14, 24-1 to 24-3

Secondary batteries were manufactured by procedures similar to those in Examples 1-1 to 1-33, 2-1 to 2-15, 3-1 to 3-3, 4-1 to 4-33, 5-1 to 5-15, and 6-1 to 6-3 except that the lithium salt was used instead of the aromatic compound. Types and contents of the lithium salt were as shown in Table 25 to Table 34. It is to be noted that "LiNS" indicates Li[N(SO$_2$F)$_2$] and "LiSF" indicates Li(SO$_3$F).

Battery characteristics (cycle characteristics, continuous charge characteristics, and safety) of the secondary battery were examined, and the results shown in Table 25 to Table 34 were obtained. Procedures of examining the cycle characteristics, the continuous charge characteristics, and the safety were similar to those including the sulfynil compound (Table 17 to Table 24).

TABLE 25

Anode active material: artificial graphite

| Example | Other lithium salt Type | Content (mol/kg) | Lithium salt Type | Content (mol/kg) | Solvent | Unsaturated cyclic ester carbonate Type | Content (wt %) | Cycle retention ratio (%) | Continuous charge retention ratio (%) | Leakage current (mA) |
|---|---|---|---|---|---|---|---|---|---|---|
| 19-1 | $LiPF_6$ | 0.99 | Formula (15-2) | 0.01 | EC + DMC | Formula (1-1) | 2 | 73 | 85 | 2.2 |
| 19-2 | | 0.95 | | 0.05 | | | | 74 | 88 | 1.6 |
| 19-3 | | 0.9 | | 0.1 | | | | 72 | 88 | 1 |
| 19-4 | | 0.8 | | 0.2 | | | | 70 | 88 | 0.8 |
| 19-5 | | 0.5 | | 0.5 | | | | 66 | 88 | 0.8 |
| 19-6 | | 0 | | 1 | | | | 62 | 88 | 0.8 |
| 19-7 | $LiPF_6$ | 0.9 | Formula (15-2) | 0.1 | EC + DMC | Formula (1-1) | 0.01 | 62 | 82 | 2 |
| 19-8 | | | | | | | 0.1 | 64 | 84 | 1.6 |
| 19-9 | | | | | | | 0.2 | 66 | 85 | 1.1 |
| 19-10 | | | | | | | 0.5 | 70 | 87 | 0.8 |
| 19-11 | | | | | | | 1 | 71 | 88 | 0.8 |
| 19-12 | | | | | | | 5 | 70 | 88 | 0.8 |
| 19-13 | | | | | | | 10 | 65 | 88 | 1 |
| 19-14 | $LiPF_6$ | 0.9 | Formula (15-2) | 0.1 | EC + DMC | Formula (1-4) | 2 | 68 | 88 | 0.8 |
| 19-15 | | | | | | Formula (1-16) | | 70 | 88 | 0.9 |
| 19-16 | | | | | | Formula (1-18) | | 69 | 88 | 0.8 |
| 19-17 | | | | | | Formula (1-32) | | 70 | 88 | 0.9 |
| 19-18 | $LiPF_6$ | 0.9 | Formula (15-1) | 0.1 | EC + DMC | Formula (1-1) | 2 | 70 | 90 | 0.6 |

TABLE 26

Anode active material: artificial graphite

| Example | Other lithium salt Type | Content (mol/kg) | Lithium salt Type | Content (mol/kg) | Solvent | Unsaturated cyclic ester carbonate Type | Content (wt %) | Cycle retention ratio (%) | Continuous charge retention ratio (%) | Leakage current (mA) |
|---|---|---|---|---|---|---|---|---|---|---|
| 19-19 | $LiPF_6$ | 0.99 | LiNS | 0.01 | EC + DMC | Formula (1-1) | 2 | 77 | 85 | 2.2 |
| 19-20 | | 0.95 | | 0.05 | | | | 75 | 87 | 1.6 |
| 19-21 | | 0.9 | | 0.1 | | | | 72 | 90 | 0.5 |
| 19-22 | | 0.8 | | 0.2 | | | | 70 | 92 | 0.8 |
| 19-23 | | 0.5 | | 0.5 | | | | 68 | 92 | 0.8 |
| 19-24 | | 0 | | 1 | | | | 65 | 90 | 0.8 |
| 19-25 | $LiPF_6$ | 0.9 | LiNS | 0.1 | EC + DMC | Formula (1-1) | 0.01 | 60 | 82 | 1.8 |
| 19-26 | | | | | | | 0.1 | 63 | 84 | 1.5 |
| 19-27 | | | | | | | 0.2 | 65 | 85 | 1 |
| 19-28 | | | | | | | 0.5 | 70 | 87 | 0.8 |
| 19-29 | | | | | | | 1 | 71 | 89 | 0.7 |
| 19-30 | | | | | | | 5 | 70 | 89 | 0.5 |
| 19-31 | | | | | | | 10 | 65 | 89 | 0.5 |
| 19-32 | $LiPF_6$ | 0.99 | LiSF | 0.01 | EC + DMC | Formula (1-1) | 2 | 73 | 83 | 2.4 |
| 19-33 | | 0.95 | | 0.05 | | | | 71 | 85 | 1.8 |
| 19-34 | | 0.9 | | 0.1 | | | | 68 | 88 | 0.7 |
| 19-35 | | 0.8 | | 0.2 | | | | 66 | 90 | 1 |
| 19-36 | | 0.5 | | 0.5 | | | | 64 | 90 | 0.8 |
| 19-37 | | 0 | | 1 | | | | 61 | 88 | 0.8 |
| 19-38 | $LiPF_6$ | 0.9 | LiSF | 0.1 | EC + DMC | Formula (1-1) | 0.01 | 61 | 80 | 1.8 |
| 19-39 | | | | | | | 0.1 | 61 | 82 | 1.5 |
| 19-40 | | | | | | | 0.2 | 61 | 83 | 1 |
| 19-41 | | | | | | | 0.5 | 66 | 85 | 0.8 |
| 19-42 | | | | | | | 1 | 67 | 87 | 0.8 |
| 19-43 | | | | | | | 5 | 66 | 87 | 0.8 |
| 19-44 | | | | | | | 10 | 61 | 87 | 0.8 |

TABLE 27

Anode active material: artificial graphite

| Example | Other lithium salt Type | Other lithium salt Content (mol/kg) | Lithium salt Type | Lithium salt Content (mol/kg) | Solvent | Unsaturated cyclic ester carbonate Type | Unsaturated cyclic ester carbonate Content (wt %) | Cycle retention ratio (%) | Continuous charge retention ratio (%) | Leakage current (mA) |
|---|---|---|---|---|---|---|---|---|---|---|
| 19-45 | LiPF$_6$ | 1 | — | — | EC + DMC | — | — | 60 | 78 | 5.5 |
| 19-46 | LiPF$_6$ | 0.9 | Formula (15-1) | 0.1 | EC + DMC | — | — | 25 | 84 | 2.5 |
| 19-47 | | | Formula (15-2) | | | | | 20 | 82 | 2.5 |
| 19-48 | | | LiNS | | | | | 27 | 84 | 2.5 |
| 19-49 | | | LiSF | | | | | 20 | 82 | 2.8 |
| 19-50 | LiPF$_6$ | 1 | — | — | EC + DMC | Formula (1-1) | 2 | 62 | 80 | 5.5 |
| 19-51 | | | | | | Formula (1-4) | | 61 | 78 | 5.5 |
| 19-52 | | | | | | Formula (1-16) | | 61 | 78 | 5.5 |
| 19-53 | | | | | | Formula (1-18) | | 60 | 78 | 5.5 |
| 19-54 | | | | | | Formula (1-32) | | 62 | 80 | 5.5 |
| 19-55 | LiPF$_6$ | 0.9 | LiTFSI | 0.1 | EC + DMC | Formula (1-1) | 2 | 55 | 80 | 3.2 |

TABLE 28

Anode active material: artificial graphite

| Example | Lithium salt etc. | Solvent | Unsaturated cyclic ester carbonate Type | Unsaturated cyclic ester carbonate Content (wt %) | Cycle retention ratio (%) | Continuous charge retention ratio (%) | Leakage current (mA) |
|---|---|---|---|---|---|---|---|
| 20-1 | LiPF$_6$ + Formula (15-2) | EC + DEC | Formula (1-1) | 2 | 68 | 89 | 0.7 |
| 20-2 | | EC + EMC | | | 70 | 88 | 0.8 |
| 20-3 | | EC + PC + DMC | | | 68 | 89 | 0.7 |
| 20-4 | | EC + DMC | VC | | 75 | 90 | 0.8 |
| 20-5 | | | FEC | | 80 | 88 | 0.8 |
| 20-6 | | | t-DFEC | | 75 | 88 | 0.8 |
| 20-7 | | | DFDMC | | 77 | 88 | 0.8 |
| 20-8 | | | PRS | | 72 | 92 | 0.7 |
| 20-9 | | | SCAH | | 75 | 90 | 0.8 |
| 20-10 | | | PSAH | | 72 | 95 | 0.6 |
| 20-11 | LiPF$_6$ | EC + DMC | VC | — | 60 | 80 | 5.2 |
| 20-12 | | | FEC | | 75 | 79 | 5.8 |
| 20-13 | | | t-DFEC | | 72 | 78 | 6 |
| 20-14 | | | DFDMC | | 72 | 78 | 5.5 |

TABLE 29

Anode active material: artificial graphite

| Example | Lithium salt etc. | | Solvent | Unsaturated cyclic ester carbonate Type | Unsaturated cyclic ester carbonate Content (wt %) | Cycle retention ratio (%) | Continuous charge retention ratio (%) | Leakage current (mA) |
|---|---|---|---|---|---|---|---|---|
| 21-1 | LiPF$_6$ + Formula (15-2) | +LiBF$_4$ | EC + DMC | Formula (1-1) | 2 | 72 | 89 | 0.8 |
| 21-2 | | +LiBOB | | | | 73 | 91 | 0.7 |
| 21-3 | | +LiTFSI | | | | 72 | 90 | 0.6 |

TABLE 30

Anode active material: silicon

| Example | Other lithium salt Type | Other lithium salt Content (mol/kg) | Lithium salt Type | Lithium salt Content (mol/kg) | Solvent | Unsaturated cyclic ester carbonate Type | Unsaturated cyclic ester carbonate Content (wt %) | Cycle retention ratio (%) | Continuous charge retention ratio (%) | Leakage current (mA) |
|---|---|---|---|---|---|---|---|---|---|---|
| 22-1 | LiPF$_6$ | 0.99 | Formula (15-2) | 0.01 | EC + DMC | Formula (1-1) | 2 | 75 | 75 | 3.2 |
| 22-2 |  | 0.95 |  | 0.05 |  |  |  | 77 | 77 | 2.4 |
| 22-3 |  | 0.9 |  | 0.1 |  |  |  | 78 | 85 | 1.3 |
| 22-4 |  | 0.8 |  | 0.2 |  |  |  | 78 | 85 | 1 |
| 22-5 |  | 0.5 |  | 0.5 |  |  |  | 77 | 85 | 1 |
| 22-6 |  | 0 |  | 1 |  |  |  | 76 | 85 | 1 |
| 22-7 | LiPF$_6$ | 0.9 | Formula (15-2) | 0.1 | EC + DMC | Formula (1-1) | 0.01 | 67 | 77 | 2.2 |
| 22-8 |  |  |  |  |  |  | 0.1 | 70 | 80 | 1.8 |
| 22-9 |  |  |  |  |  |  | 0.2 | 71 | 82 | 1.5 |
| 22-10 |  |  |  |  |  |  | 0.5 | 73 | 85 | 1 |
| 22-11 |  |  |  |  |  |  | 1 | 75 | 85 | 1 |
| 22-12 |  |  |  |  |  |  | 5 | 78 | 86 | 1 |
| 22-13 |  |  |  |  |  |  | 10 | 75 | 85 | 1.2 |
| 22-14 | LiPF$_6$ | 0.9 | Formula (15-2) | 0.1 | EC + DMC | Formula (1-4) | 2 | 74 | 80 | 1.3 |
| 22-15 |  |  |  |  |  | Formula (1-16) |  | 76 | 82 | 1.4 |
| 22-16 |  |  |  |  |  | Formula (1-18) |  | 76 | 82 | 1.4 |
| 22-17 |  |  |  |  |  | Formula (1-32) |  | 77 | 84 | 1.3 |
| 22-18 | LiPF$_6$ | 0.9 | Formula (15-1) | 0.1 | EC + DMC | Formula (1-1) | 2 | 75 | 88 | 1 |

TABLE 31

Anode active material: silicon

| Example | Other lithium salt Type | Other lithium salt Content (mol/kg) | Lithium salt Type | Lithium salt Content (mol/kg) | Solvent | Unsaturated cyclic ester carbonate Type | Unsaturated cyclic ester carbonate Content (wt %) | Cycle retention ratio (%) | Continuous charge retention ratio (%) | Leakage current (mA) |
|---|---|---|---|---|---|---|---|---|---|---|
| 22-19 | LiPF$_6$ | 0.99 | LiNS | 0.01 | EC + DMC | Formula (1-1) | 2 | 79 | 80 | 2.8 |
| 22-20 |  | 0.95 |  | 0.05 |  |  |  | 80 | 83 | 2 |
| 22-21 |  | 0.9 |  | 0.1 |  |  |  | 80 | 89 | 0.5 |
| 22-22 |  | 0.8 |  | 0.2 |  |  |  | 79 | 89 | 0.5 |
| 22-23 |  | 0.5 |  | 0.5 |  |  |  | 79 | 89 | 0.5 |
| 22-24 |  | 0 |  | 1 |  |  |  | 76 | 88 | 0.8 |
| 22-25 | LiPF$_6$ | 0.9 | LiNS | 0.1 | EC + DMC | Formula (1-1) | 0.01 | 67 | 81 | 2.2 |
| 22-26 |  |  |  |  |  |  | 0.1 | 72 | 84 | 1.8 |
| 22-27 |  |  |  |  |  |  | 0.2 | 74 | 86 | 1.5 |
| 22-28 |  |  |  |  |  |  | 0.5 | 75 | 88 | 1 |
| 22-29 |  |  |  |  |  |  | 1 | 78 | 89 | 0.8 |
| 22-30 |  |  |  |  |  |  | 5 | 78 | 89 | 0.5 |
| 22-31 |  |  |  |  |  |  | 10 | 77 | 89 | 0.5 |
| 22-32 | LiPF$_6$ | 0.99 | LiSF | 0.01 | EC + DMC | Formula (1-1) | 2 | 71 | 78 | 3.3 |
| 22-33 |  | 0.95 |  | 0.05 |  |  |  | 76 | 81 | 2.5 |
| 22-34 |  | 0.9 |  | 0.1 |  |  |  | 76 | 87 | 1 |
| 22-35 |  | 0.8 |  | 0.2 |  |  |  | 75 | 87 | 1 |
| 22-36 |  | 0.5 |  | 0.5 |  |  |  | 75 | 87 | 1 |
| 22-37 |  | 0 |  | 1 |  |  |  | 72 | 86 | 1.3 |
| 22-38 | LiPF$_6$ | 0.9 | LiSF | 0.1 | EC + DMC | Formula (1-1) | 0.01 | 62 | 79 | 2.7 |
| 22-39 |  |  |  |  |  |  | 0.1 | 67 | 82 | 2.2 |
| 22-40 |  |  |  |  |  |  | 0.2 | 69 | 84 | 2 |
| 22-41 |  |  |  |  |  |  | 0.5 | 71 | 86 | 1.5 |
| 22-42 |  |  |  |  |  |  | 1 | 74 | 87 | 1.3 |
| 22-43 |  |  |  |  |  |  | 5 | 74 | 87 | 1 |
| 22-44 |  |  |  |  |  |  | 10 | 73 | 87 | 1 |

TABLE 32

Anode active material: silicon

| Example | Other lithium salt Type | Content (mol/kg) | Lithium salt Type | Content (mol/kg) | Solvent | Unsaturated cyclic ester carbonate Type | Content (wt %) | Cycle retention ratio (%) | Continuous charge retention ratio (%) | Leakage current (mA) |
|---|---|---|---|---|---|---|---|---|---|---|
| 22-45 | $LiPF_6$ | 1 | — | — | EC + DMC | — | — | 64 | 70 | 7.9 |
| 22-46 | $LiPF_6$ | 0.9 | Formula (15-1) | 0.1 | EC + DMC | — | — | 58 | 77 | 3.5 |
| 22-47 | | | Formula (15-2) | | | | | 55 | 75 | 3.5 |
| 22-48 | | | LiNS | | | | | 58 | 77 | 3.5 |
| 22-49 | | | LiSF | | | | | 50 | 72 | 4 |
| 22-50 | $LiPF_6$ | 1 | — | — | EC + DMC | Formula (1-1) | 2 | 65 | 72 | 7.9 |
| 22-51 | | | | | | Formula (1-4) | | 64 | 71 | 7.9 |
| 22-52 | | | | | | Formula (1-16) | | 64 | 71 | 7.9 |
| 22-53 | | | | | | Formula (1-18) | | 64 | 70 | 7.9 |
| 22-54 | | | | | | Formula (1-32) | | 65 | 72 | 7.9 |
| 22-55 | $LiPF_6$ | 0.9 | LiTFSI | 0.1 | EC + DMC | Formula (1-1) | 2 | 60 | 72 | 4.4 |

TABLE 33

Anode active material: silicon

| Example | Lithium salt etc. | Solvent | Unsaturated cyclic ester carbonate Type | Content (wt %) | Cycle retention ratio (%) | Continuous charge retention ratio (%) | Leakage current (mA) |
|---|---|---|---|---|---|---|---|
| 23-1 | $LiPF_6$ + Formula (15-2) | EC + DEC | Formula (1-1) | 2 | 75 | 87 | 1.2 |
| 23-2 | | EC + EMC | | | 77 | 86 | 1.3 |
| 23-3 | | EC + PC + DMC | | | 74 | 87 | 1.1 |
| 23-4 | | EC + DMC | VC | | 85 | 88 | 1.2 |
| 23-5 | | | FEC | | 85 | 85 | 1.3 |
| 23-6 | | | t-DFEC | | 90 | 85 | 1.3 |
| 23-7 | | | DFDMC | | 84 | 85 | 1.3 |
| 23-8 | | | PRS | | 80 | 90 | 1 |
| 23-9 | | | SCAH | | 81 | 88 | 1.2 |
| 23-10 | | | PSAH | | 84 | 94 | 0.9 |
| 23-11 | $LiPF_6$ | EC + DMC | VC | — | 70 | 74 | 7.5 |
| 23-12 | | | FEC | | 77 | 68 | 7.9 |
| 23-13 | | | t-DFEC | | 82 | 68 | 8.2 |
| 23-14 | | | DFDMC | | 72 | 68 | 7.7 |

TABLE 34

Anode active material: silicon

| Example | Lithium salt etc. | | Solvent | Unsaturated cyclic ester carbonate Type | Content (wt %) | Cycle retention ratio (%) | Continuous charge retention ratio (%) | Leakage current (mA) |
|---|---|---|---|---|---|---|---|---|
| 24-1 | $LiPF_6$ + Formula (15-2) | +$LiBF_4$ | EC + DMC | Formula (1-1) | 2 | 78 | 85 | 1.3 |
| 24-2 | | +LiBOB | | | | 79 | 87 | 1.2 |
| 24-3 | | +LiTFSI | | | | 78 | 86 | 1 |

When the electrolytic solution included the lithium salt together with the unsaturated cyclic ester carbonate, high cycle retention ratio and high continuous charge retention ratio were obtained and leakage current was suppressed to a low value, irrespective of the types of the anode active material.

In detail, in the case where a carbon material (artificial graphite) was used as the anode active material, in the example (Example 19-45) in which the electrolytic solution included neither the unsaturated cyclic ester carbonate nor the lithium salt was used as a reference. In the examples (Examples 19-50 to 19-54) in which the electrolytic solution included only the unsaturated cyclic ester carbonate, the cycle retention ratio and the continuous charge retention ratio were slightly increased but the leakage current was substantially the same, compared to the above-described reference. Further, in the examples (Examples 19-46 to 19-49) in which the electrolytic solution included only the lithium salt, the continuous charge retention ratio was increased and the leakage current was decreased, but the cycle retention ratio was largely decreased, compared to the above-described reference. On the other hand, in the examples (Examples 19-1 to 19-44) in which the electrolytic solution included the unsaturated cyclic ester carbonate and the lithium salt, the cycle retention ratio and the continuous charge retention ratio were increased and the leakage current was decreased, compared to the above-described reference. It can be seen from these results that, when the electrolytic solution includes the unsaturated cyclic ester carbonate and the lithium salt, the decomposition reaction of the electrolytic solution is significantly suppressed due to the synergetic action of the unsaturated cyclic ester carbonate and the lithium salt.

In particular, in the examples in which the electrolytic solution included the unsaturated cyclic ester carbonate and the lithium salt, favorable results were obtained when the content of the unsaturated cyclic ester carbonate was from 0.01 wt % to 10 wt % both inclusive, and the content of the lithium salt was from 0.01 mol/kg to 1 mol/kg both inclusive.

The tendency described above was similarly obtained in the examples in which the metal-based material (silicon) was used as the anode active material. Tendencies other than this will not be described since the tendencies were similar to those described for the results shown in Table 17 to Table 24.

Hereinabove, the present technology has been described with reference to the embodiments and Examples. However, the present technology is not limited to examples described in the embodiments and Examples, and may be variously modified. For example, although a lithium ion secondary battery has been described as a type of secondary battery, the type of secondary battery is not limited thereto. The secondary battery of the present technology may be similarly applicable to a secondary battery in which a capacity of an anode includes a capacity derived from insertion and extraction of lithium ions and a capacity according to precipitation and dissolution of lithium metal, and in which a battery capacity is represented by the sum of those capacities. In this case, an anode material capable of inserting and extracting lithium ions is used as the anode active material. In addition thereto, a chargeable capacity of the anode material is set to be smaller than the discharge capacity of the cathode.

Further, the embodiments and Examples have been explained with reference to a battery that has a cylindrical type or a laminated film type battery structure and that has a battery device of a spirally wound structure. However, the secondary battery of the present technology is not limited thereto, and may be similarly applicable to, for example, a battery that has other battery structure such as a square type, a coin type, and a button type and a battery in which the battery device has other structure such as a lamination structure.

Further, the embodiments and Examples have been explained with reference to the case where lithium is used as the electrode reactant. However, the electrode reactant is not limited thereto, and may be, for example, other Group 1 elements such as Na and K, Group 2 elements such as Mg and Ca, or other light metal such as Al. Since the effects of the present technology may be obtained irrespective of electrode reactant type, similar effects are obtainable even if the electrode reactant type is changed.

Further, in the embodiments and Examples, the content of the unsaturated cyclic ester carbonate has been described with an appropriate range resulted from the results of Examples. However, the description does not necessarily deny a possibility that the content thereof is out of the above-described range. In other words, the above-described appropriate range is merely a range especially preferable in obtaining the effects of the present technology. Therefore, the content may be out of the above-described range in some degree as long as the effects of the present technology are obtained. The same is applicable to the content of other materials such as the aromatic compound.

It is possible to achieve at least the following configurations from the above-described example embodiments of the disclosure.

(1) A secondary battery including:

a cathode;

an anode; and an electrolytic solution, wherein the electrolytic solution includes an unsaturated cyclic ester carbonate represented by the following Formula (1), and one or more selected from a group configured of aromatic compounds represented by the following Formula (2) to Formula (5), dinitrile compounds represented by the following Formula (6), sulfinyl compounds represented by the following Formula (7) to Formula (14), and lithium salts represented by the following Formula (15) to Formula (17),

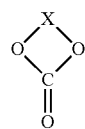

(1)

where X is a divalent group in which m-number of >C=CR1-R2 and n-number of >CR3R4 are bonded to one another in any order; R1 to R4 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R1 to the R4 may be bonded to one another; and m and n satisfy m≥1 and n≥0, (2)

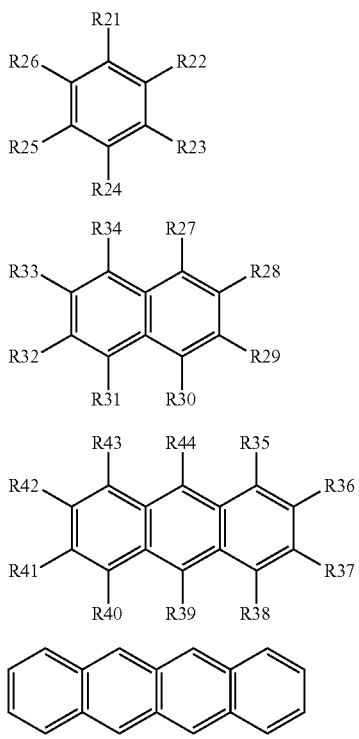

(3)

(4)

(5)

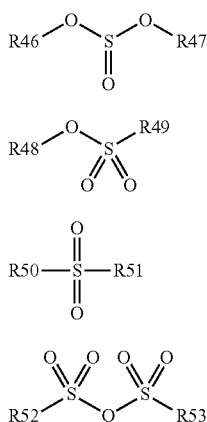

where R21 to R44 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R21 to the R26 may be bonded to one another; any two or more of the R27 to the R34 may be bonded to one another; any two or more of the R35 to the R44 may be bonded to one another; and total number of carbon atoms in each of the aromatic compounds represented by the Formula (2) to the Formula (4) is from 7 to 18 both inclusive,

NC—R45—CN     (6)

where R45 is one of a divalent hydrocarbon group and a divalent halogenated hydrocarbon group,

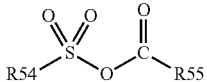

(7)

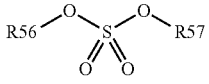

(8)

(9)

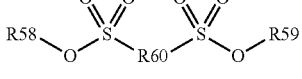

(10)

(11)

(12)

(13)

(14)

where R46 to R59, R61, and R62 are each one of a monovalent hydrocarbon group and a monovalent halogenated hydrocarbon group; R60 and R63 are each one of a divalent hydrocarbon group and a divalent halogenated hydrocarbon group; the R46 and the R47 may be bonded to each other; the R48 and the R49 may be bonded to each other; the R50 and the R51 may be bonded to each other; the R52 and the R53 may be bonded to each other; the R54 and the R55 may be bonded to each other; the R56 and the R57 may be bonded to each other; any two or more of the R58 to the R60 may be bonded to one another; and any two or more of the R61 to the R63 may be bonded to one another,

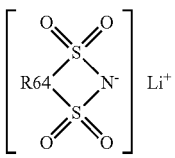

(15)

where R64 is a divalent halogenated hydrocarbon group,

Li[N(SO$_2$R65)(SO$_2$R66)]     (16)

where R65 and R66 are each one of a halogen group, a monovalent hydrocarbon group, and a monovalent halogenated hydrocarbon group; and the R65, the R66, or both are each one of a halogen group and a monovalent halogenated hydrocarbon group, Li(SO$_3$F)     (17).

(2) The secondary battery according to (1), wherein
the halogen group includes a fluorine group, a chlorine group, a bromine group, and an iodine group,
the monovalent hydrocarbon group, the monovalent halogenated hydrocarbon group, the monovalent oxygen-containing hydrocarbon group, and the monovalent halogenated oxygen-containing hydrocarbon group include an alkyl group with carbon number from 1 to 12 both inclusive, an alkenyl group with carbon number from 2 to 12 both inclusive, an alkynyl group with carbon number from 2 to 12 both inclusive, an aryl group with carbon number from 6 to 18 both inclusive, a cycloalkyl group with carbon number from 3 to 18 both inclusive, an alkoxy group with carbon number from 1 to 12 both inclusive, groups each obtained by bonding two or more of the foregoing groups to one another, groups each obtained by substituting each of part or all of hydrogen groups of any of the foregoing groups by a halogen group, and the divalent hydrocarbon group and the divalent halogenated hydrocarbon group include an alkylene group with carbon number from 1 to 12 both inclusive, an alkenylene group with carbon number from 2 to 12 both inclusive, an alkynylene group with carbon number from 2 to 12 both inclusive, an arylene group with carbon number from 6 to 18 both inclusive, a cycloalkylene group with carbon number from 3 to 18 both inclusive, groups each obtained by bonding two or more of the foregoing groups to one another, and groups each obtained by substituting each of part or all of hydrogen groups of any of the foregoing groups by a halogen group.

(3) The secondary battery according to (1) or (2), wherein the unsaturated cyclic ester carbonate is represented by one of the following Formula (18) to Formula (20),

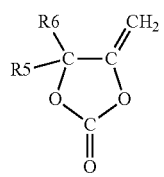
(18)

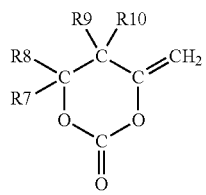
(19)

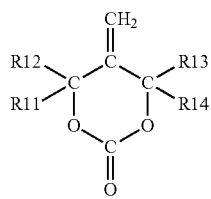
(20)

where R5 to R14 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; the R5 and the R6 may be bonded to each other; any two or more of the R7 to the R10 may be bonded to one another; and any two or more of the R11 to the R14 may be bonded to one another.

(4) The secondary battery according to any one of (1) to (3), wherein the unsaturated cyclic ester carbonate is represented by one of the following Formula (1-1) to Formula (1-56), and a content of the unsaturated cyclic ester carbonate in the electrolytic solution is from about 0.01 weight percent to about 10 weight percent both inclusive.

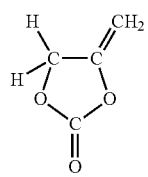
(1-1)

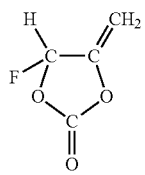
(1-2)

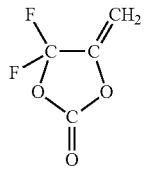
(1-3)

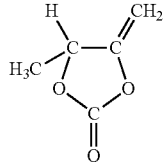
(1-4)

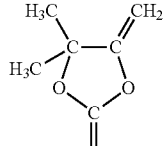
(1-5)

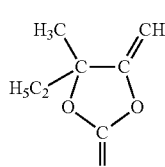
(1-6)

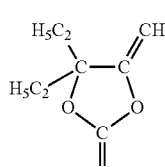
(1-7)

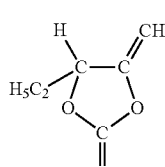
(1-8)

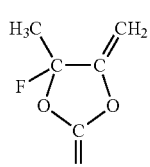
(1-9)

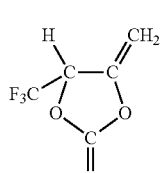
(1-10)

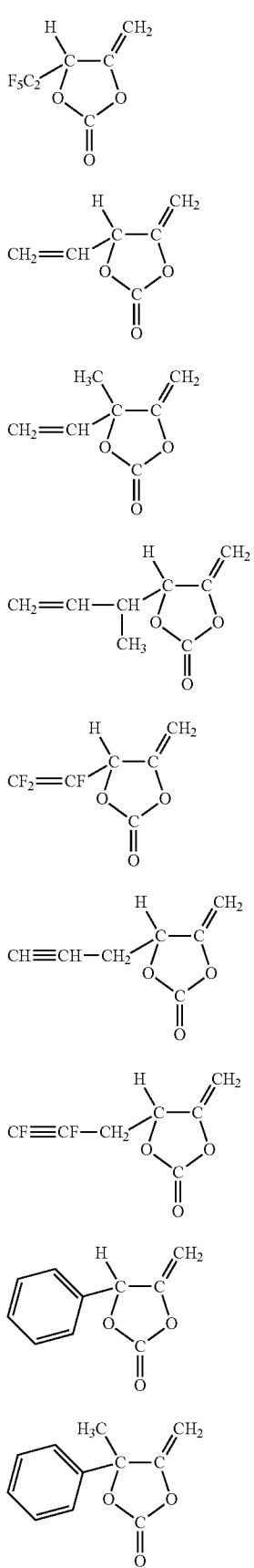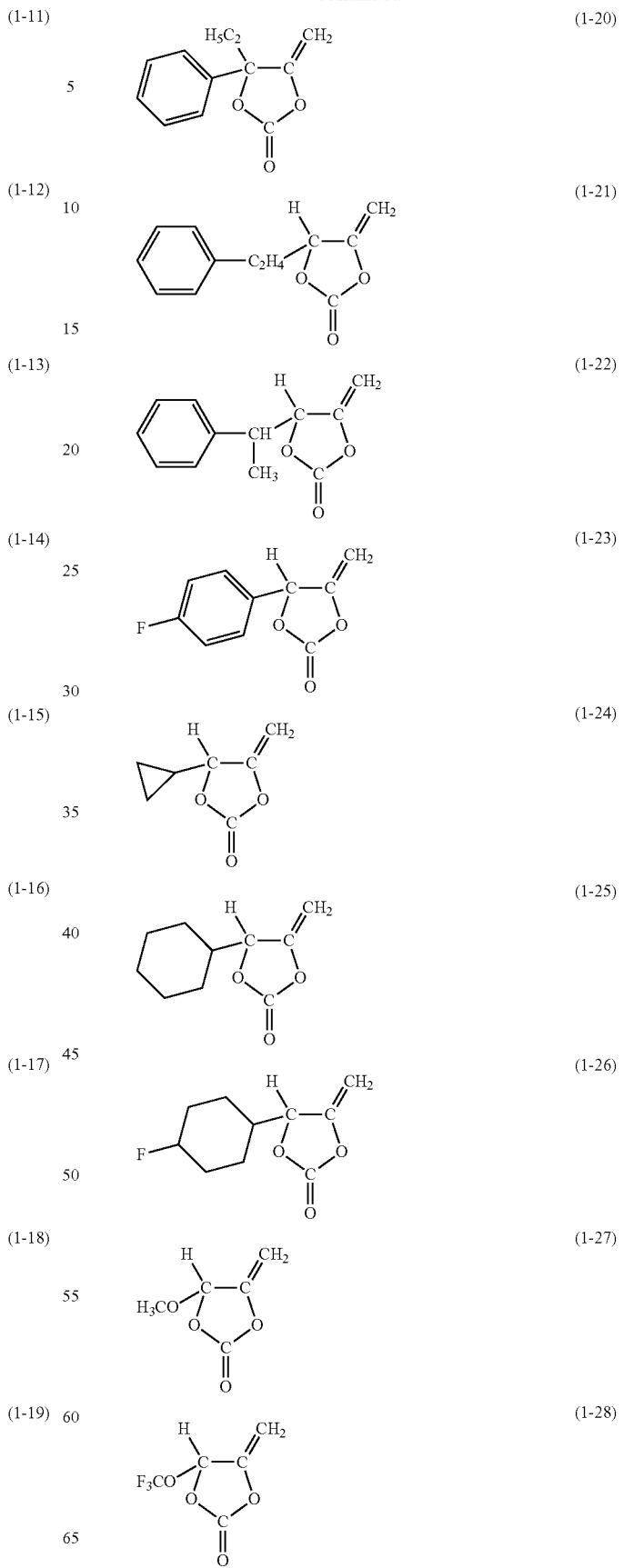

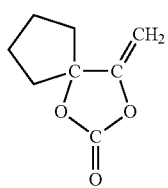 (1-29)
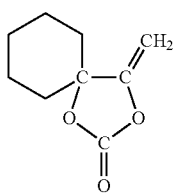 (1-30)
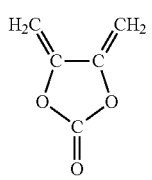 (1-31)
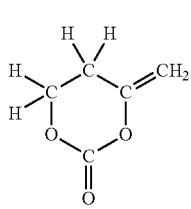 (1-32)
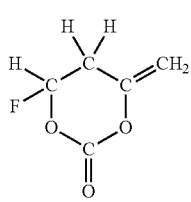 (1-33)
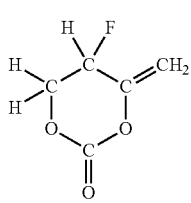 (1-34)
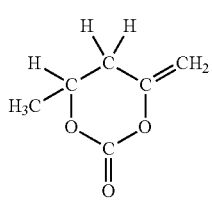 (1-35)
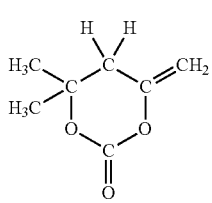 (1-36)
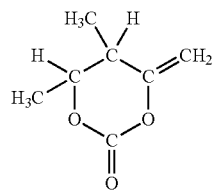 (1-37)
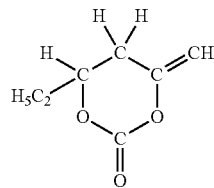 (1-38)
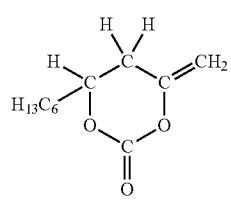 (1-39)
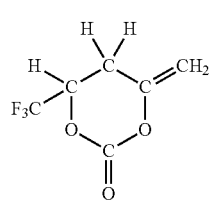 (1-40)
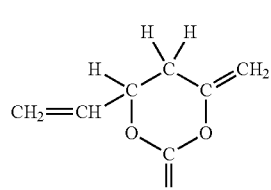 (1-41)
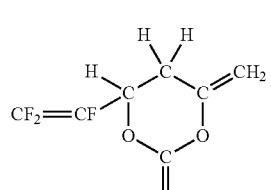 (1-42)
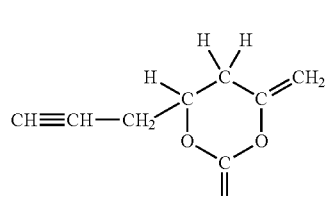 (1-43)
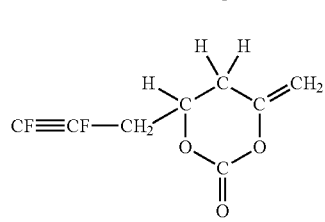 (1-44)

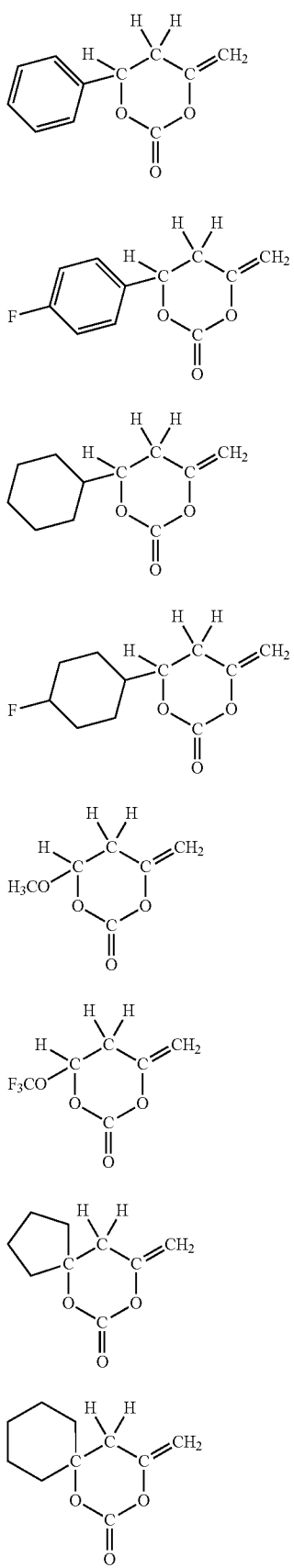
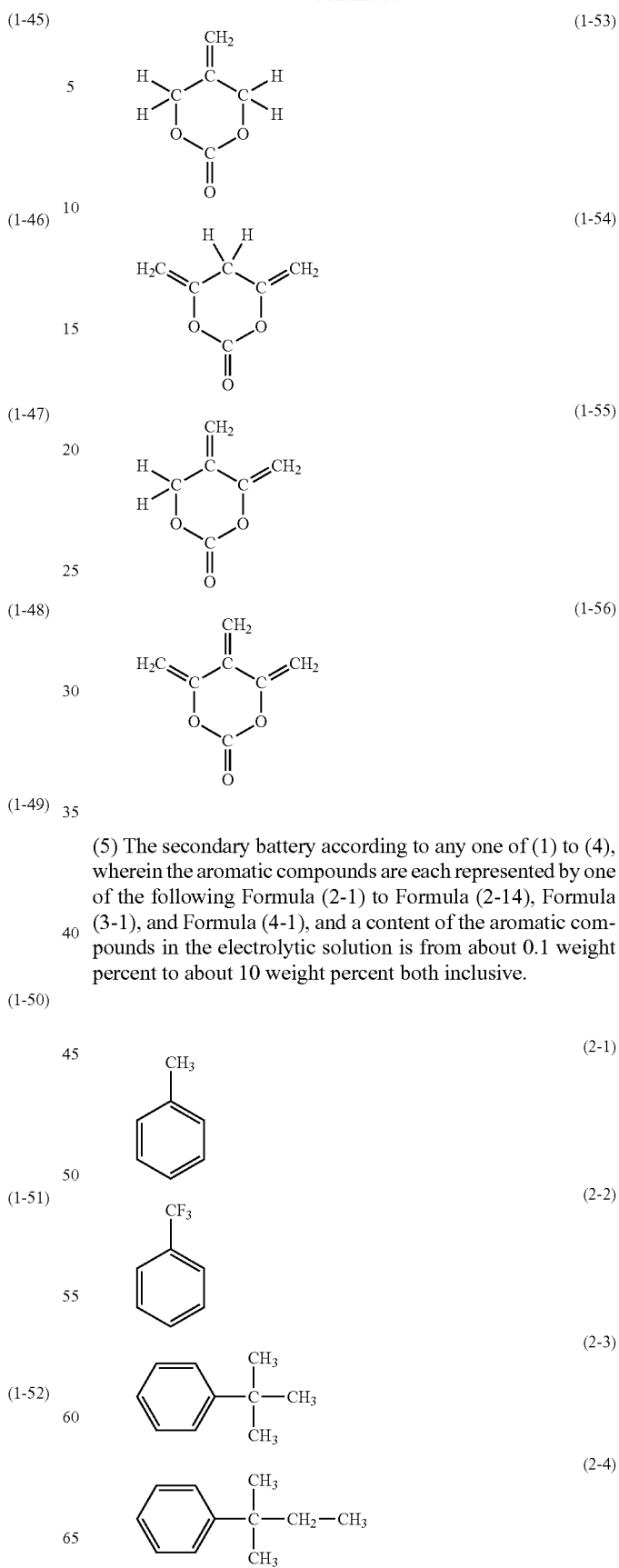
(5) The secondary battery according to any one of (1) to (4), wherein the aromatic compounds are each represented by one of the following Formula (2-1) to Formula (2-14), Formula (3-1), and Formula (4-1), and a content of the aromatic compounds in the electrolytic solution is from about 0.1 weight percent to about 10 weight percent both inclusive.

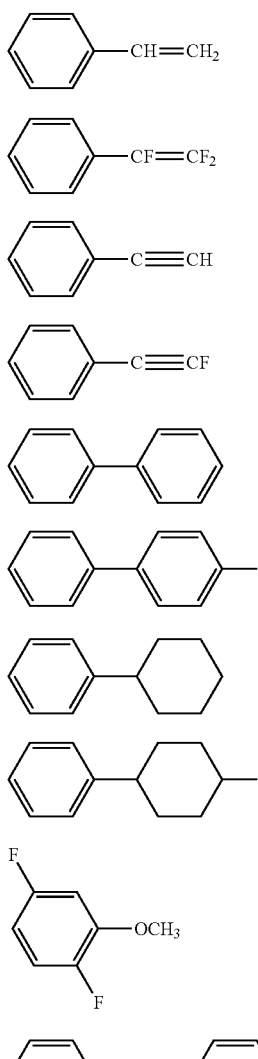
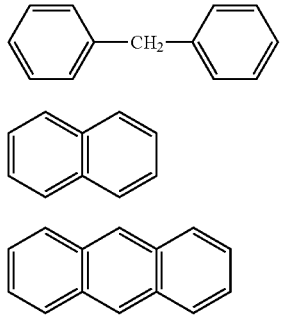

(2-5)
(2-6)
(2-7)
(2-8)
(2-9)
(2-10)
(2-11)
(2-12)
(2-13)
(2-14)
(3-1)
(4-1)

(6) The secondary battery according to any one of (1) to (5), wherein the dinitrile compounds are each represented by one of the following Formula (6-1) to Formula (6-11), and a content of the dinitrile compounds in the electrolytic solution is from about 0.1 weight percent to about 10 weight percent both inclusive.

NC—CH$_2$—CN (6-1)

NC—C$_2$H$_4$—CN (6-2)

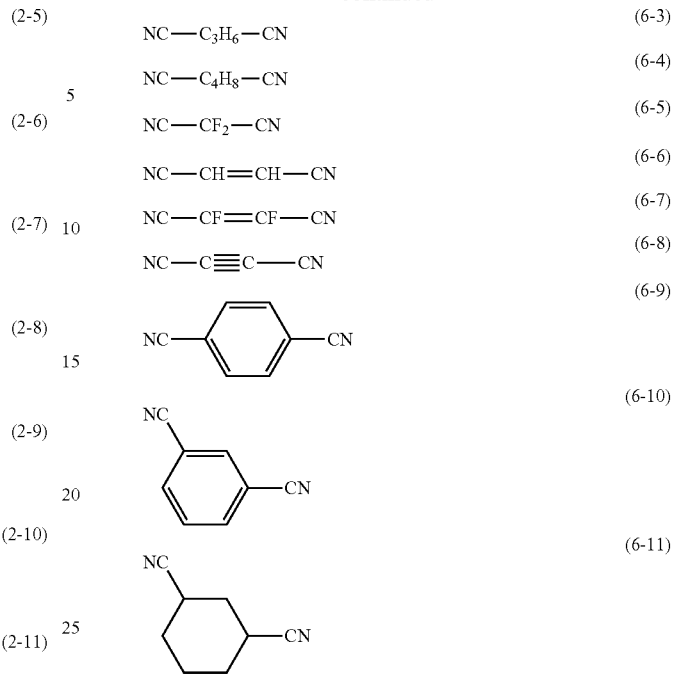

NC—C$_3$H$_6$—CN (6-3)

NC—C$_4$H$_8$—CN (6-4)

NC—CF$_2$—CN (6-5)

NC—CH=CH—CN (6-6)

NC—CF=CF—CN (6-7)

NC—C≡C—CN (6-8)

(6-9)

(6-10)

(6-11)

(7) The secondary battery according to any one of (1) to (6) wherein, the sulfinyl compounds are each represented by one of the following Formula (7-1) to Formula (7-10), Formula (8-1) to Formula (8-6), Formula (9-1) to Formula (9-5), Formula (10-1) to Formula (10-17), Formula (11-1) to Formula (11-18), Formula (12-1) to Formula (12-9), and Formula (13-1) to Formula (13-14), and a content of the sulfinyl compounds in the electrolytic solution is from about 0.1 weight percent to about 5 weight percent both inclusive.

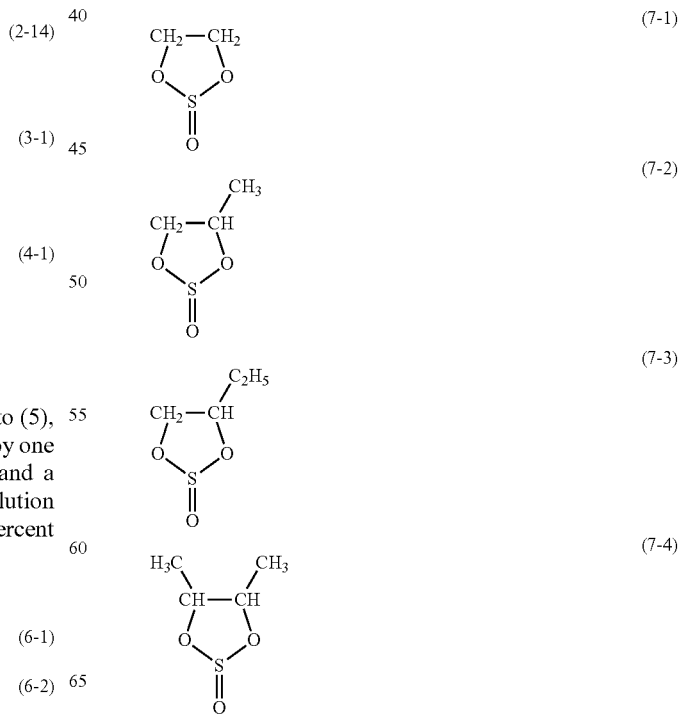

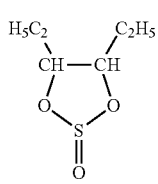 (7-5)
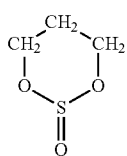 (7-6)
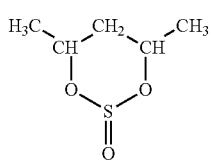 (7-7)
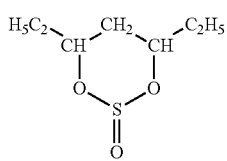 (7-8)
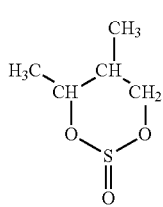 (7-9)
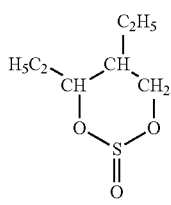 (7-10)
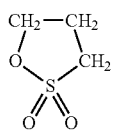 (8-1)
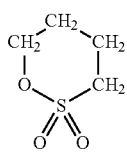 (8-2)
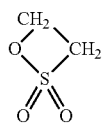 (8-3)
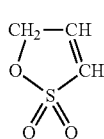 (8-4)
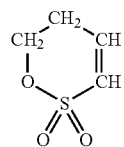 (8-5)
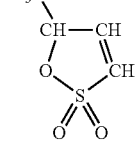 (8-6)
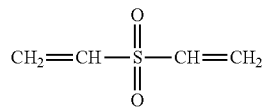 (9-1)
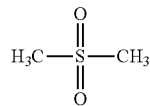 (9-2)
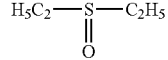 (9-3)
 (9-4)
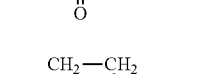 (9-5)
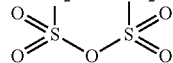 (10-1)
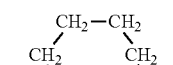 (10-2)
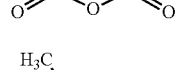 (10-3)
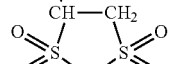 (10-4)
 (10-5)

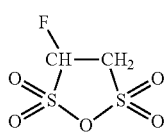 (10-6)
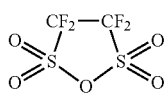 (10-7)
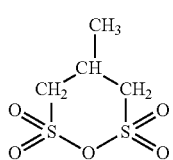 (10-8)
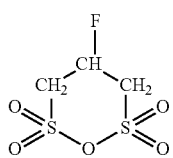 (10-9)
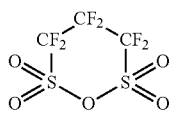 (10-10)
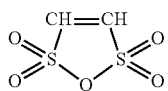 (10-11)
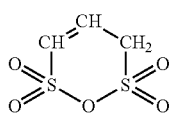 (10-12)
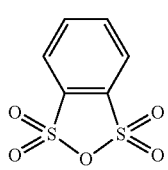 (10-13)
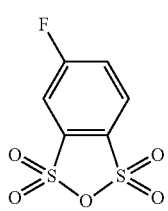 (10-14)
 (10-15)
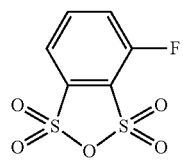 (10-16)
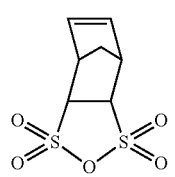 (10-17)
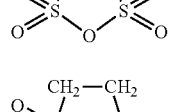 (11-1)
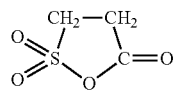 (11-2)
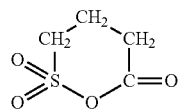 (11-3)
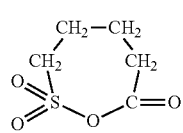 (11-4)
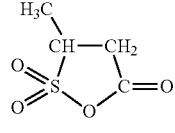 (11-5)
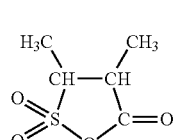 (11-6)
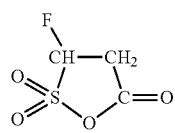 (11-7)
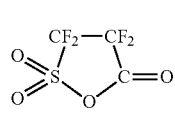 (11-8)
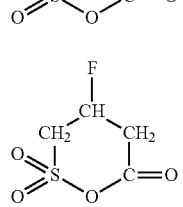 (11-9)

-continued
(11-10) 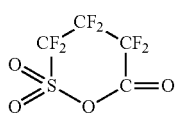
(11-11) 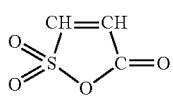
(11-12) 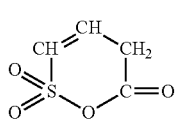
(11-13) 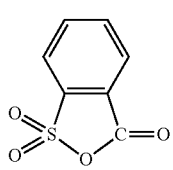
(11-14) 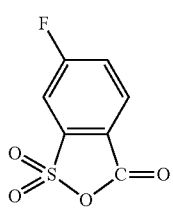
(11-15) 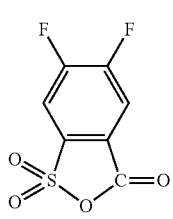
(11-16) 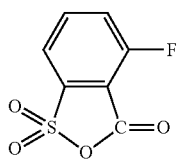
(11-17) 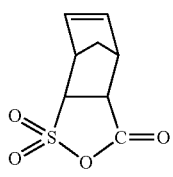
(11-18) 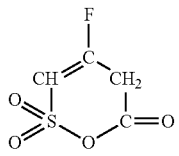
(12-1) 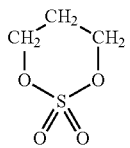
-continued
(12-2) 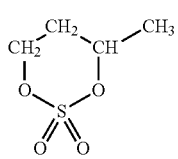
(12-3) 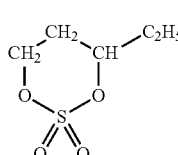
(12-4) 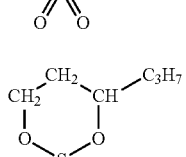
(12-5) 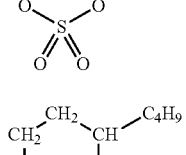
(12-6) 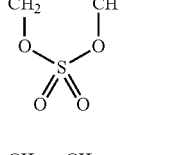
(12-7) 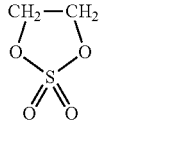
(12-8) 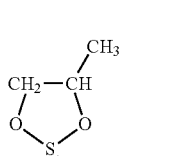
(12-9) 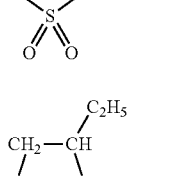
(13-1) 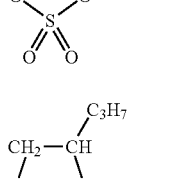
(13-2) 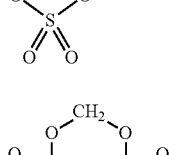

(13-3) 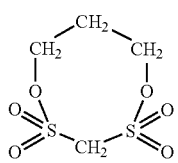
(13-4) 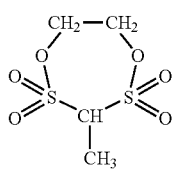
(13-5) 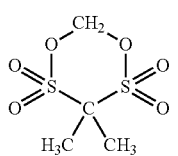
(13-6) 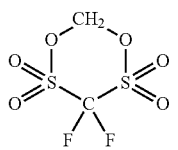
(13-7) 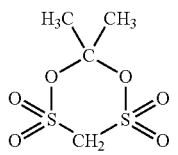
(13-8) 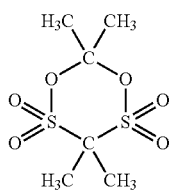
(13-9) 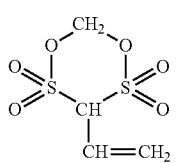
(13-10) 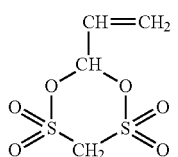
(13-11) 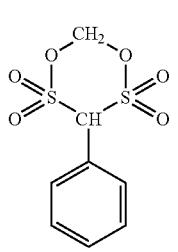
(13-12) 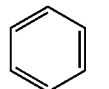
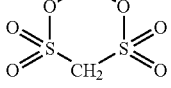
(13-13) 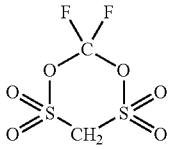
(13-14) 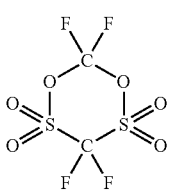
(8) The secondary battery according to any one of (1) to (7), wherein the lithium salts are each represented by one of the following Formula (15-1) to Formula (15-4), Li[N(SO$_2$F)$_2$], and Li(SO$_3$F), and a content of the lithium salts in the electrolytic solution is from about 0.01 mole per kilogram to about 1 mole per kilogram both inclusive.
(15-1) 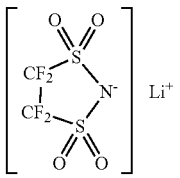
(15-2) 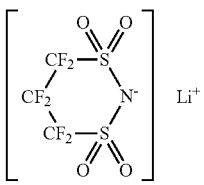
(15-3) 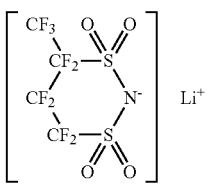
(15-4) 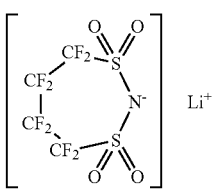

(9) The secondary battery according to any one of (1) to (8), wherein the secondary battery is a lithium ion secondary battery.

(10) An electrolytic solution including:

an unsaturated cyclic ester carbonate represented by the following Formula (1), and one or more selected from a group configured of aromatic compounds represented by the following Formula (2) to Formula (5), dinitrile compounds represented by the following Formula (6), sulfinyl compounds represented by the following Formula (7) to Formula (14), and lithium salts represented by the following Formula (15) to Formula (17),

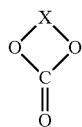
(1)

where X is a divalent group in which m-number of $>C=CR1-R2$ and n-number of $>CR3R4$ are bonded to one another in any order; R1 to R4 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R1 to the R4 may be bonded to one another; and m and n satisfy $m \geq 1$ and $n \geq 0$,

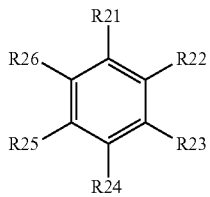
(2)

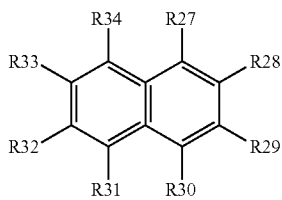
(3)

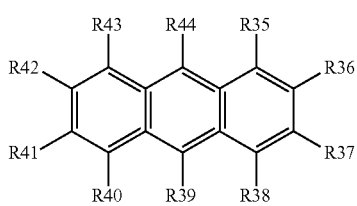
(4)

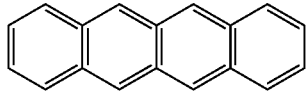
(5)

where R21 to R44 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R21 to the R26 may be bonded to one another; any two or more of the R27 to the R34 may be bonded to one another; any two or more of the R35 to the R44 may be bonded to one another; and total number of carbon atoms in each of the aromatic compounds represented by the Formula (2) to the Formula (4) is from 7 to 18 both inclusive,

(6)

$$NC-R45-CN$$

where R45 is one of a divalent hydrocarbon group and a divalent halogenated hydrocarbon group,

(7)

(8)

(9)

(10)

(11)

(12)

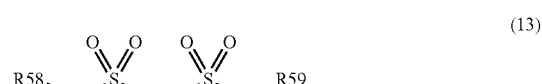
(13)

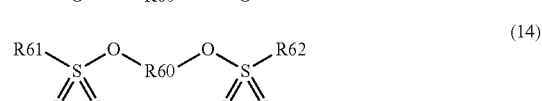
(14)

where R46 to R59, R61, and R62 are each one of a monovalent hydrocarbon group and a monovalent halogenated hydrocarbon group; R60 and R63 are each one of a divalent hydrocarbon group and a divalent halogenated hydrocarbon group; the R46 and the R47 may be bonded to each other; the R48 and the R49 may be bonded to each other; the R50 and the R51 may be bonded to each other; the R52 and the R53 may be bonded to each other; the R54 and the R55 may be bonded to each other; the R56 and the R57 may be bonded to each other; any two or more of the R58 to the R60 may be bonded to one another; and any two or more of the R61 to the R63 may be bonded to one another,

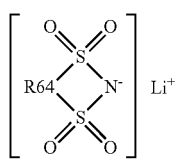  (15)

where R64 is a divalent halogenated hydrocarbon group,

Li[N(SO$_2$R65)(SO$_2$R66)]  (16)

where R65 and R66 are each one of a halogen group, a monovalent hydrocarbon group, and a monovalent halogenated hydrocarbon group; and the R65, the R66, or both are each one of a halogen group and a monovalent halogenated hydrocarbon group, Li(SO$_3$F)  (17).

(11) A battery pack including:
    the secondary battery according to any one of (1) to (9);
    a control section controlling a used state of the secondary battery; and
    a switch section switching the used state of the secondary battery according to an instruction of the control section.

(12) An electric vehicle including:
    the secondary battery according to any one of (1) to (9);
    a conversion section converting electric power supplied from the secondary battery into drive power;
    a drive section operating according to the drive power; and
    a control section controlling a used state of the secondary battery.

(13) An electric power storage system including:
    the secondary battery according to any one of (1) to (9);
    one or more electric devices supplied with electric power from the secondary battery; and
    a control section controlling the supplying of the electric power from the secondary battery to the one or more electric devices.

(14) An electric power tool including:
    the secondary battery according to any one of (1) to (9); and
    a movable section supplied with electric power from the secondary battery.

(15) An electronic apparatus including
    the secondary battery according to any one of (1) to (9) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
    a cathode;
    an anode; and
    an electrolytic solution, wherein:
    the electrolytic solution includes:
    0.01 weight percent to 10 weight percent of an unsaturated cyclic ester carbonate represented by the following Formula (1), and
    one or more selected from a group consisting of: aromatic compounds represented by the following Formula (2) to Formula (5), dinitrile compounds represented by the following Formula (6), sulfinyl compounds represented by the following Formula (7) to Formula (14), and 0.01 moles per kilogram to 1.0 moles per kilogram of lithium salts represented by the following Formula (15) to Formula (17),

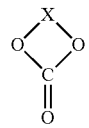  (1)

where X is a divalent group in which m-number of >C=CR1-R2 and n-number of >CR3R4 are bonded to one another in any order; R1 to R4 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R1 to the R4 may be bonded to one another; and m and n satisfy m≥1 and n≥0,

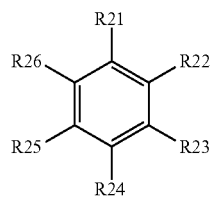  (2)

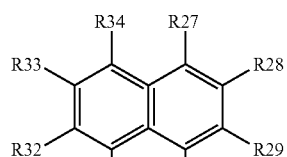  (3)

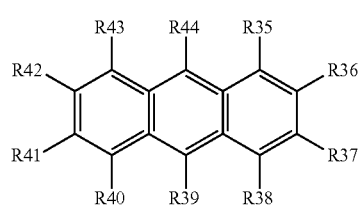  (4)

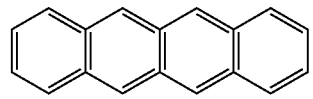  (5)

where R21 to R44 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R21 to the R26 may be bonded to one another; any two or more of the R27 to the R34 may be bonded to one another; any two or more of the R35 to the R44 may be bonded to one another; and total number of carbon atoms in each of the aromatic compounds represented by the Formula (2) to the Formula (4) is from 7 to 18 both inclusive,

NC—R45—CN  (6)

where R45 is one of a divalent hydrocarbon group and a divalent halogenated hydrocarbon group,

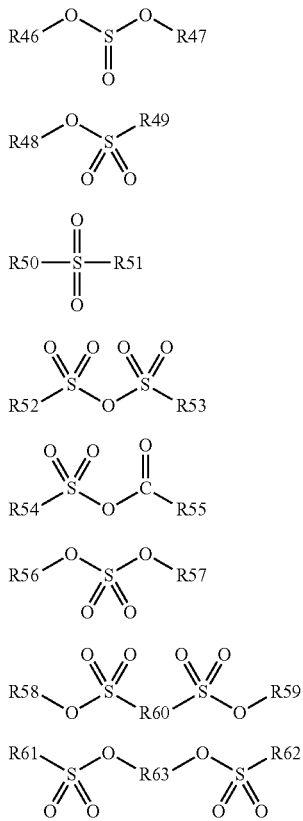

where R46 to R59, R61, and R62 are each one of a monovalent hydrocarbon group and a monovalent halogenated hydrocarbon group; R60 and R63 are each one of a divalent hydrocarbon group and a divalent halogenated hydrocarbon group; the R46 and the R47 may be bonded to each other; the R48 and the R49 may be bonded to each other; the R50 and the R51 may be bonded to each other; the R52 and the R53 may be bonded to each other; the R54 and the R55 may be bonded to each other; the R56 and the R57 may be bonded to each other; any two or more of the R58 to the R60 may be bonded to one another; and any two or more of the R61 to the R63 may be bonded to one another,

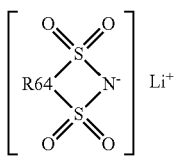

(15)

where R64 is a divalent halogenated hydrocarbon group,

Li[N(SO$_2$R65)(SO$_2$R66)]            (16)

where R65 and R66 are each one of a halogen group, a monovalent hydrocarbon group, and a monovalent halogenated hydrocarbon group; and the R65, the R66, or both are each one of a halogen group and a monovalent halogenated hydrocarbon group, Li(SO$_3$F)            (17).

2. The secondary battery according to claim 1, wherein
the halogen group includes a fluorine group, a chlorine group, a bromine group, and an iodine group,
the monovalent hydrocarbon group, the monovalent halogenated hydrocarbon group, the monovalent oxygen-containing hydrocarbon group, and the monovalent halogenated oxygen-containing hydrocarbon group include an alkyl group with carbon number from 1 to 12 both inclusive, an alkenyl group with carbon number from 2 to 12 both inclusive, an alkynyl group with carbon number from 2 to 12 both inclusive, an aryl group with carbon number from 6 to 18 both inclusive, a cycloalkyl group with carbon number from 3 to 18 both inclusive, an alkoxy group with carbon number from 1 to 12 both inclusive, groups each obtained by bonding two or more of the foregoing groups to one another, groups each obtained by substituting each of part or all of hydrogen groups of any of the foregoing groups by a halogen group, and
the divalent hydrocarbon group and the divalent halogenated hydrocarbon group include an alkylene group with carbon number from 1 to 12 both inclusive, an alkenylene group with carbon number from 2 to 12 both inclusive, an alkynylene group with carbon number from 2 to 12 both inclusive, an arylene group with carbon number from 6 to 18 both inclusive, a cycloalkylene group with carbon number from 3 to 18 both inclusive, groups each obtained by bonding two or more of the foregoing groups to one another, and groups each obtained by substituting each of part or all of hydrogen groups of any of the foregoing groups by a halogen group.

3. The secondary battery according to claim 1, wherein the unsaturated cyclic ester carbonate is represented by one of the following Formula (18) to Formula (20),

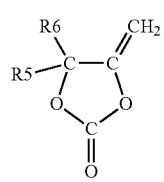

(18)

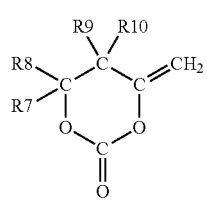

(19)

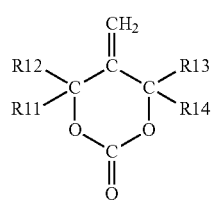

(20)

where R5 to R14 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; the R5 and the R6 may be bonded to each other; any two or more of the R7 to the R10 may be bonded to one another; and any two or more of the R11 to the R14 may be bonded to one another.

4. The secondary battery according to claim 1, wherein the unsaturated cyclic ester carbonate is represented by one of the following Formula (1-1) to Formula (1-56)

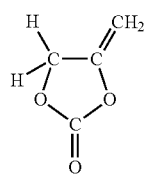
(1-1)

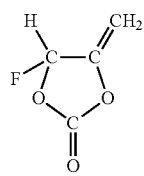
(1-2)

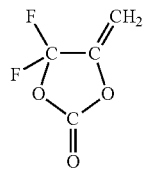
(1-3)

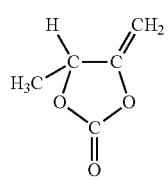
(1-4)

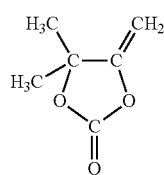
(1-5)

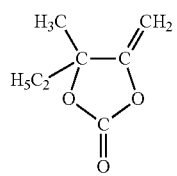
(1-6)

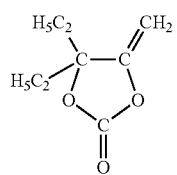
(1-7)

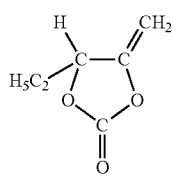
(1-8)

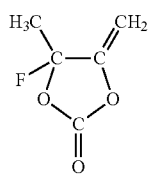
(1-9)

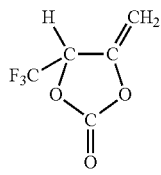
(1-10)

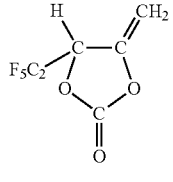
(1-11)

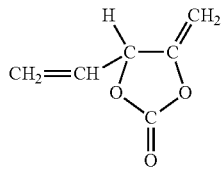
(1-12)

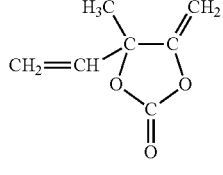
(1-13)

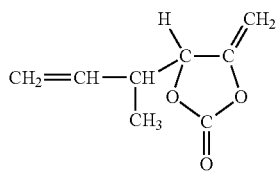
(1-14)

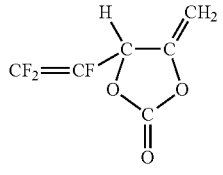
(1-15)

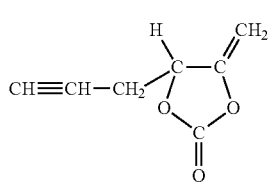
(1-16)

(1-17) 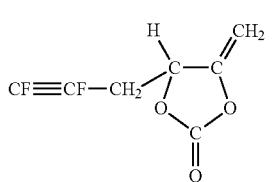
(1-18) 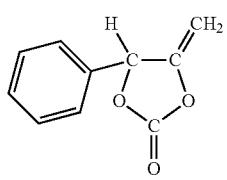
(1-19) 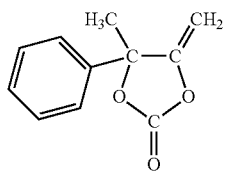
(1-20) 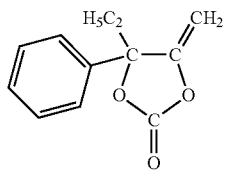
(1-21) 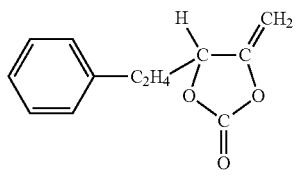
(1-22) 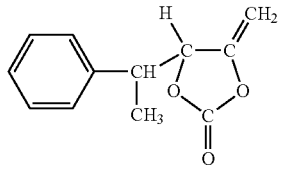
(1-23) 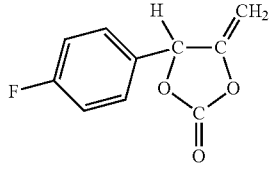
(1-24) 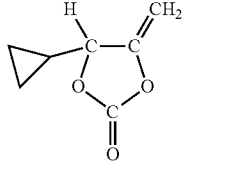
(1-25) 
(1-26) 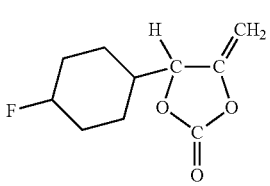
(1-27) 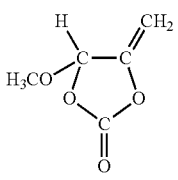
(1-28) 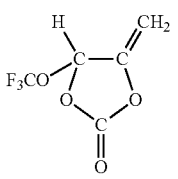
(1-29) 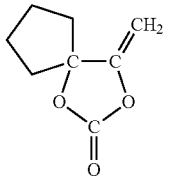
(1-30) 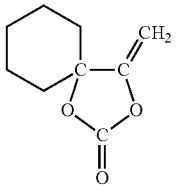
(1-31) 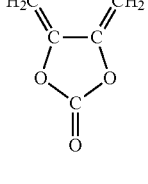
(1-32) 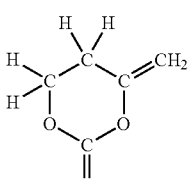
(1-33) 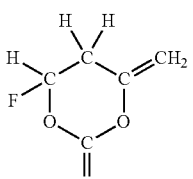

(1-34) 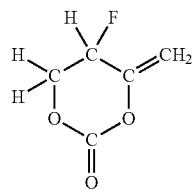
(1-35) 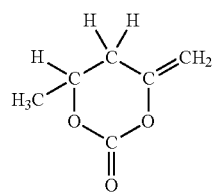
(1-36) 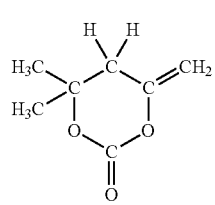
(1-37) 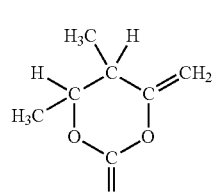
(1-38) 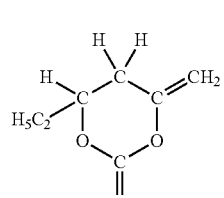
(1-39) 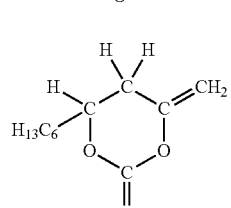
(1-40) 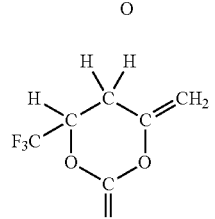
(1-41) 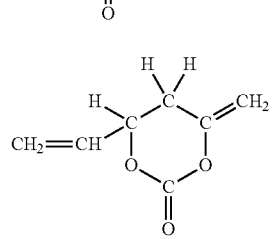
(1-42) 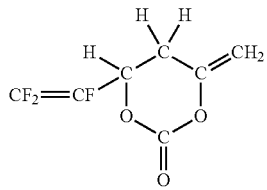
(1-43) 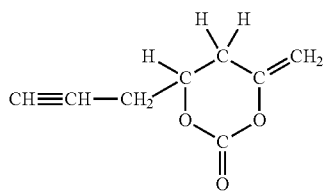
(1-44) 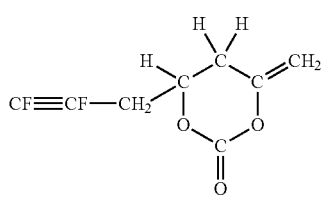
(1-45) 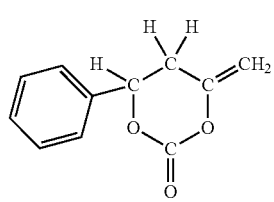
(1-46) 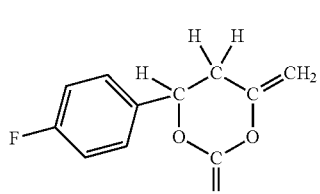
(1-47) 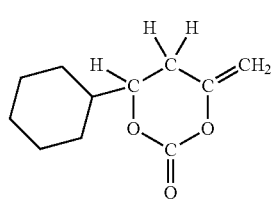
(1-48) 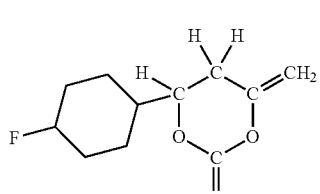
(1-49) 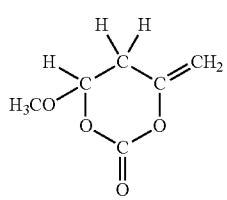

| | |
|---|---|
| 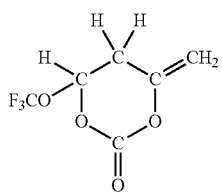 (1-50) | 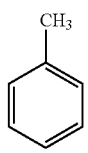 (2-1) |
| 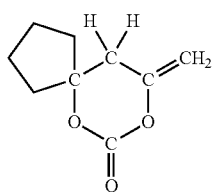 (1-51) | 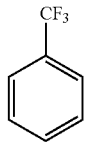 (2-2) |
| 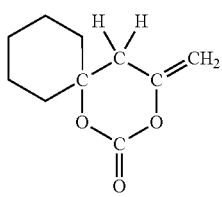 (1-52) | 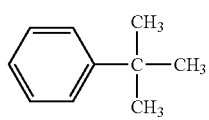 (2-3) |
| | 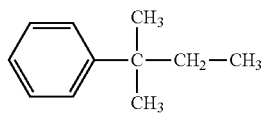 (2-4) |
| 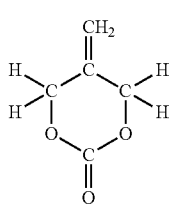 (1-53) | 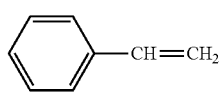 (2-5) |
| 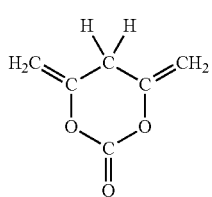 (1-54) | 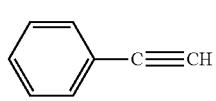 (2-6) |
| | 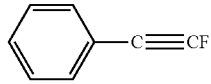 (2-7) |
| 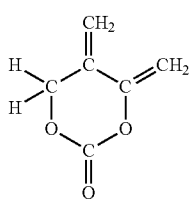 (1-55) | 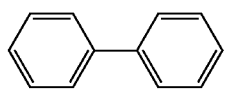 (2-8) |
| | 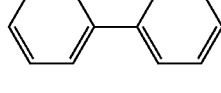 (2-9) |
| | 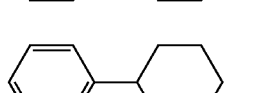 (2-10) |
| 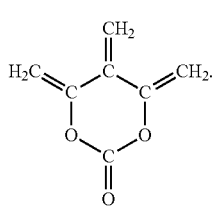 (1-56) | 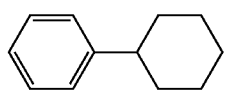 (2-11) |
| | 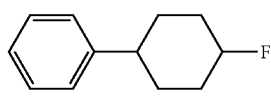 (2-12) |
| 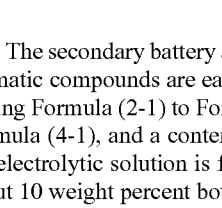 | 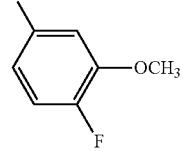 (2-13) |
5. The secondary battery according to claim 1, wherein the aromatic compounds are each represented by one of the following Formula (2-1) to Formula (2-14), Formula (3-1), and Formula (4-1), and a content of the aromatic compounds in the electrolytic solution is from about 0.1 weight percent to about 10 weight percent both inclusive

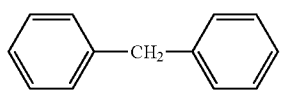 (2-14)

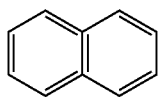 (3-1)

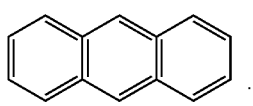 (4-1)

6. The secondary battery according to claim 1, wherein the dinitrile compounds are each represented by one of the following Formula (6-1) to Formula (6-11), and a content of the dinitrile compounds in the electrolytic solution is from about 0.1 weight percent to about 10 weight percent both inclusive

NC—CH$_2$—CN (6-1)

NC—C$_2$H$_4$—CN (6-2)

NC—C$_3$H$_6$—CN (6-3)

NC—C$_4$H$_8$—CN (6-4)

NC—CF$_2$—CN (6-5)

NC—CH=CH—CN (6-6)

NC—CF=CF—CN (6-7)

NC—C≡C—CN (6-8)

 (6-9)

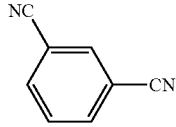 (6-10)

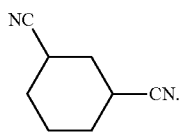 (6-11)

7. The secondary battery according to claim 1 wherein, the sulfinyl compounds are each represented by one of the following Formula (7-1) to Formula (7-10), Formula (8-1) to Formula (8-6), Formula (9-1) to Formula (9-5), Formula (10-1) to Formula (10-17), Formula (11-1) to Formula (11-18), Formula (12-1) to Formula (12-9), and Formula (13-1) to Formula (13-14), and a content of the sulfinyl compounds in the electrolytic solution is from about 0.1 weight percent to about 5 weight percent both inclusive

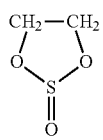 (7-1)

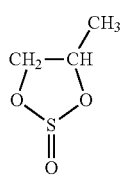 (7-2)

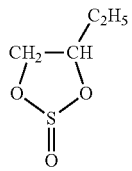 (7-3)

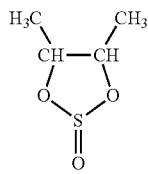 (7-4)

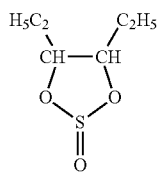 (7-5)

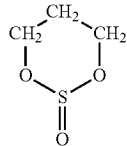 (7-6)

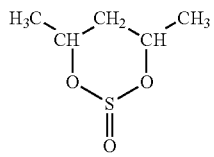 (7-7)

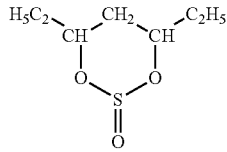 (7-8)

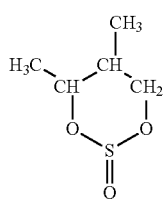 (7-9)

(7-10) 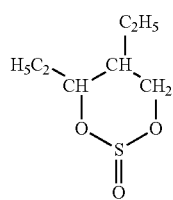
(8-1) 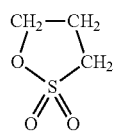
(8-2) 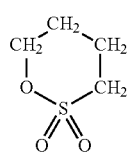
(8-3) 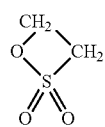
(8-4) 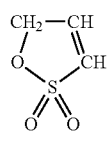
(8-5) 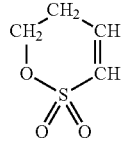
(8-6) 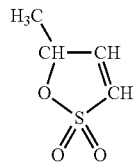
(9-1) 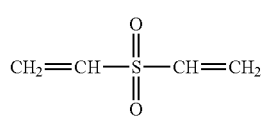
(9-2) 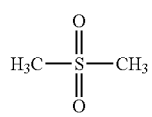
(9-3) 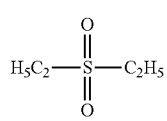
(9-4) 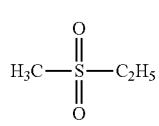
(9-5) 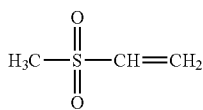
(10-1) 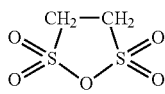
(10-2) 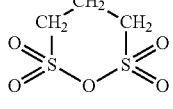
(10-3) 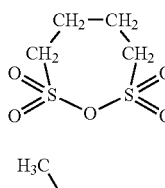
(10-4) 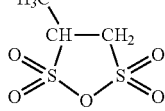
(10-5) 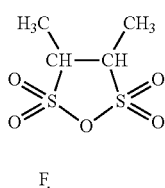
(10-6) 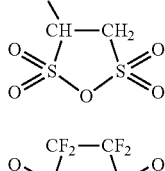
(10-7) 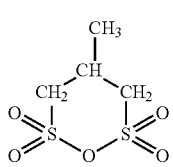
(10-8) 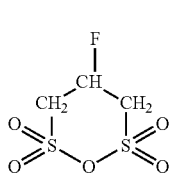
(10-9) 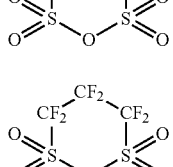
(10-10) 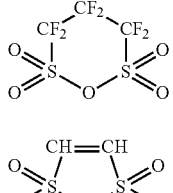
(10-11) 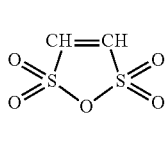

(10-12) 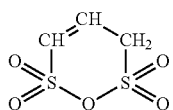
(10-13) 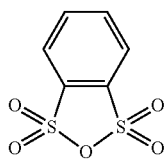
(10-14) 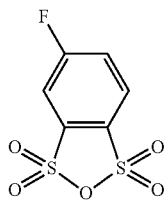
(10-15) 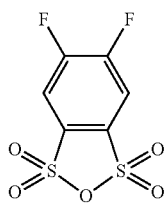
(10-16) 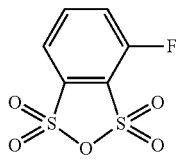
(10-17) 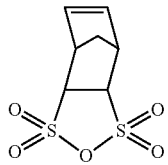
(11-1) 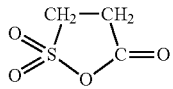
(11-2) 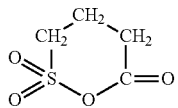
(11-3) 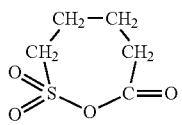
(11-4) 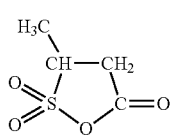
(11-5) 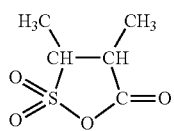
(11-6) 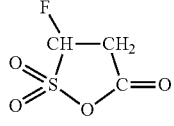
(11-7) 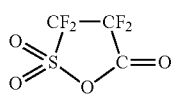
(11-8) 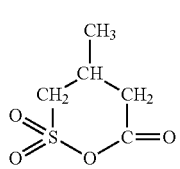
(11-9) 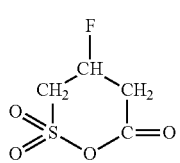
(11-10) 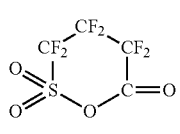
(11-11) 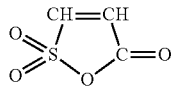
(11-12) 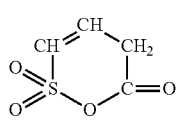
(11-13) 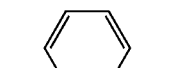
(11-14) 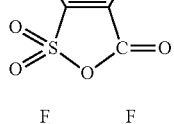
(11-15) 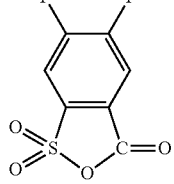

(11-16) 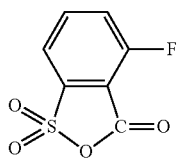
(11-17) 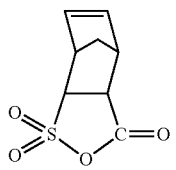
(11-18) 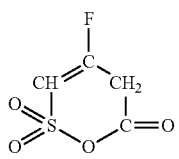
(12-1) 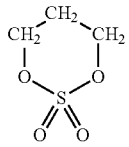
(12-2) 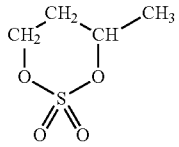
(12-3) 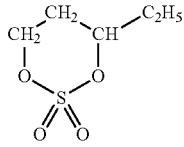
(12-4) 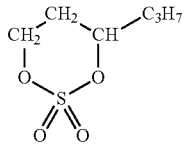
(12-5) 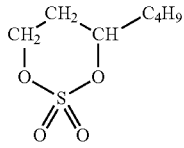
(12-6) 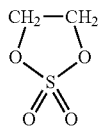
(12-7) 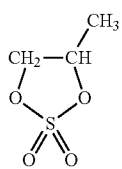
(12-8) 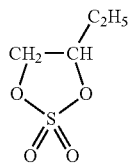
(12-9) 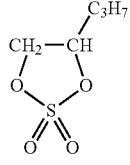
(13-1) 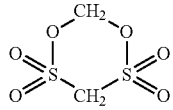
(13-2) 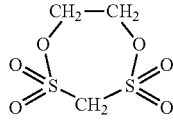
(13-3) 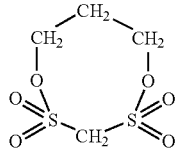
(13-4) 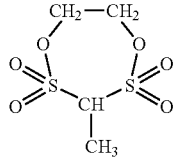
(13-5) 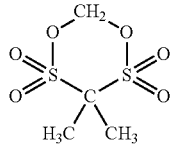
(13-6) 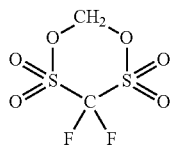
(13-7) 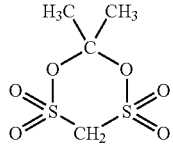
(13-8) 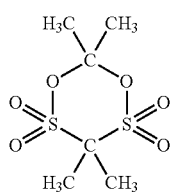

-continued (13-9) 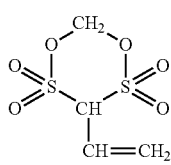

(13-10) 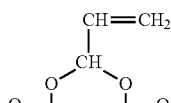

(13-11) 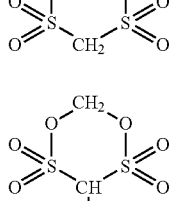

(13-12) 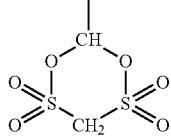

(13-13) 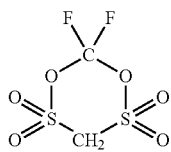

(13-14) 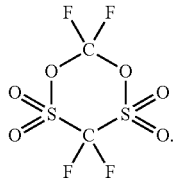

8. The secondary battery according to claim 1, wherein the lithium salts are each represented by one of the following Formula (15-1) to Formula (15-4), Li[N(SO$_2$F)$_2$], and Li(SO$_3$F)

(15-1) 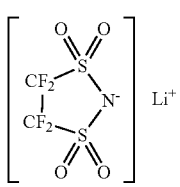

-continued (15-2) 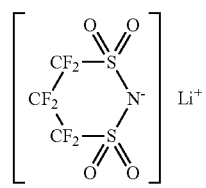

(15-3) 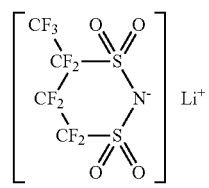

(15-4) 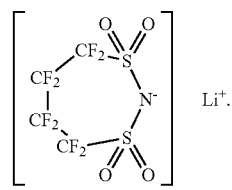

9. The secondary battery according to claim 1, wherein the secondary battery is a lithium ion secondary battery.

10. An electrolytic solution comprising:
   0.01 weight percent to 10 weight percent of an unsaturated cyclic ester carbonate represented by the following Formula (1), and
   one or more selected from a group consisting of aromatic compounds represented by the following Formula (2) to Formula (5), dinitrile compounds represented by the following Formula (6), sulfinyl compounds represented by the following Formula (7) to Formula (14), and 0.01 moles per kilogram to 1.0 moles per kilogram of lithium salts represented by the following Formula (15) to Formula (17), (1) 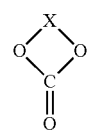

where X is a divalent group in which m-number of >C=CR1-R2 and n-number of >CR3R4 are bonded to one another in any order; R1 to R4 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R1 to the R4 may be bonded to one another; and m and n satisfy m≥1 and n≥0,

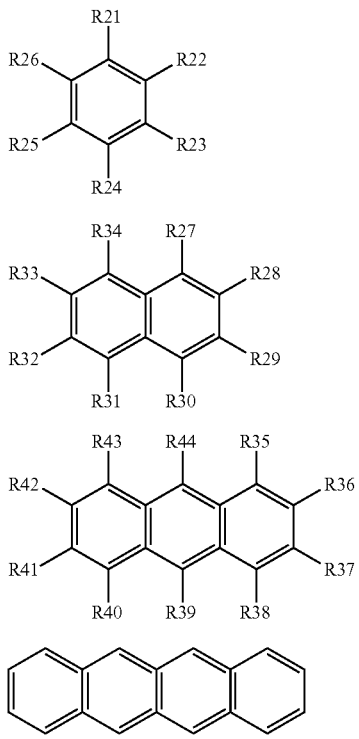
(2)

(3)

(4)

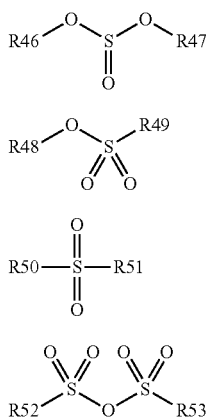
(5)

where R21 to R44 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R21 to the R26 may be bonded to one another; any two or more of the R27 to the R34 may be bonded to one another; any two or more of the R35 to the R44 may be bonded to one another; and total number of carbon atoms in each of the aromatic compounds represented by the Formula (2) to the Formula (4) is from 7 to 18 both inclusive,

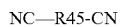 (6)

where R45 is one of a divalent hydrocarbon group and a divalent halogenated hydrocarbon group,

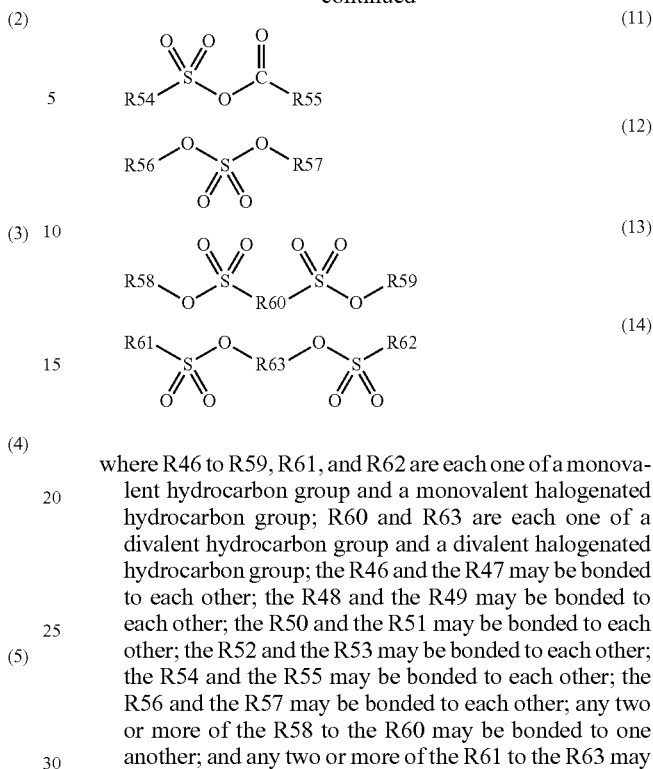

(7)

(8)

(9)

(10)

(11)

(12)

(13)

(14)

where R46 to R59, R61, and R62 are each one of a monovalent hydrocarbon group and a monovalent halogenated hydrocarbon group; R60 and R63 are each one of a divalent hydrocarbon group and a divalent halogenated hydrocarbon group; the R46 and the R47 may be bonded to each other; the R48 and the R49 may be bonded to each other; the R50 and the R51 may be bonded to each other; the R52 and the R53 may be bonded to each other; the R54 and the R55 may be bonded to each other; the R56 and the R57 may be bonded to each other; any two or more of the R58 to the R60 may be bonded to one another; and any two or more of the R61 to the R63 may be bonded to one another,

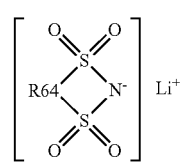 (15)

where R64 is a divalent halogenated hydrocarbon group,

 (16)

where R65 and R66 are each one of a halogen group, a monovalent hydrocarbon group, and a monovalent halogenated hydrocarbon group; and the R65, the R66, or both are each one of a halogen group and a monovalent halogenated hydrocarbon group,

 (17).

11. A battery pack comprising:
a secondary battery;
a control section controlling a used state of the secondary battery; and
a switch section switching the used state of the secondary battery according to an instruction of the control section,
wherein:
the secondary battery includes a cathode, an anode, and an electrolytic solution, and
the electrolytic solution includes:
0.01 weight percent to 10 weight percent of an unsaturated cyclic ester carbonate represented by the following Formula (1), and
one or more selected from a group consisting of aromatic compounds represented by the following Formula (2) to Formula (5), dinitrile compounds represented by the following Formula (6), sulfinyl compounds represented by the following Formula (7) to Formula (14), and 0.01 moles per kilogram to 1.0 moles per kilogram of lithium salts represented by the following Formula (15) to Formula (17),

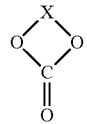
(1)

where X is a divalent group in which m-number of >C=CR1-R2 and n-number of >CR3R4 are bonded to one another in any order; R1 to R4 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R1 to the R4 may be bonded to one another; and m and n satisfy m≥1 and n≥0,

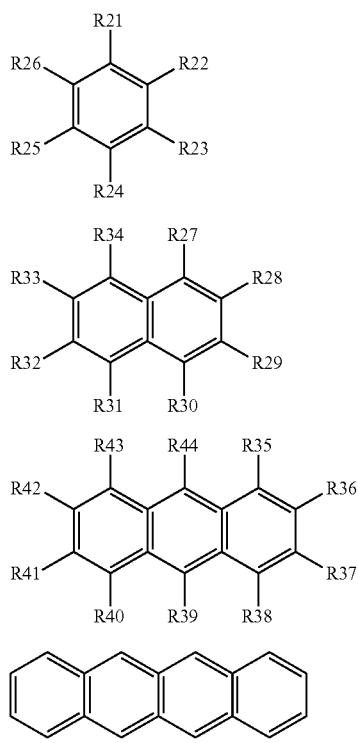

(2)
(3)
(4)
(5)

where R21 to R44 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R21 to the R26 may be bonded to one another; any two or more of the R27 to the R34 may be bonded to one another; any two or more of the R35 to the R44 may be bonded to one another; and total number of carbon atoms in each of the aromatic compounds represented by the Formula (2) to the Formula (4) is from 7 to 18 both inclusive,

NC—R45—CN         (6)

where R45 is one of a divalent hydrocarbon group and a divalent halogenated hydrocarbon group,

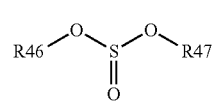
(7)

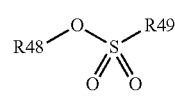
(8)

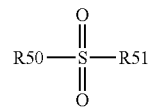
(9)

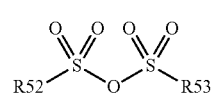
(10)

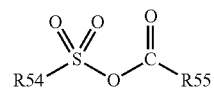
(11)

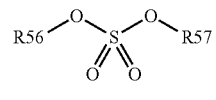
(12)

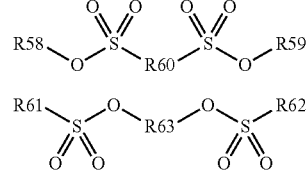
(13)

(14)

where R46 to R59, R61, and R62 are each one of a monovalent hydrocarbon group and a monovalent halogenated hydrocarbon group; R60 and R63 are each one of a divalent hydrocarbon group and a divalent halogenated hydrocarbon group; the R46 and the R47 may be bonded to each other; the R48 and the R49 may be bonded to each other; the R50 and the R51 may be bonded to each other; the R52 and the R53 may be bonded to each other; the R54 and the R55 may be bonded to each other; the R56 and the R57 may be bonded to each other; any two or more of the R58 to the R60 may be bonded to one another; and any two or more of the R61 to the R63 may be bonded to one another,

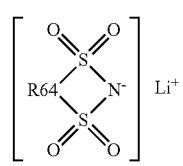
(15)

where R64 is a divalent halogenated hydrocarbon group,

Li[N(SO₂R65)(SO₂R66)]         (16)

where R65 and R66 are each one of a halogen group, a monovalent hydrocarbon group, and a monovalent halogenated hydrocarbon group; and the R65, the R66, or Li(SO₃F) (17).

12. An electric vehicle comprising:

a secondary battery;

a conversion section converting electric power supplied from the secondary battery into drive power;

a drive section operating according to the drive power; and a control section controlling a used state of the secondary battery, wherein:

the secondary battery includes a cathode, an anode, and an electrolytic solution, and the electrolytic solution includes:

0.01 weight percent to 10 weight percent of an unsaturated cyclic ester carbonate represented by the following Formula (1), and one or more selected from a group consisting of aromatic compounds represented by the following Formula (2) to Formula (5), dinitrile compounds represented by the following Formula (6), sulfinyl compounds represented by the following Formula (7) to Formula (14), and 0.01 moles per kilogram to 1.0 moles per kilogram of lithium salts represented by the following Formula (15) to Formula (17),

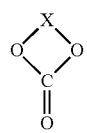

(1)

where X is a divalent group in which m-number of >C=CR1-R2 and n-number of >CR3R4 are bonded to one another in any order; R1 to R4 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R1 to the R4 may be bonded to one another; and m and n satisfy m≥1 and n≥0,

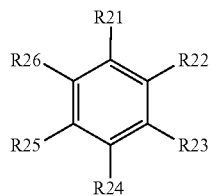

(2)

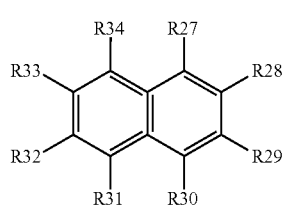

(3)

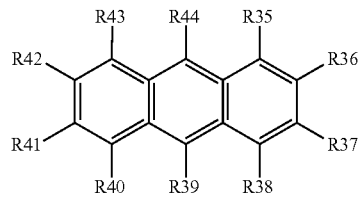

(4)

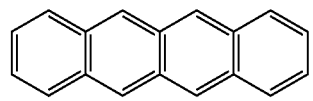

(5)

where R21 to R44 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R21 to the R26 may be bonded to one another; any two or more of the R27 to the R34 may be bonded to one another; any two or more of the R35 to the R44 may be bonded to one another; and total number of carbon atoms in each of the aromatic compounds represented by the Formula (2) to the Formula (4) is from 7 to 18 both inclusive,

NC—R45-CN (6)

where R45 is one of a divalent hydrocarbon group and a divalent halogenated hydrocarbon group,

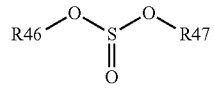

(7)

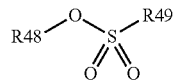

(8)

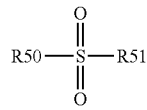

(9)

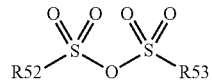

(10)

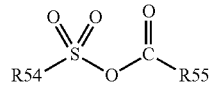

(11)

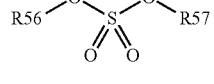

(12)

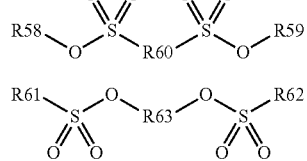

(13)

(14)

where R46 to R59, R61, and R62 are each one of a monovalent hydrocarbon group and a monovalent halogenated hydrocarbon group; R60 and R63 are each one of a divalent hydrocarbon group and a divalent halogenated hydrocarbon group; the R46 and the R47 may be bonded to each other; the R48 and the R49 may be bonded to each other; the R50 and the R51 may be bonded to each other; the R52 and the R53 may be bonded to each other; the R54 and the R55 may be bonded to each other; the R56 and the R57 may be bonded to each other; any two or more of the R58 to the R60 may be bonded to one another; and any two or more of the R61 to the R63 may be bonded to one another,

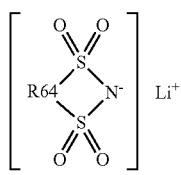 (15)

where R64 is a divalent halogenated hydrocarbon group,

Li[N(SO$_2$R65)(SO$_2$R66)]     (16)

where R65 and R66 are each one of a halogen group, a monovalent hydrocarbon group, and a monovalent halogenated hydrocarbon group; and the R65, the R66, or both are each one of a halogen group and a monovalent halogenated hydrocarbon group, Li(SO$_3$F).     (17)

13. An electric power storage system comprising:
a secondary battery;
one or more electric devices supplied with electric power from the secondary battery; and
a control section controlling the supplying of the electric power from the secondary battery to the one or more electric devices, wherein:
the secondary battery includes a cathode, an anode, and an electrolytic solution, and
the electrolytic solution includes:
0.01 weight percent to 10 weight percent of an unsaturated cyclic ester carbonate represented by the following Formula (1), and
one or more selected from a group consisting of aromatic compounds represented by the following Formula (2) to Formula (5), dinitrile compounds represented by the following Formula (6), sulfinyl compounds represented by the following Formula (7) to Formula (14), and 0.01 moles per kilogram to 1.0 moles per kilogram of lithium salts represented by the following Formula (15) to Formula (17),

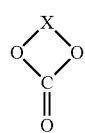 (1)

where X is a divalent group in which m-number of >C=CR1-R2 and n-number of >CR3R4 are bonded to one another in any order; R1 to R4 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R1 to the R4 may be bonded to one another; and m and n satisfy m≥1 and n≥0,

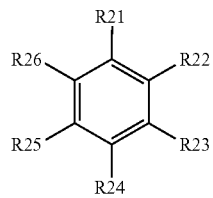 (2)

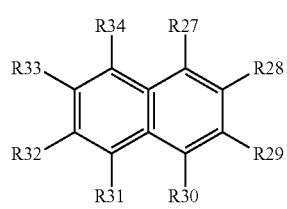 (3)

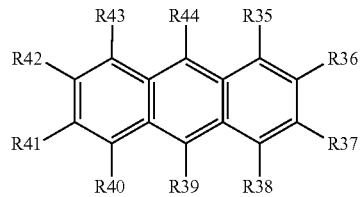 (4)

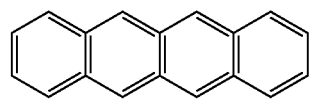 (5)

where R21 to R44 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; arbitrary two or more of the R21 to the R26 may be bonded to one another; arbitrary two or more of the R27 to the R34 may be bonded to one another; arbitrary two or more of the R35 to the R44 may be bonded to one another; and total number of carbon atoms in each of the aromatic compounds represented by the Formula (2) and the Formula (4) is from 7 to 18 both inclusive,

NC—R45-CN     (6)

where R45 is one of a divalent hydrocarbon group and a divalent halogenated hydrocarbon group,

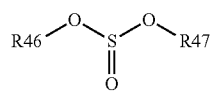 (7)

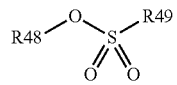 (8)

-continued

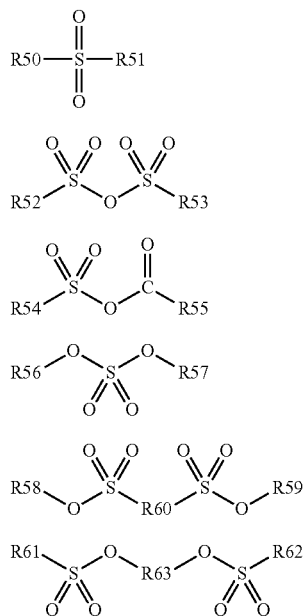

where R46 to R59, R61, and R62 are each one of a monovalent hydrocarbon group and a monovalent halogenated hydrocarbon group; R60 and R63 are each one of a divalent hydrocarbon group and a divalent halogenated hydrocarbon group; the R46 and the R47 may be bonded to each other; the R48 and the R49 may be bonded to each other; the R50 and the R51 may be bonded to each other; the R52 and the R53 may be bonded to each other; the R54 and the R55 may be bonded to each other; the R56 and the R57 may be bonded to each other; arbitrary two or more of the R58 to the R60 may be bonded to one another; and arbitrary two or more of the R61 to the R63 may be bonded to one another,

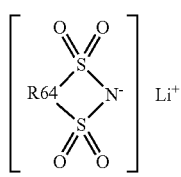 (15)

where R64 is a divalent halogenated hydrocarbon group,

Li[N(SO$_2$R65)(SO$_2$R66)]  (16)

where R65 and R66 are each one of a halogen group, a monovalent hydrocarbon group, and a monovalent halogenated hydrocarbon group; and the R65 or the R66, or both are each one of a halogen group and a monovalent halogenated hydrocarbon group, Li(SO$_3$F)  (17).

14. An electric power tool comprising:
a secondary battery; and
a movable section supplied with electric power from the secondary battery, wherein:
the secondary battery includes a cathode, an anode, and an electrolytic solution, and
the electrolytic solution includes:
0.01 weight percent to 10 weight percent of an unsaturated cyclic ester carbonate represented by the following Formula (1), and
one or more selected from a group consisting of aromatic compounds represented by the following Formula (2) to Formula (5), dinitrile compounds represented by the following Formula (6), sulfinyl compounds represented by the following Formula (7) to Formula (14), and 0.01 moles per kilogram to 1.0 moles per kilogram of lithium salts represented by the following Formula (15) to Formula (17),

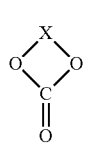 (1)

where X is a divalent group in which m-number of >C=CR1-R2 and n-number of >CR3R4 are bonded to one another in any order; R1 to R4 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R1 to the R4 may be bonded to one another; and m and n satisfy m≥1 and n≥0,

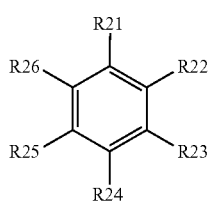 (2)

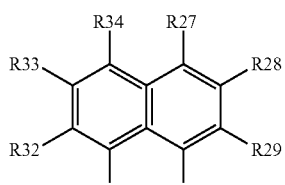 (3)

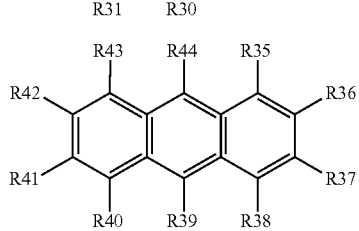 (4)

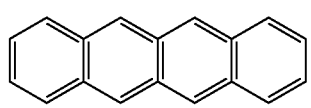 (5)

where R21 to R44 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R21 to the R26 may be bonded to one another; any two or more of the R27 to the R34 may be bonded to one another; any two or more of the R35 to the R44 may be bonded to one another; and total number of carbon atoms in each of the aromatic compounds represented by the Formula (2) to the Formula (4) is from 7 to 18 both inclusive,

NC—R45-CN    (6)

where R45 is one of a divalent hydrocarbon group and a divalent halogenated hydrocarbon group,

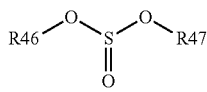    (7)

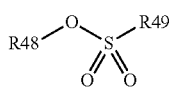    (8)

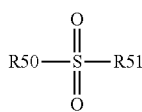    (9)

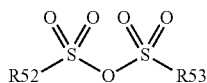    (10)

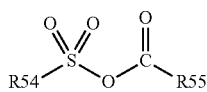    (11)

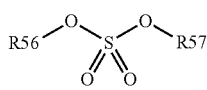    (12)

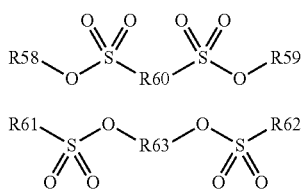    (13)

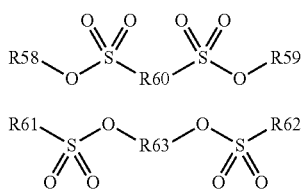    (14)

where R46 to R59, R61, and R62 are each one of a monovalent hydrocarbon group and a monovalent halogenated hydrocarbon group; R60 and R63 are each one of a divalent hydrocarbon group and a divalent halogenated hydrocarbon group; the R46 and the R47 may be bonded to each other; the R48 and the R49 may be bonded to each other; the R50 and the R51 may be bonded to each other; the R52 and the R53 may be bonded to each other; the R54 and the R55 may be bonded to each other; the R56 and the R57 may be bonded to each other; any two or more of the R58 to the R60 may be bonded to one another; and any two or more of the R61 to the R63 may be bonded to one another,

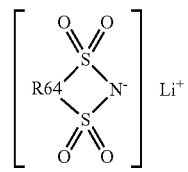    (15)

where R64 is a divalent halogenated hydrocarbon group,

Li[N(SO$_2$R65)(SO$_2$R66)]    (16)

where R65 and R66 are each one of a halogen group, a monovalent hydrocarbon group, and a monovalent halogenated hydrocarbon group; and the R65, the R66, or both are each one of a halogen group and a monovalent halogenated hydrocarbon group, Li(SO$_3$F)    (17).

15. An electronic apparatus comprising
a secondary battery as an electric power supply source, wherein:
the secondary battery includes a cathode, an anode, and an electrolytic solution, and
the electrolytic solution includes:
0.01 weight percent to 10 weight percent of an unsaturated cyclic ester carbonate represented by the following Formula (1), and
one or more selected from a group consisting of aromatic compounds represented by the following Formula (2) to Formula (5), dinitrile compounds represented by the following Formula (6), sulfinyl compounds represented by the following Formula (7) to Formula (14), and 0.01 moles per kilogram to 1.0 moles per kilogram of lithium salts represented by the following Formula (15) to Formula (17),

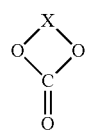    (1)

where X is a divalent group in which m-number of >C=CR1-R2 and n-number of >CR3R4 are bonded to one another in any order; R1 to R4 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R1 to the R4 may be bonded to one another; and m and n satisfy m≥1 and n≥0,

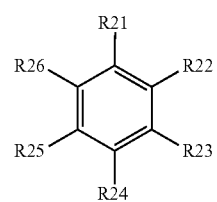    (2)

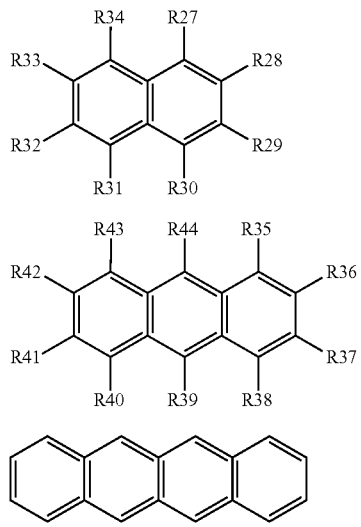

(3)

(4)

(5)

where R21 to R44 are each one of a hydrogen group, a halogen group, a monovalent hydrocarbon group, a monovalent halogenated hydrocarbon group, a monovalent oxygen-containing hydrocarbon group, and a monovalent halogenated oxygen-containing hydrocarbon group; any two or more of the R21 to the R26 may be bonded to one another; any two or more of the R27 to the R34 may be bonded to one another; any two or more of the R35 to the R44 may be bonded to one another; and total number of carbon atoms in each of the aromatic compounds represented by the Formula (2) to the Formula (4) is from 7 to 18 both inclusive,

NC—R45—CN (6)

where R45 is one of a divalent hydrocarbon group and a divalent halogenated hydrocarbon group,

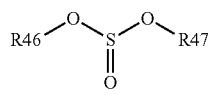

(7)

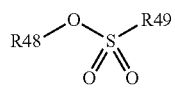

(8)

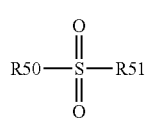

(9)

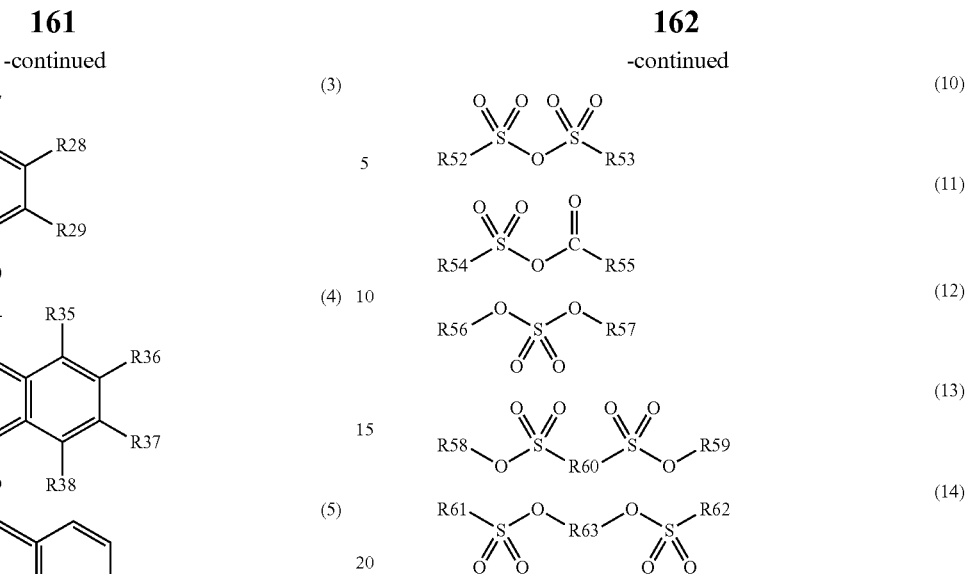

(10)

(11)

(12)

(13)

(14)

where R46 to R59, R61, and R62 are each one of a monovalent hydrocarbon group and a monovalent halogenated hydrocarbon group; R60 and R63 are each one of a divalent hydrocarbon group and a divalent halogenated hydrocarbon group; the R46 and the R47 may be bonded to each other; the R48 and the R49 may be bonded to each other; the R50 and the R51 may be bonded to each other; the R52 and the R53 may be bonded to each other; the R54 and the R55 may be bonded to each other; the R56 and the R57 may be bonded to each other; any two or more of the R58 to the R60 may be bonded to one another; and any two or more of the R61 to the R63 may be bonded to one another,

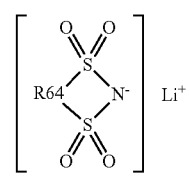

(15)

where R64 is a divalent halogenated hydrocarbon group, $Li[N(SO_2R65)(SO_2R66)]$ (16)

where R65 and R66 are each one of a halogen group, a monovalent hydrocarbon group, and a monovalent halogenated hydrocarbon group; and the R65, the R66, or both are each one of a halogen group and a monovalent halogenated hydrocarbon group, $Li(SO_3F)$ (17).

* * * * *